US009854411B2

(12) United States Patent
Bargetzi et al.

(10) Patent No.: US 9,854,411 B2
(45) Date of Patent: Dec. 26, 2017

(54) INITIATING LIVE PRESENTATION CONTENT SHARING VIA RADIO FREQUENCY BEACONS

(71) Applicant: Crestron Electronics, Inc., Rockleigh, NJ (US)

(72) Inventors: Fred Bargetzi, Upper Saddle River, NJ (US); Daniel Jackson, Valhalla, NY (US); Brian Donlan, Edgewater, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 171 days.

(21) Appl. No.: 15/040,652

(22) Filed: Feb. 10, 2016

(65) Prior Publication Data

US 2016/0227381 A1    Aug. 4, 2016

Related U.S. Application Data

(63) Continuation of application No. 15/040,472, filed on Feb. 10, 2016, which is a continuation-in-part of
(Continued)

(51) Int. Cl.
*H04W 4/06* (2009.01)
*H04W 4/00* (2009.01)
(Continued)

(52) U.S. Cl.
CPC ............... *H04W 4/06* (2013.01); *G01S 5/14* (2013.01); *G06F 3/04842* (2013.01);
(Continued)

(58) Field of Classification Search
CPC ... H04W 72/1263; H04W 4/06; H04W 48/04; H04W 4/008; H04W 88/16; H04L 63/08; H04L 63/105; H04L 63/102; H04L 63/20
(Continued)

(56) References Cited

U.S. PATENT DOCUMENTS 7,716,273 B2 *  5/2010  Soin .................... H04W 4/001
                                            709/203
8,954,467 B2    2/2015  Christiansen
(Continued)

OTHER PUBLICATIONS

Cisco Intelligent Proximity, Promote Richer Collaboration, www.cisco.com/c/en/us/products/collaboration-endpoints/intelligent-proximity.html.
(Continued)

*Primary Examiner* — Jae Y Lee
*Assistant Examiner* — Jean F Voltaire
(74) *Attorney, Agent, or Firm* — Crestron Electronics, Inc.

(57) ABSTRACT

Systems, methods, and modes are disclosed for sharing presentation content displayed on a meeting room display during a meeting. The system comprises one or more presentation gateways each associated with a network address and configured for receiving and transmitting presentation content to a meeting room display during a meeting. The system further comprises one or more RF beacons each associated with a presentation gateway and configured for broadcasting information. The system also comprises a portable electronic device that pairs with the presentation gateway to share presentation content by: receiving from at least one of the one or more RF beacons the broadcasted information, estimating a distance to the at least one of the one or more RF beacons according to a detected signal strength of the RF beacon broadcast, determining a location of the portable electronic device based on the distance to the at least one of the one or more RF beacons, identifying a presentation gateway network address based on the determined location, and pairing with a presentation gateway using the identified presentation gateway network address.

41 Claims, 39 Drawing Sheets

Related U.S. Application Data application No. 14/053,533, filed on Oct. 14, 2013, now abandoned, which is a continuation-in-part of application No. 14/019,340, filed on Sep. 5, 2013, now abandoned.

(60) Provisional application No. 61/857,777, filed on Jul. 24, 2013, provisional application No. 61/713,052, filed on Oct. 12, 2012.

(51) Int. Cl.
| | |
|---|---|
| *H04B 7/155* | (2006.01) |
| *H04L 29/06* | (2006.01) |
| *G06F 3/14* | (2006.01) |
| *G01S 5/14* | (2006.01) |
| *G06F 3/0484* | (2013.01) |
| *G06K 9/62* | (2006.01) |
| *H04N 7/14* | (2006.01) |
| *H04N 7/15* | (2006.01) |
| *H04W 4/02* | (2009.01) |
| *H04L 12/18* | (2006.01) |
| *H04M 3/56* | (2006.01) |
| *H04W 88/02* | (2009.01) |

(52) U.S. Cl.
CPC ........ *G06F 3/04845* (2013.01); *G06F 3/1454* (2013.01); *G06K 9/6202* (2013.01); *H04B 7/155* (2013.01); *H04L 12/1813* (2013.01); *H04L 12/1822* (2013.01); *H04L 12/1827* (2013.01); *H04L 63/08* (2013.01); *H04L 63/102* (2013.01); *H04L 63/105* (2013.01); *H04L 63/20* (2013.01); *H04M 3/567* (2013.01); *H04N 7/147* (2013.01); *H04N 7/155* (2013.01); *H04W 4/008* (2013.01); *H04W 4/023* (2013.01); *H04N 2007/145* (2013.01); *H04W 88/02* (2013.01)

(58) Field of Classification Search
USPC ........................................................ 370/312
See application file for complete search history.

(56) References Cited

U.S. PATENT DOCUMENTS

| | | | |
|---|---|---|---|
| 9,052,745 B2 | 6/2015 | Hill et al. | |
| 2005/0159188 A1* | 7/2005 | Mass ..................... | G06F 3/0481 455/566 |
| 2014/0149453 A1* | 5/2014 | Christiansen ..... | G06F 17/30056 707/769 |

OTHER PUBLICATIONS

Crestron AirMedia™ delivers wireless AV presentation from any mobile device, Jun. 12, 2013, www.crestron.com/about/press-news/press-releases/1827.

Use AirPlay to wirelessly stream content from your iPhone, iPad, or iPod touch, Nov. 11, 2015, support.apple.com/en-us/HT204289.

WePresent1000 | How it works, www.wepresent1000.com/howitworks.html.

\* cited by examiner

INITIATING LIVE PRESENTATION CONTENT SHARING VIA RADIO FREQUENCY BEACONS

BACKGROUND OF THE INVENTION

Technical Field

The present invention relates to control networks, more specifically to control networks leveraging RF communication standards, such as near field communication standards and Bluetooth Low Energy standards, for distribution of presentations, and more specifically to systems, methods, and modes for live presentation sharing between meeting presenter's and meeting attendees' portable electronic devices during a meeting.

Background Art

Today, electronic presentations are an essential part of corporate meetings and academic lectures. Presentations help the presenter to express ideas and provide visual information to attendees complementing the presenter's speech. Electronic presentations generally combine text, graphics, videos, and other type of content in a series of slides using a presentation program, such as PowerPoint®. The slides can be static, or can be animated by the presenter in a variety of ways.

In a conference or meeting room, users traditionally connect to a display screen via awkward wired connections, typically via Video Graphics Array (VGA) or High-Definition Multimedia Interface (HDMI), to present presentation content. Increasingly, this connection is being made wirelessly—a more convenient option for many users. However, current wireless solutions suffer from many setbacks and there are continuing efforts to improve their functionality.

Solutions are available allowing screen sharing from portable electronic devices to conference room display screens. To accomplish this, the portable electronic device or the content source must be first paired with a presentation rendering device connected to a display screen located in the conference room. Currently, this can be accomplished in one of two ways, both of which require inconvenient user interaction. In one implementation, the connection parameters of the presentation rendering device must be entered to the portable electronic devices. Such connection parameters may not be readily accessible to the user and are tedious to enter. Consequently, this can often be burdensome and impractical. In another implementation, the portable electronic device can perform a discovery stage to discover electronic devices it can connect to via a Wi-Fi network, and display a list of the discovered electronic device to select from. In large corporate buildings or similar facilities, there may be hundreds or even thousands of conference rooms of various types. It may become burdensome for a presenter to find the appropriate display screen to connect to from a long list of devices. As such, users desire a less burdensome system and method for wirelessly connecting their portable electronic devices to audiovisual equipment in a conference room.

Moreover, meeting attendees must generally view and follow the presentation on a single meeting room display screen navigated at the command of the presenter. Often, however, not everyone in the room can easily view the display screen, especially if the room is large or the screen is small. Another problem is that everyone in the room must follow the presentation along with the speed of the presenter because they are all looking at the same screen. As portable electronic devices became readily available, attendees often bring their own devices to meetings and would like to view the presentation on their screens. While solutions exist for sharing content with attendee's portable electronic devices, they suffer from many setbacks and need improvements in functionality.

For example, a presenter is able to share a presentation with the attendees by manually sending them a copy via electronic mail or by posting a link to the presentation for download from a website. The presenter may not have access to all of the attendees' email addresses and sending an email of the presentation to a large number of attendees of a large scale meeting is cumbersome and impractical. Also, presenters and attendees may not have access to a website to upload or download a presentation. Additionally, attendees must settle for manually navigating through a local copy of the presentation. Moreover, to navigate through a local copy requires a copy of the software used to make the presentation, which may be costly and unattainable to some users.

Solutions also exist that capture static images of a presentation at a predetermined periodic intervals and provide these images through a website for meeting attendees to view on their portable electronic devices. This solution requires the meeting attendee to enter an IP address to the website, which the meeting attendee may not know or have access to. The solution also suffers from latency and inaccuracy as the static images are only updated at predefined intervals, which may be inconsistent with the speed the presenter is navigating though the presentation slides. Slides or slide content can be erroneously skipped and the presenter may be showing updated slides on the main meeting screen which the meeting attendee has to wait to appear on his screen.

Often meeting attendees want to take additional notes, zoom in a slide to better view the content, go back to previous slides, or perform other manipulations. However, the aforementioned systems lack any meaningful way to annotate or manipulate the shared presentation. An attendee has to either take notes manually or open a separate program to record notes, which is often difficult to fit within the same screen as the shared presentation. This also results in a plurality of discontinuous files that the attendee needs to track. Annotating the presentation within the presentation creating program is difficult, may deteriorate the original presentation, and as described above, requires the attendee to have a copy of the presentation software.

As illustrated above, there is currently no meaningful way to share presentation content between a plurality of portable electronic devices during an in person meeting. The ever-expanding reach of smart portable devices has recently extended to building automation. Smart phones and tablets are increasingly providing convenient and varied control options for residential and commercial buildings. While the introduction of smart portable devices to home automation has had a noticeable positive impact, existing systems do not fully leverage the capabilities of current generation smart phones and tablets. One such capability is short range communication technologies such as near field communication (NFC) or Bluetooth.

NFC is a set of standards for short-range wireless communication technology that employs magnetic field induction to enable communication between electronic devices in close proximity. The technology allows an NFC-enabled device to communicate with another NFC-enabled device or to retrieve information from an NFC tag. This enables users to perform intuitive, safe, contactless transactions, access digital content and connect electronic devices simply by touching or bringing devices into close proximity.

NFC operates in the standard unlicensed 13.56 MHz frequency band over a range of around 2-4 cm and offers data rates in the range of at least 106 kbits/s to 424 kbit/s. NFC standards cover communication protocols and data exchange formats and are based on existing radio frequency identification (RFID) standards. The standards include ISO/IEC 18092 and those defined by the NFC Forum, a non-profit industry organization which promotes NFC and certifies device compliance. There are two modes of operation covered by the NFC standards: active and passive. In active mode, both communicating devices are capable of transmitting data. Each device alternately generates and deactivates their own electromagnetic field to transmit and receive data. In passive mode, only one device, the initiator devices, generates an electromagnetic field, while the target device, typically an NFC tag, modulates the electromagnetic field to transfer data. The NFC protocol specifies that the initiating device is responsible for generating the electromagnetic field. In this mode, the target device may draw its operating power from the initiator-provided electromagnetic field.

Bluetooth is a set of specifications for common short range wireless applications. They are written, tested & maintained by the Bluetooth SIG. The Bluetooth Low Energy technology, introduced in the Bluetooth Core Specification version 4.0, enables devices that can operate for months or even years on coin-cell batteries.

Bluetooth Low Energy operates in the same spectrum range (2402-2480 MHz) as the "classic" Bluetooth technology, but uses a different set of channels. Instead of Bluetooth technology's seventy-nine 1 MHz wide channels, Bluetooth Low Energy has forty 2 MHz wide channels. Additionally, Bluetooth Low Energy technology uses a different frequency hopping scheme than prior Bluetooth technology. These improvements make Bluetooth Low Energy ideally suited for discrete data transfer as opposed to streaming as in previous Bluetooth technologies.

There is now a need to fully leverage the short range communication capabilities of smart portable devices, such as smart phones and tablets, to provide more robust presentation sharing systems. Accordingly, a need has arisen for systems, methods, and modes that provide quick and simple pairing of the meeting presenter's and attendees' portable electronic devices with the presentation system, allowing meeting presenters to present presentation content from their electronic devices on a display screen, and allowing meeting attendees to view the presentation content at their electronic devices, as well as to annotate, manipulate, and further share the presentation content during a meeting.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for live presentation sharing between meeting presenter's and meeting attendees' portable electronic devices during a meeting that will obviate or minimize problems of the type previously described.

It is further an aspect of the embodiment to provide systems, methods, and modes that provide quick and simple pairing of the meeting presenter's and attendees' portable electronic devices with the presentation system to enable live presentation sharing.

It is also an aspect of the embodiments to provide systems, methods, and modes for presenting presentation content from meeting presenter portable electronic device on a meeting room display screen during a meeting It is also an aspect of the embodiments to provide systems, methods, and modes for viewing presentation content on meeting attendee portable electronic devices during a meeting.

It is also an aspect of the embodiments to provide systems, methods, and modes for annotating, manipulating and further sharing presentation content during a meeting by the meeting presenter and/or attendees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a system is provided for sharing presentation content displayed on a meeting room display during a meeting. The system comprises one or more presentation gateways each associated with a network address and configured for receiving presentation content and transmitting said presentation content to a meeting room display during a meeting. The system further comprises one or more RF beacons each associated with a presentation gateway and configured for broadcasting information comprising an application identifier. The system also comprises a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions. The one or more processor-executable instructions, when executed by the processor, cause acts to be performed comprising: (i) receiving from at least one of the one or more RF beacons the broadcasted information including the application identifier, (ii) transmitting the broadcasted information to an application associated with the application identifier, (iii) estimating a distance to the at least one of the one or more RF beacons according to a detected signal strength of the RF beacon broadcast, (iv) determining a location of the portable electronic device based on the distance to the at least one of the one or more RF beacons, (v) identifying a presentation gateway network address based on the determined location, (vi) pairing with a presentation gateway using the identified presentation gateway network address, and (vii) communicating with the paired presentation gateway to share presentation content, wherein the presentation content is displayed on a meeting room display during a meeting.

The portable electronic device may comprise a laptop computer, a smartphone, and a tablet. The presentation content may comprise text, graphics, images, photographs, videos, audio, animation, a slideshow, and any combinations thereof. Each of the one or more RF beacons may be configured for broadcasting the information according to a Bluetooth protocol or an NFC protocol.

According to some aspects of the embodiments, the broadcasted information of each of the one or more RF beacons comprises a network address of the presentation gateway associated with a respective RF beacon. Each presentation gateway may comprise a built-in web server associated with a unique network address. Each presentation gateway network address may comprise an IP address, an URI address, an URL address, a host name, and any combination thereof. The location of the portable electronic device can be determined by identifying a nearest RF beacon by comparing the detected signal strengths of the at least one of the one or more RF beacons and identifying the strongest received signal, and the presentation gateway network address can be identified by identifying the presentation gateway network address received from the nearest RF beacon. According to an embodiment, when the portable electronic device receives broadcasted information from only a single RF beacon, the portable electronic device pairs with a presentation gateway associated with the single RF beacon.

According to another aspect of the embodiments, the broadcasted information of each of the one or more RF beacons comprises a beacon ID, wherein each beacon ID is associated with a presentation gateway network address. The location of the portable electronic device can be determined by identifying a nearest RF beacon by comparing the detected signal strengths of the at least one of the one or more RF beacons and identifying the strongest received signal, and the presentation gateway network address can be identified by identifying the presentation gateway network address associated with a beacon ID received from the nearest RF beacon. The association between each beacon ID and presentation gateway network address can be stored in the memory of the portable electronic device. In another embodiment, the association between each beacon ID and presentation gateway network address is stored on a remote server, and the presentation gateway network address is identified by querying the remote server with a beacon ID received from the nearest RF beacon to identify an associated network address of a presentation gateway. According to an embodiment, the broadcasted information of each of the one or more RF beacons comprises a remote server network address, and wherein the portable electronic device connects to the remote server using the received remote server network address.

According to another aspect of the embodiments, the location of the portable electronic device is determined via trilateration. Specifically, the location of the portable electronic device is determined by: (i) determining location coordinates of the portable electronic device via trilateration, (ii) mapping the location coordinates on a floor plan, and (iii) identifying an area in which the portable electronic device is located. The floor plan may be stored in the memory of the portable electronic device or a remote server. The system may further comprise one or more area records each associated with an area and comprising a network address of a presentation gateway installed in the area. The one or more area records may be stored in the memory of the portable electronic device or a remote server.

According to an aspect of the embodiments, the one or more processor-executable instructions cause further acts to be performed comprising: opening an application associated with the application identifier. In another embodiment, the one or more processor-executable instructions cause further acts to be performed comprising: (i) determining whether an application associated with the application identifier is present on the portable electronic device, (ii) upon determining that the application associated with the application identifier is not present on the portable electronic device, downloading the application based on the application identifier, and (iii) opening the application associated with the application identifier.

According to an aspect of the embodiments, the one or more processor-executable instructions cause further acts to be performed comprising: determining an access level of the user ID to the paired presentation gateway, wherein the access level comprises rules that restrict communication between the portable electronic device and the paired presentation gateway. According to another aspect, the one or more processor-executable instructions cause further acts to be performed comprising: (i) authenticating a user ID, (ii) determining an access level of an authenticated user ID to the paired presentation gateway, and (iii) providing an unauthenticated user ID limited predefined access level to the paired presentation gateway.

According to an aspect of the embodiments, the one or more processor-executable instructions cause further acts to be performed comprising: (i) receiving from a remote server a schedule of the determined location of the portable electronic device, (ii) identifying a scheduled meeting event that corresponds to a current date and time of day, (iii) accessing a list of meeting participants for the identified scheduled meeting event, (iv) determining whether the user ID matches a user ID in the list of meeting participants, (v) upon finding a match, pairing the portable electronic device with the presentation gateway, and (vi) upon not finding a match, preventing the portable electronic device to pair with the presentation gateway. In another embodiment, the one or more processor-executable instructions cause further acts to be performed comprising: (i) receiving from a remote server a schedule of the determined location of the portable electronic device; (ii) when a status indicator for the location is vacant for a current date and time of day, designating the status indicator for the location as booked after pairing the portable electronic device with the presentation gateway. The one or more processor-executable instructions may cause further acts to be performed comprising: prompting a user to indicate a length of time period the user wishes to use the location.

According to an aspect of the embodiments, the portable electronic device communicates with the paired presentation gateway to transmit presentation content to the paired presentation gateway for display on a meeting room display during a meeting. The portable electronic device may further display the presentation content on its display. According to an embodiment, the one or more processor-executable instructions cause further acts to be performed comprising: (i) displaying a user interface configured for allowing a user to navigate through the presentation content, and (ii) transmitting updated presentation content to the presentation gateway as the user navigates through the presentation content. The presentation content may be transmitted to the presentation gateway as a content data stream. In another embodiment, the one or more processor-executable instructions cause further acts to be performed comprising: (i) displaying the presentation content within a first window on the display of the portable electronic device, and (ii) sharing the presentation content that is being displayed within the first window with the presentation gateway. In an embodiment, a second window may be provided in proximity to the first window comprising a user interface configured for allowing a user to input notes.

According to an aspect of the embodiments, the one or more processor-executable instructions cause further acts to be performed comprising: (i) accessing a calendar application, (ii) accessing at least one scheduled meeting event associated with the calendar application, (iii) scanning the at least one scheduled meeting event to discover data files attached to the at least one scheduled meeting event, (iv) displaying to the user a list of the discovered data files, and (v) upon selection of a data file from the list of the discovered data files, transmitting the selected data file to the presentation gateway. The at least one scheduled meeting event can be identified by identifying at least one scheduled meeting event that corresponds to a current date and time of day. According to another aspect of the embodiments, the one or more processor-executable instructions cause further acts to be performed comprising: (i) receiving from a remote server a schedule of the discovered location of the portable electronic device, (ii) identifying a scheduled meeting event that corresponds to a current date and time of day, (iii) retrieving presentation content associated with the scheduled meeting event, and (iv) transmitting the presentation content to the paired presentation gateway for display on a meeting room display during a meeting.

According to an aspect of the embodiments, the portable electronic device communicates with the paired presentation gateway to receive from the paired presentation gateway presentation content displayed on a meeting room display, and wherein the portable electronic device displays said presentation content on its display.

According to another aspect of the embodiments, a system is provided for sharing presentation content displayed on a meeting room display during a meeting. The system comprises one or more presentation gateways each associated with a network address and configured for receiving presentation content and transmitting said presentation content to a meeting room display during a meeting. The system also comprises one or more RF beacons each associated with a presentation gateway and configured for broadcasting an application identifier and a network address of the associated presentation gateway. The system further comprises a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions. The one or more processor-executable instructions, when executed by the processor, cause acts to be performed comprising: (i) receiving from at least one of the one or more RF beacons the application identifier and network addresses of one or more presentation gateways, (ii) transmitting the network addresses of one or more presentation gateways to an application associated with the application identifier, (iii) estimating a distance to the at least one of the one or more RF beacons according to a detected signal strength of the RF beacon broadcast, (iv) determining a location of the portable electronic device based on the distance to the at least one of the one or more RF beacons and selecting an RF beacon associated with the location, (v) pairing with a presentation gateway associated with the selected RF beacon using a network address received from the selected RF beacon, and (vi) communicating with the paired presentation gateway to share presentation content, wherein the presentation content is displayed on a meeting room display during a meeting.

According to another aspect of the embodiments, a system is provided for sharing presentation content displayed on a meeting room display during a meeting. The system comprising one or more presentation gateways each associated with a meeting room and a network address and configured for receiving presentation content and transmitting said presentation content to a meeting room display during a meeting. The system also comprising one or more RF beacons each installed in a meeting room and configured for broadcasting an application identifier and a beacon ID. The system further comprising a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions. The one or more processor-executable instructions, when executed by the processor, cause acts to be performed comprising: (i) receiving from at least one of the one or more RF beacons the application identifier and beacon IDs, (ii) transmitting the beacon IDs to an application associated with the application identifier, (iii) estimating a distance to the at least one of the one or more RF beacons according to a detected signal strength of the RF beacon broadcast, (iv) determining a meeting room in which portable electronic device is located based on the distance to the at least one of the one or more RF beacons, (v) determining a network address of a presentation gateway associated with the determined meeting room, (vi) pairing with the presentation gateway associated with the determined meeting room using the determined network address, and (vii) communicating with the paired presentation gateway to share presentation content, wherein the presentation content is displayed on a meeting room display during a meeting.

According to another aspect of the embodiments, a system is provided for sharing presentation content displayed on a meeting room display during a meeting. The system comprising one or more presentation gateways each associated with a network address and configured for receiving presentation content and transmitting said presentation content to a meeting room display during a meeting. The system also comprising one or more RF beacons each associated with a presentation gateway and configured for broadcasting an application identifier and pairing information configured for identifying a network address of the associated presentation gateway. The system further comprising a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions. The one or more processor-executable instructions, when executed by the processor, cause acts to be performed comprising: (i) receiving from at least one of the one or more RF beacons the application identifier and pairing information, (ii) transmitting the pairing information to an application associated with the application identifier, (iii) estimating a distance to the at least one of the one or more RF beacons according to a detected signal strength of the RF beacon broadcast, (iv) determining a location of the portable electronic device based on the distance to the at least one of the one or more RF beacons and selecting an RF beacon associated with the location, (v) identifying a presentation gateway network address using the pairing information received from the selected beacon, (vi) pairing with a presentation gateway using the identified presentation gateway network address, and (vii) communicating with the paired presentation gateway to share presentation content, wherein the presentation content is displayed on a meeting room display during a meeting.

According to another aspect of the embodiments, a method is provided for sharing presentation content displayed on a meeting room display during a meeting comprising: (i) providing one or more RF beacons each associated with a presentation gateway and configured for broadcasting information comprising an application identifier; (ii) receiving from at least one of the one or more RF beacons the broadcasted information including the application identifier; (iii) transmitting the broadcasted information to an application associated with the application identifier; (iv) estimating a distance to the at least one of the one or more RF beacons according to a detected signal strength of the RF beacon broadcast; (v) determining a location of the portable electronic device based on the distance to the at least one of the one or more RF beacons; (vi) identifying a presentation gateway network address based on the determined location; (vii) pairing with a presentation gateway using the identified presentation gateway network address; and (viii) communicating with the paired presentation gateway to share presentation content, wherein the presentation content is displayed on a meeting room display during a meeting.

BRIEF DESCRIPTION OF DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
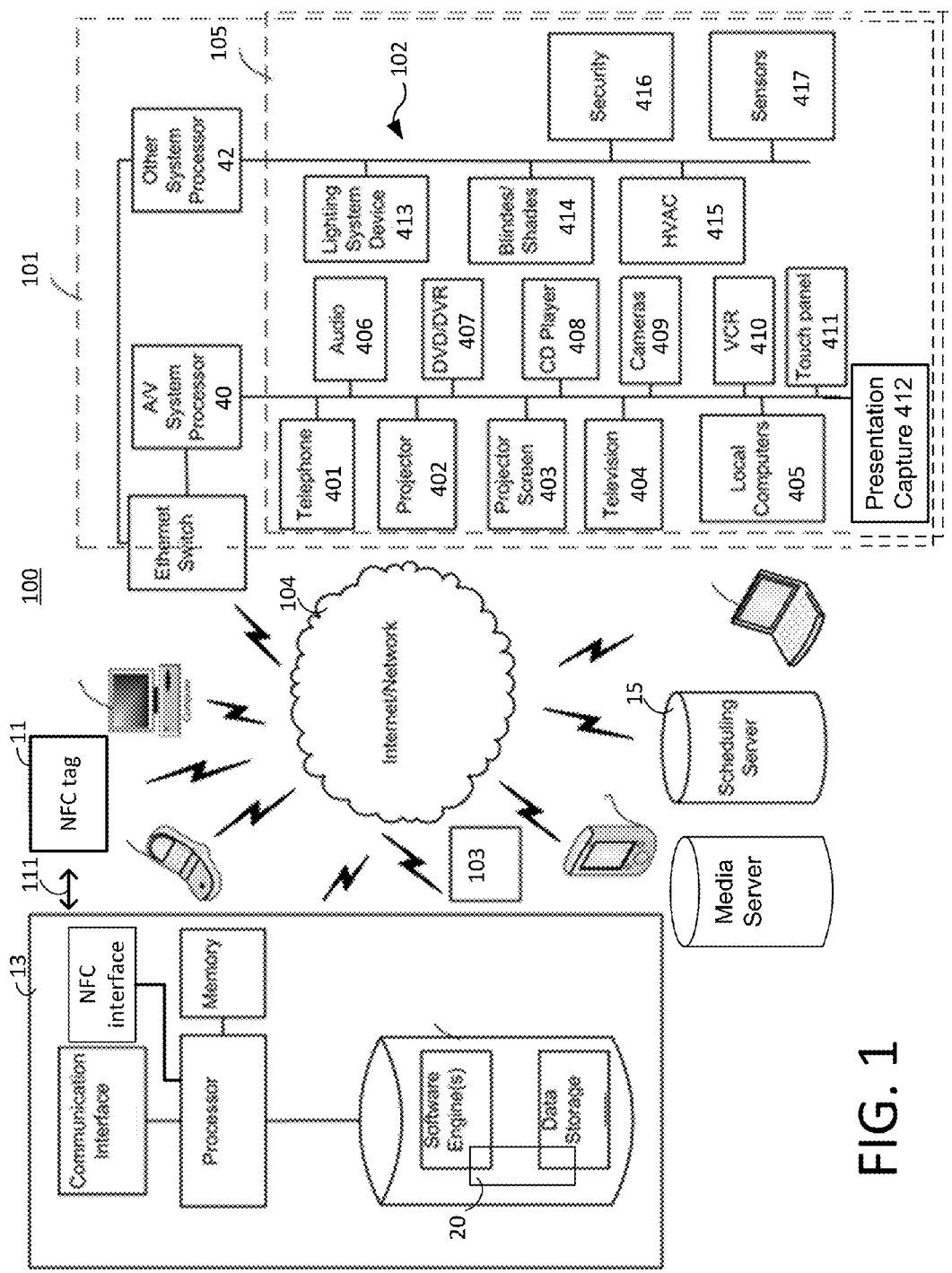

FIG. 1 illustrates a system for managing a conference room schedule in accordance with an illustrative embodiment of the invention.

Figure 2:
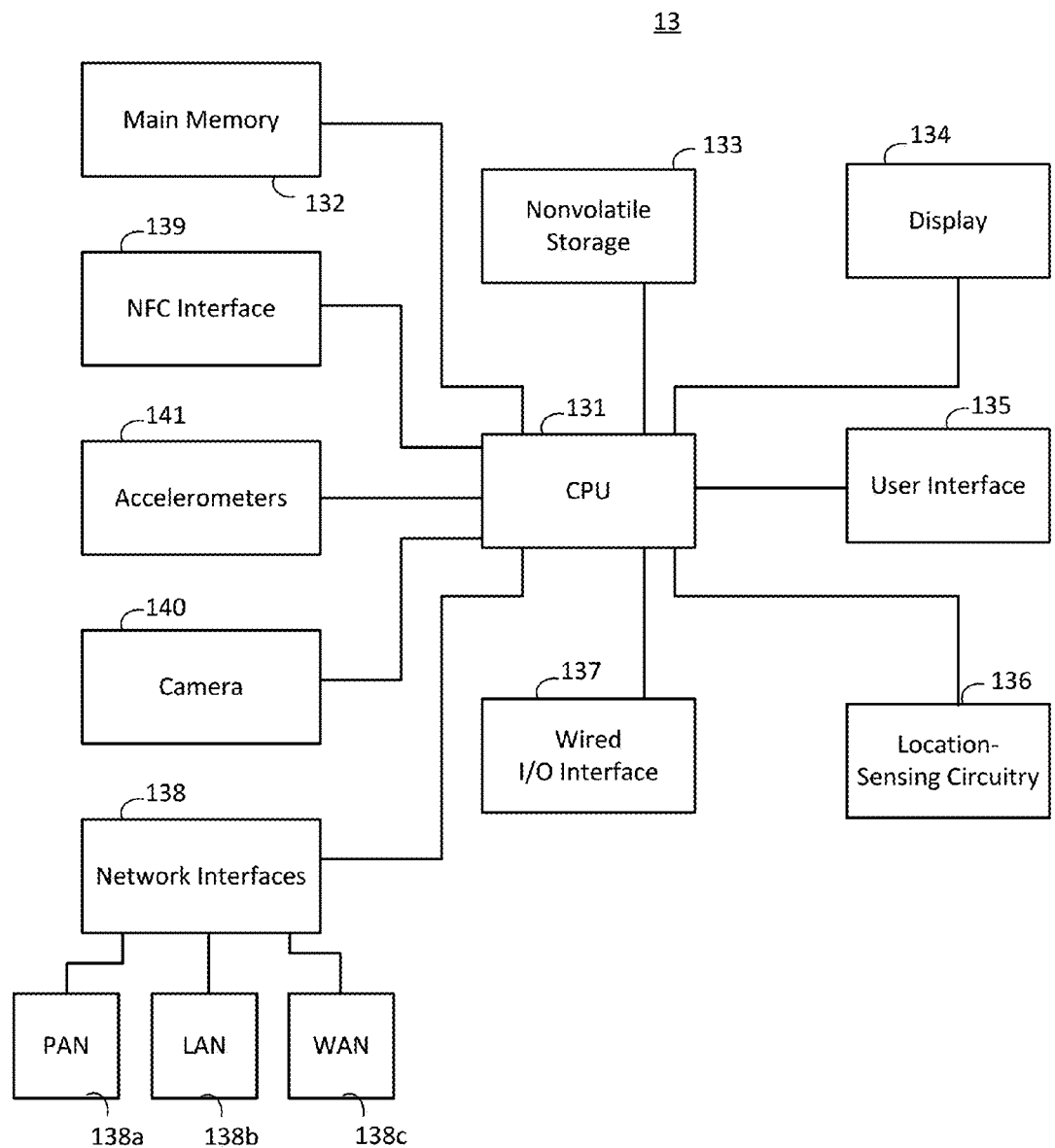

FIG. 2 is a block diagram of the portable electronic device of FIG. 1 in accordance with an illustrative embodiment of the invention.

Figure 3:
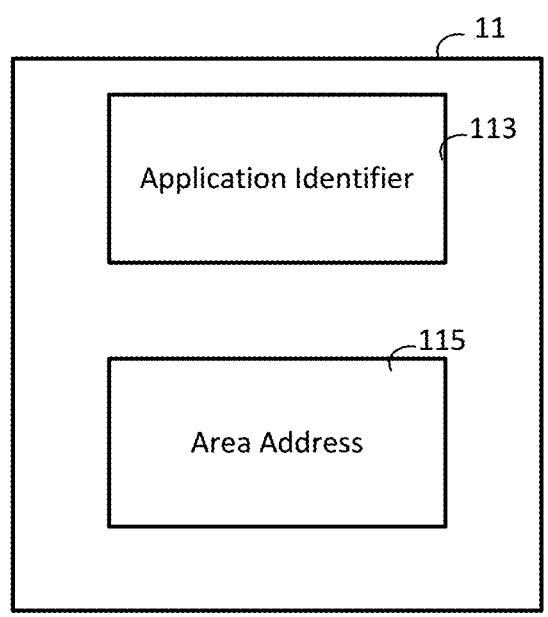

FIG. 3 is a block diagram of a near field communication tag employed in the system of FIG. 1 in accordance with an illustrative embodiment of the invention.

Figure 4:
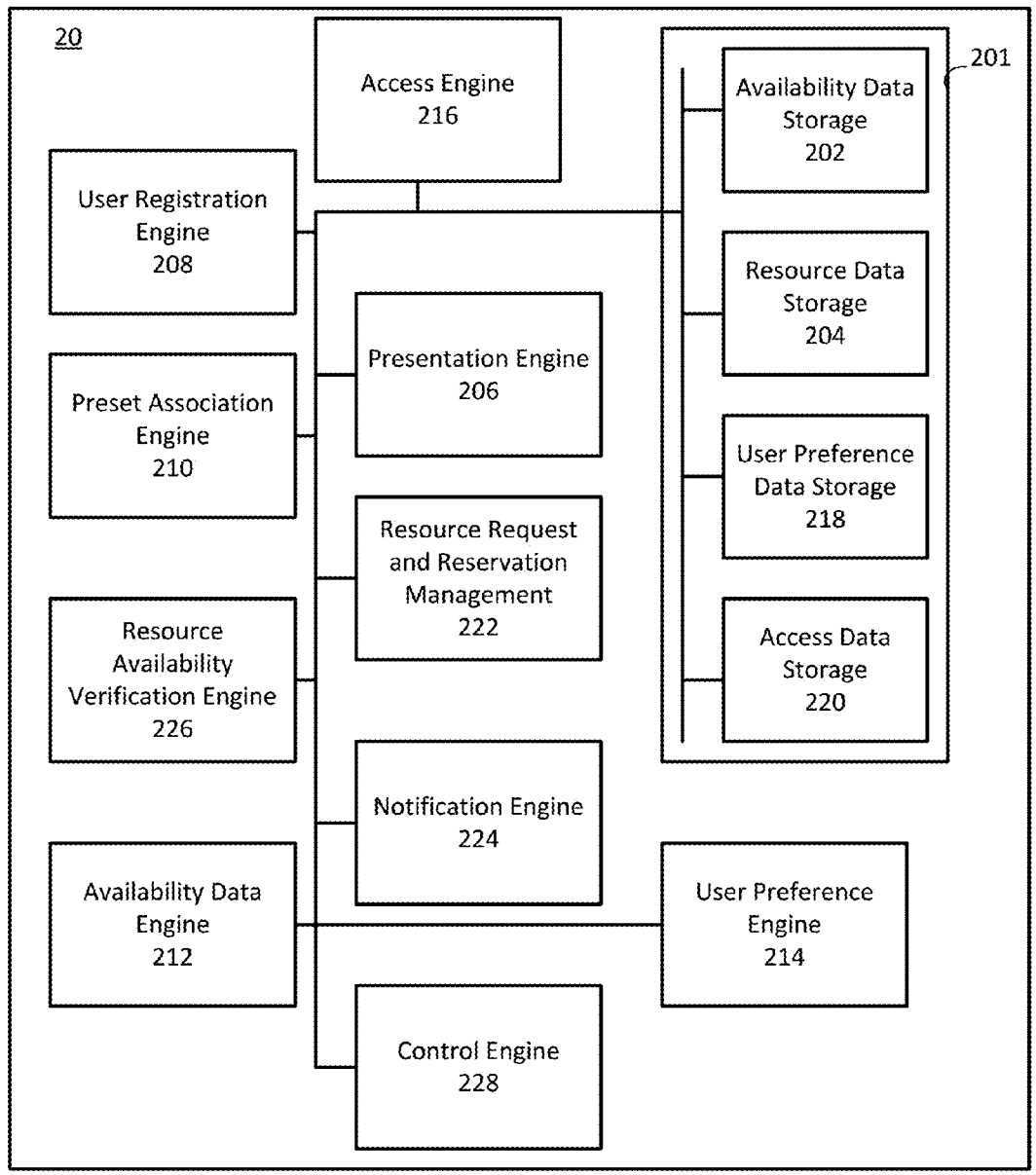

FIG. 4 illustrates a schematic diagram of a plurality of software engines and data storage areas for a scheduling application in accordance with an illustrative embodiment of the invention.

Figure 5:
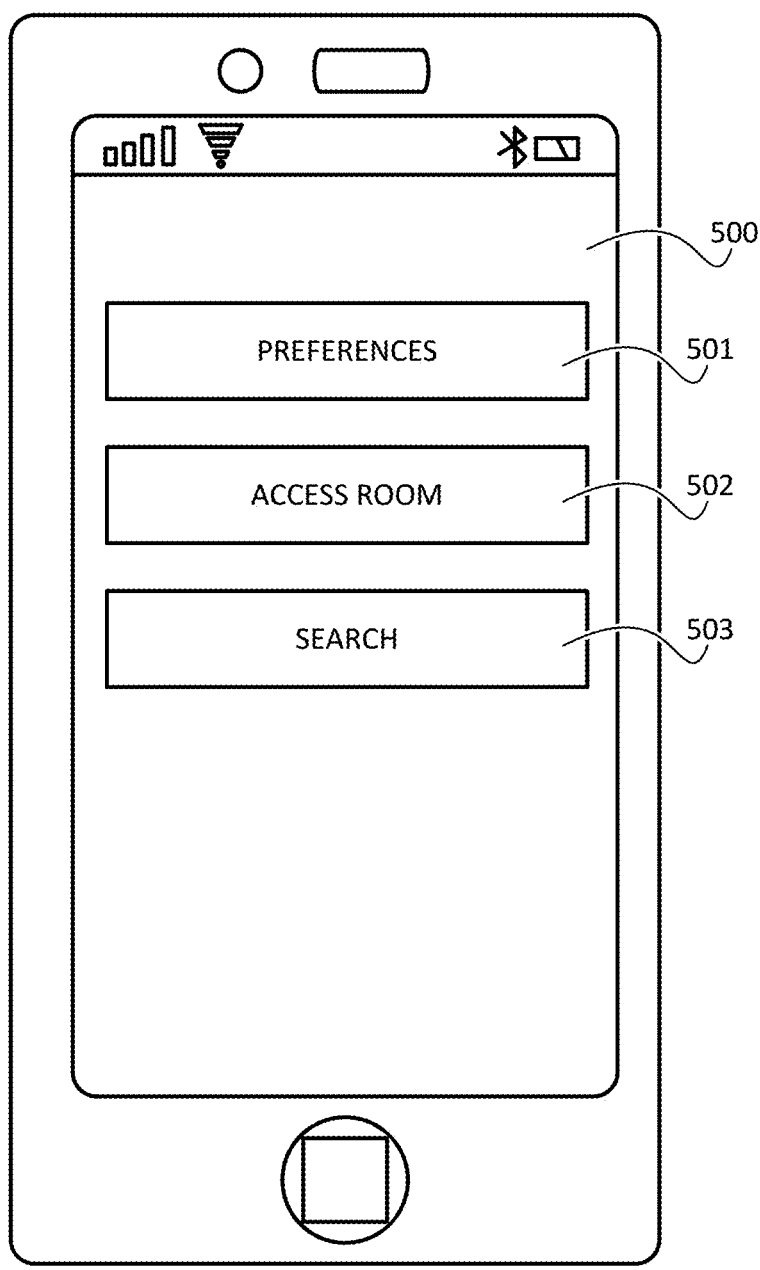

FIG. 5 is a schematic diagram depicting a main screen page 500 of the scheduling application for a system of managing a conference room schedule, in accordance with an illustrative embodiment of the invention.

Figure 6:
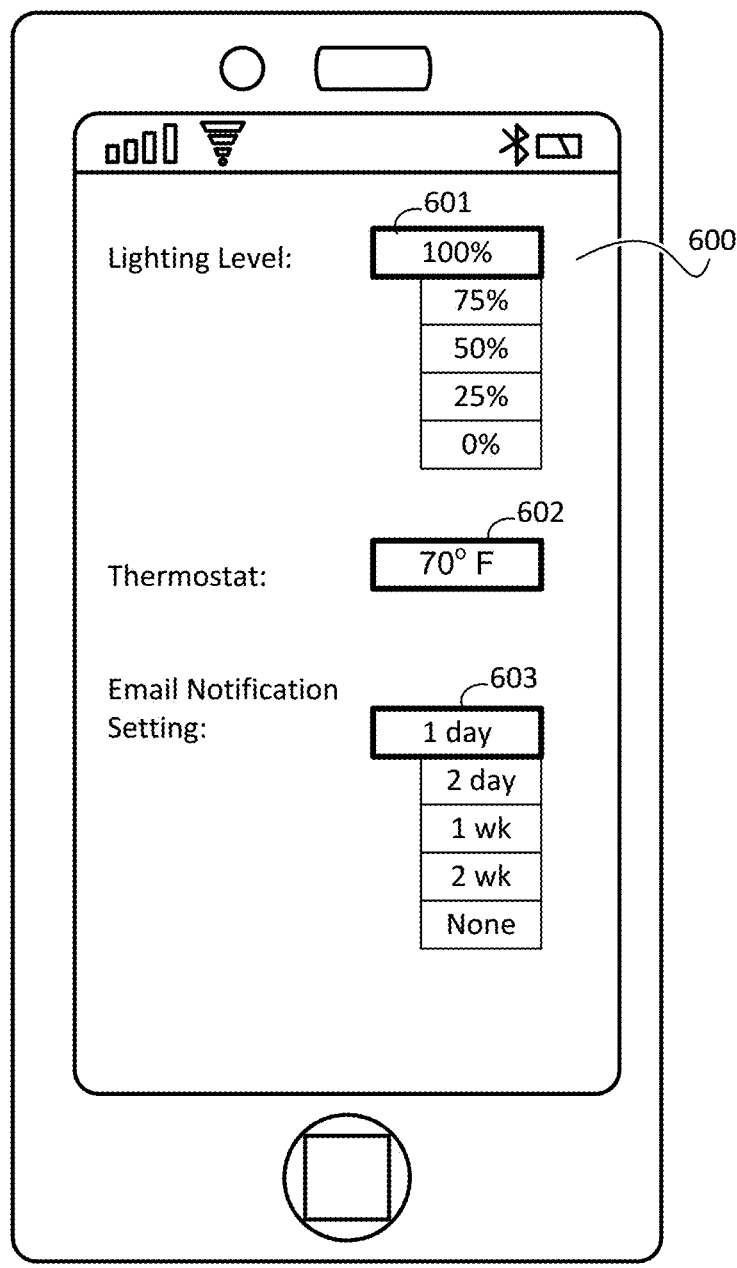

FIG. 6 is a schematic diagram depicting a preferences page of the scheduling application for a system of managing a conference room schedule, in accordance with an illustrative embodiment of the invention.

Figure 7:
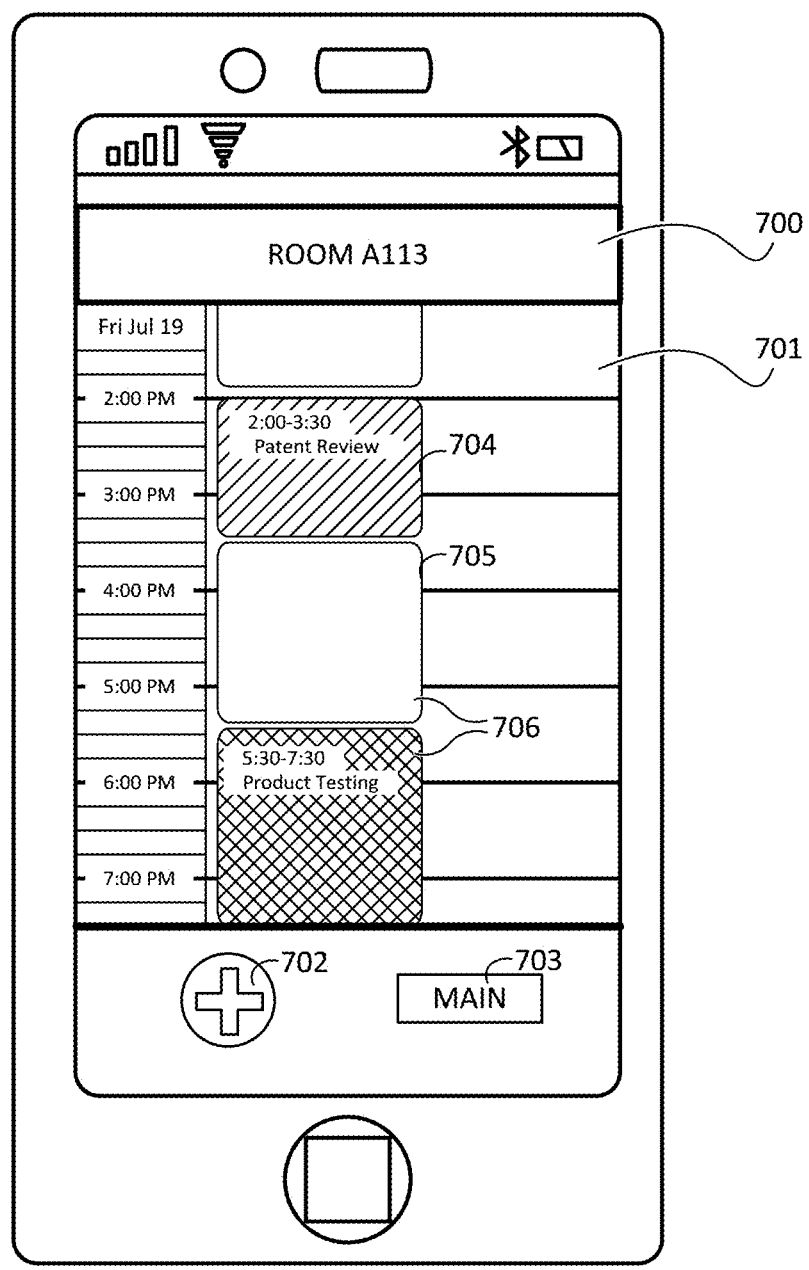

FIG. 7 is a schematic diagram depicting a schedule page of the scheduling application for a system of managing a conference room schedule, in accordance with an illustrative embodiment of the invention.

Figure 8:
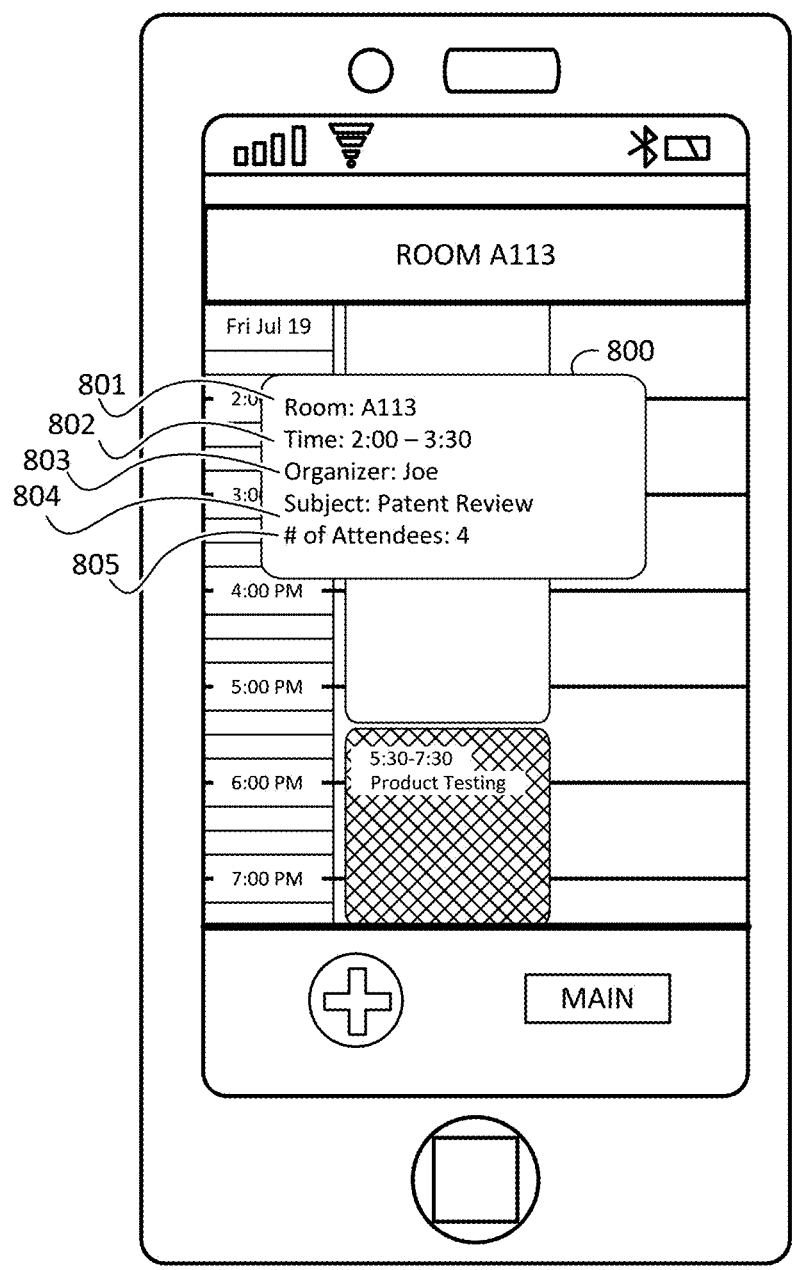

FIG. 8 is a schematic diagram depicting an information pop-up screen of the scheduling application for non-meeting organizers, in accordance with an illustrative embodiment of the invention.

Figure 9:
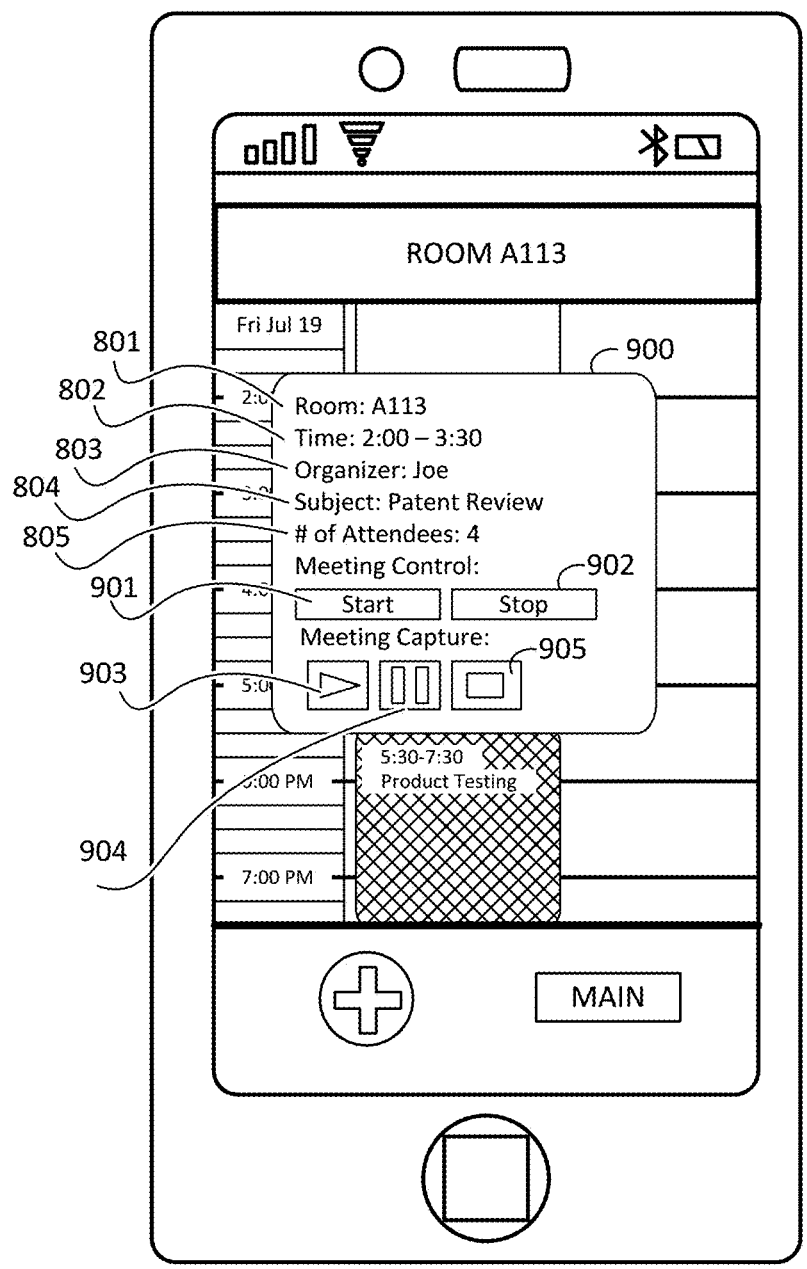

FIG. 9 is a schematic diagram depicting an information pop-up screen of the scheduling application for meeting organizers, in accordance with an illustrative embodiment of the invention.

Figure 10:
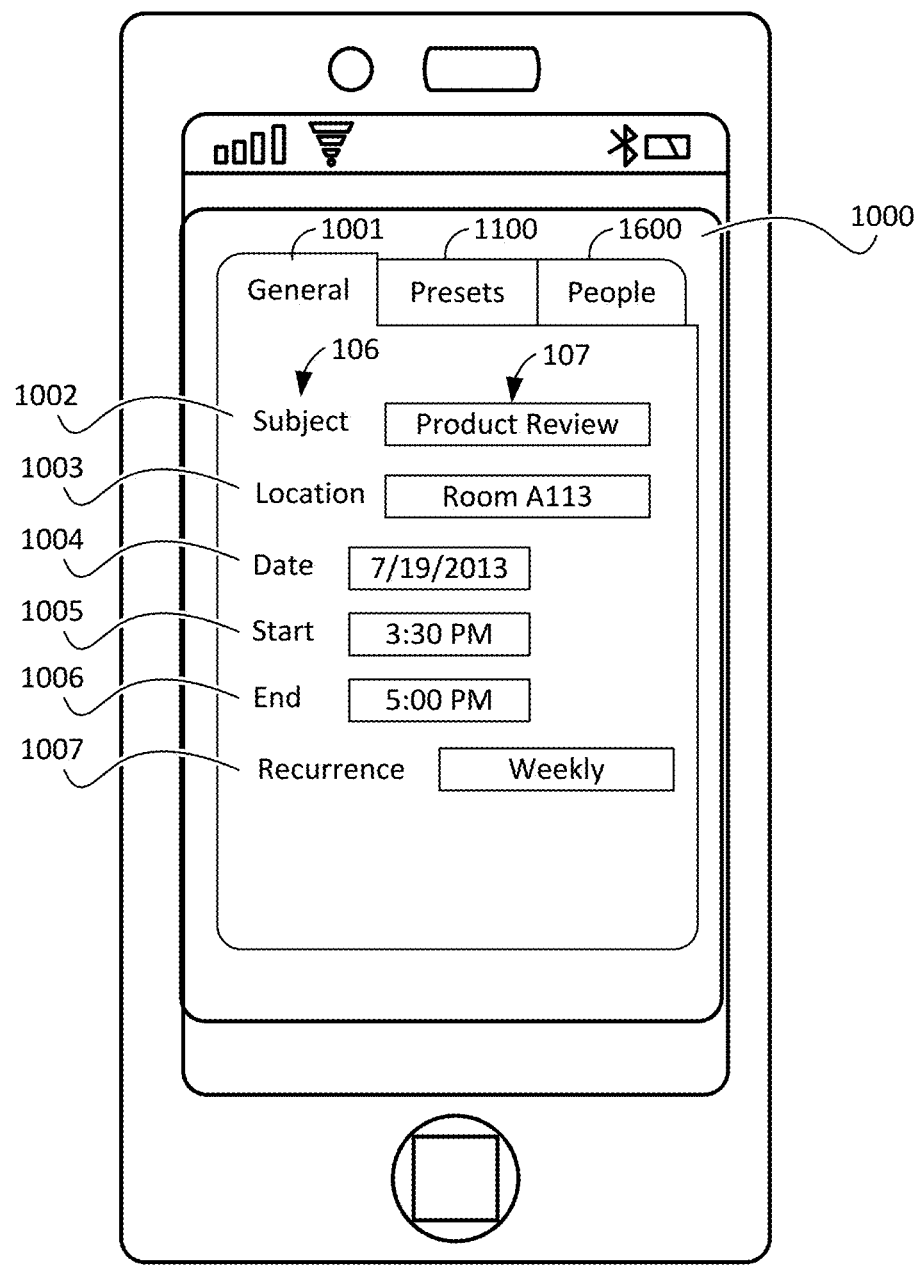

FIG. 10 is a schematic diagram depicting general information scheduling tab of the scheduling application, in accordance with an illustrative embodiment of the invention.

Figure 11:
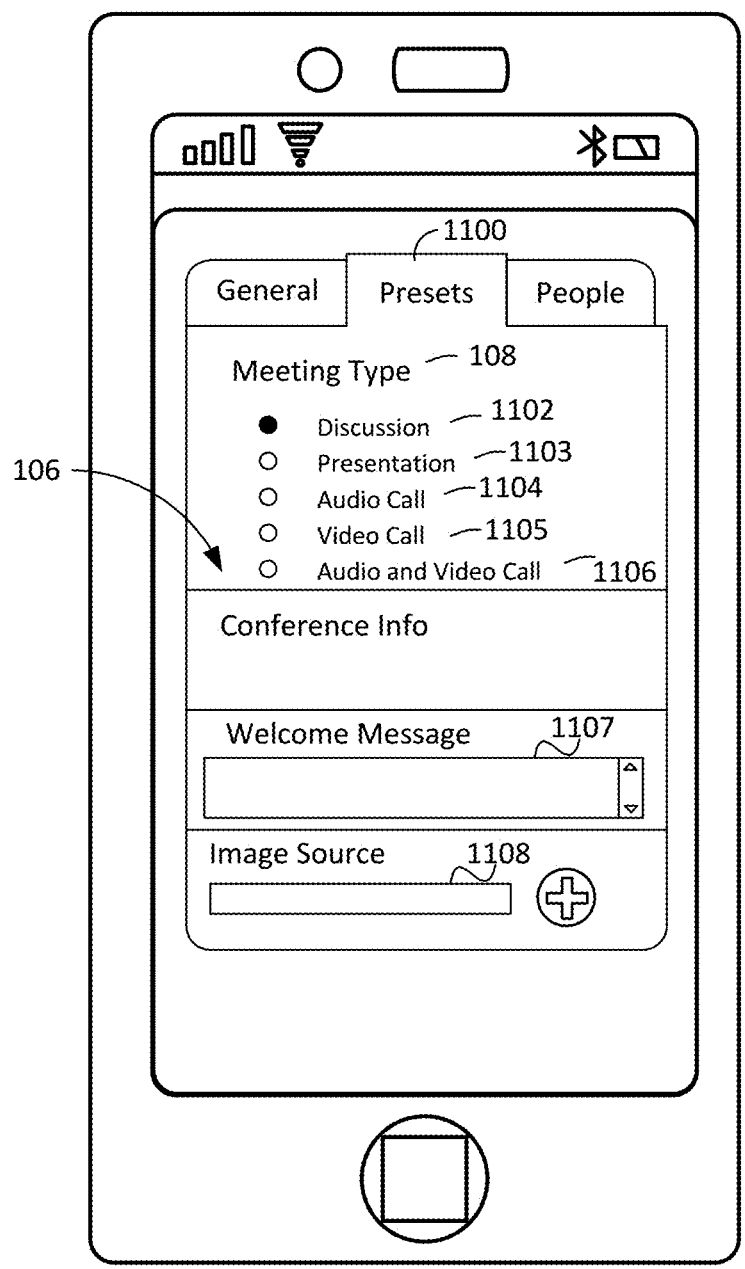

FIG. 11 is a schematic diagram depicting a presets tab of the scheduling application for a discussion, in accordance with an illustrative embodiment of the invention.

Figure 12:
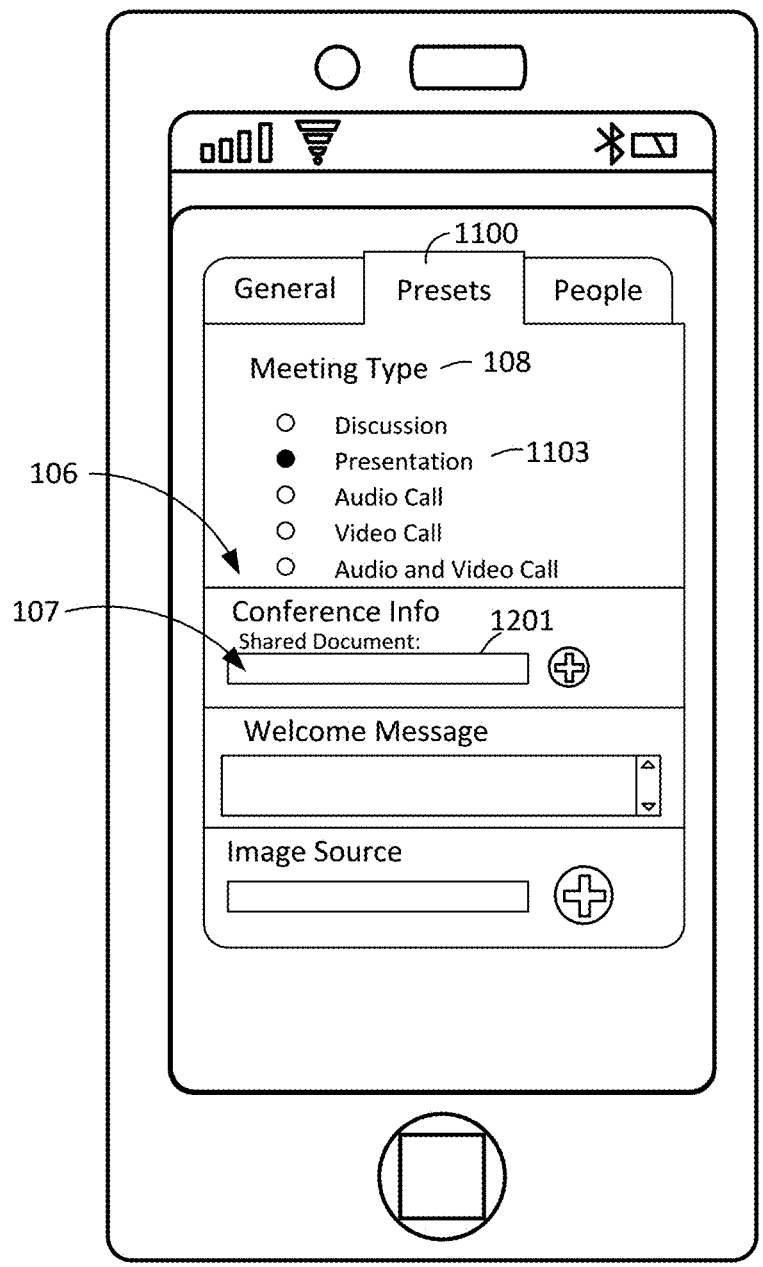

FIG. 12 is a schematic diagram depicting a presets tab of the scheduling application for a presentation, in accordance with an illustrative embodiment of the invention.

Figure 13:
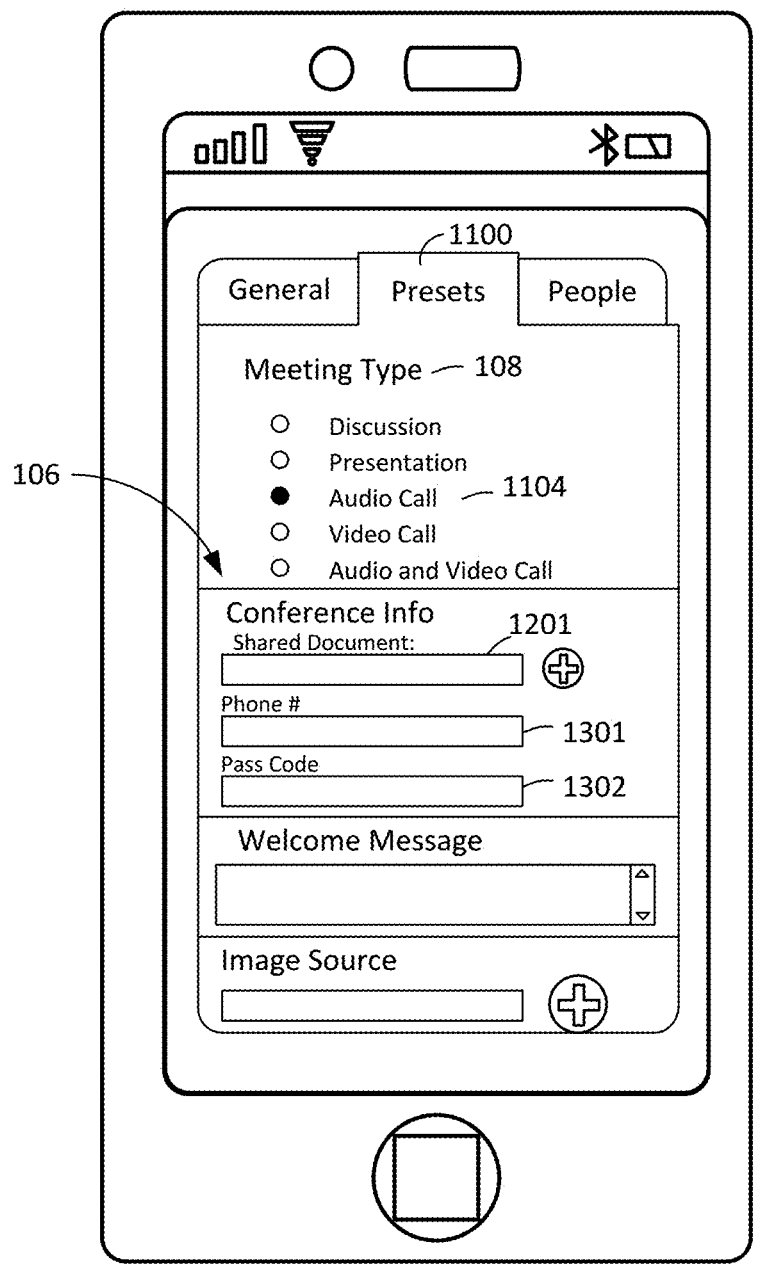

FIG. 13 is a schematic diagram depicting a presets tab of the scheduling application for an audio call, in accordance with an illustrative embodiment of the invention.

Figure 14:
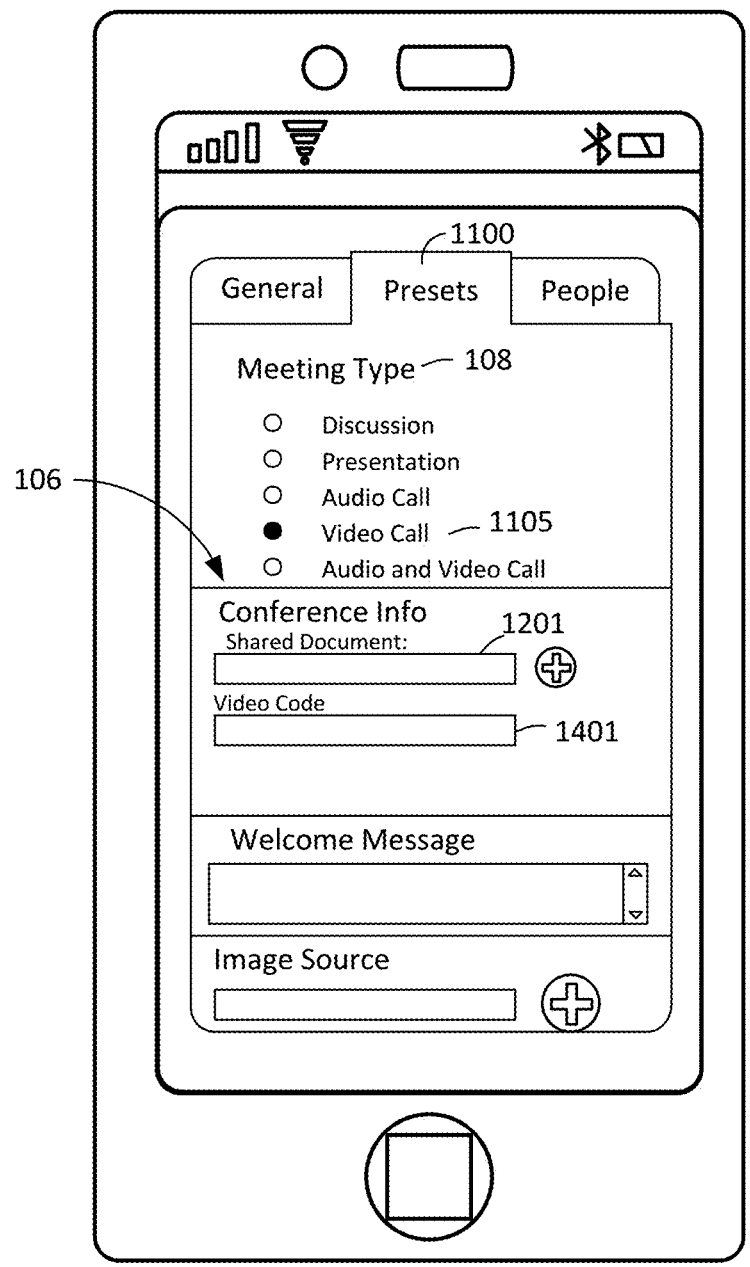

FIG. 14 is a schematic diagram depicting a presets tab of the scheduling application for a video call, in accordance with an illustrative embodiment of the invention.

Figure 15:
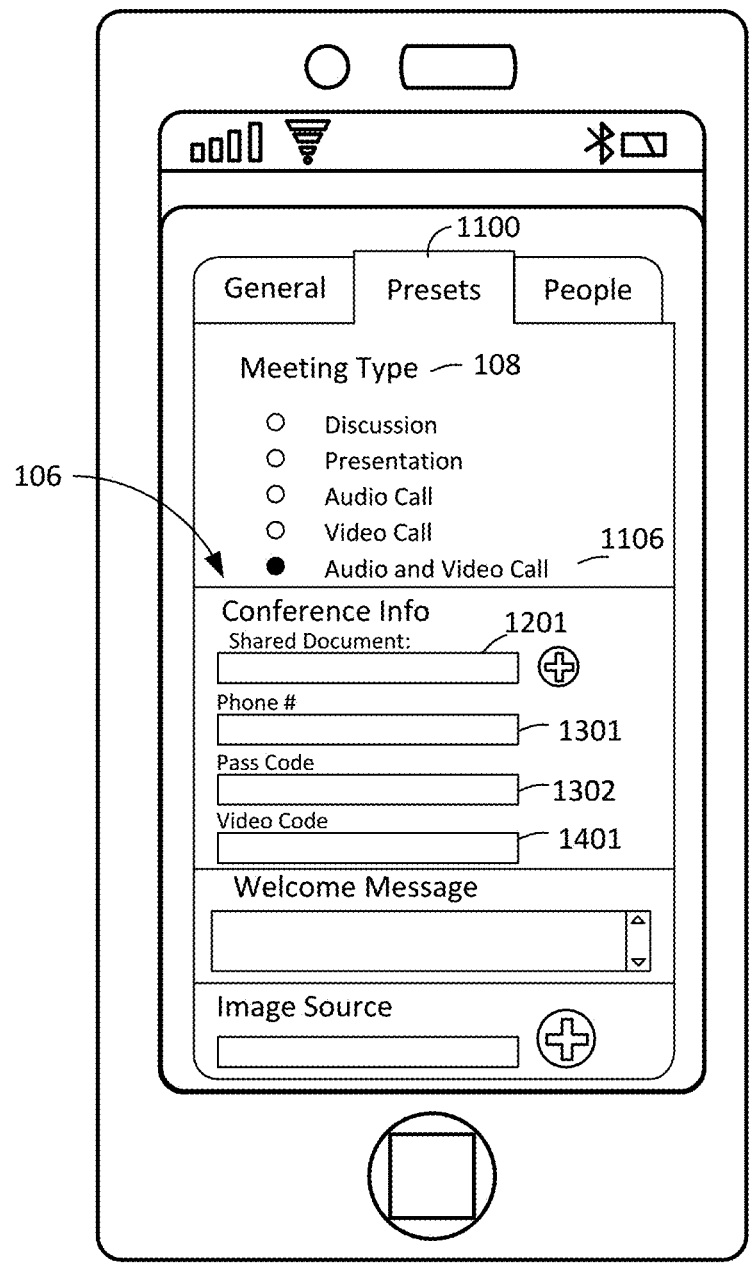

FIG. 15 is a schematic diagram depicting a presets tab of the scheduling application for an audio and video call, in accordance with an illustrative embodiment of the invention.

Figure 16:
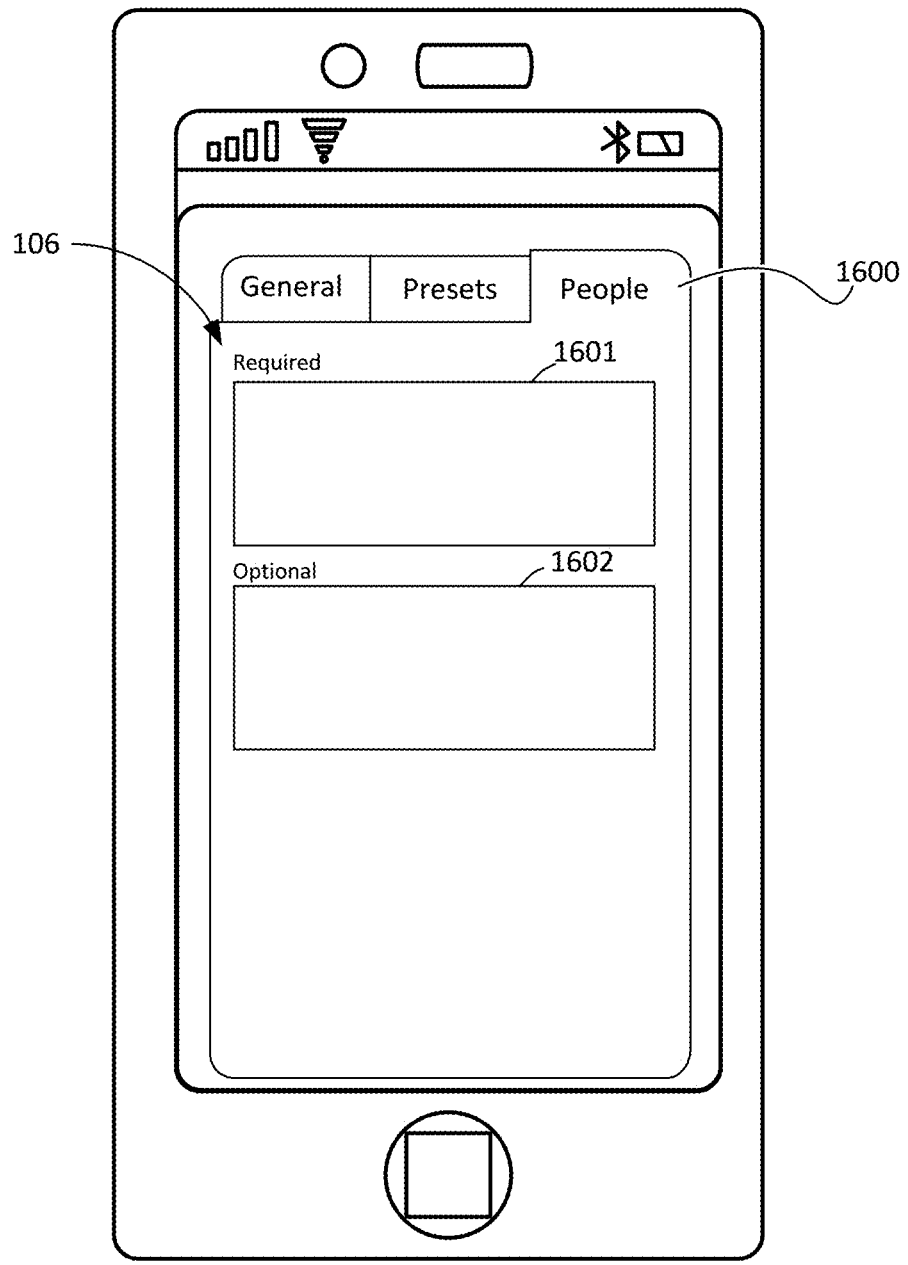

FIG. 16 is a schematic diagram depicting a people tab of the scheduling application, in accordance with an illustrative embodiment of the invention.

Figure 17:
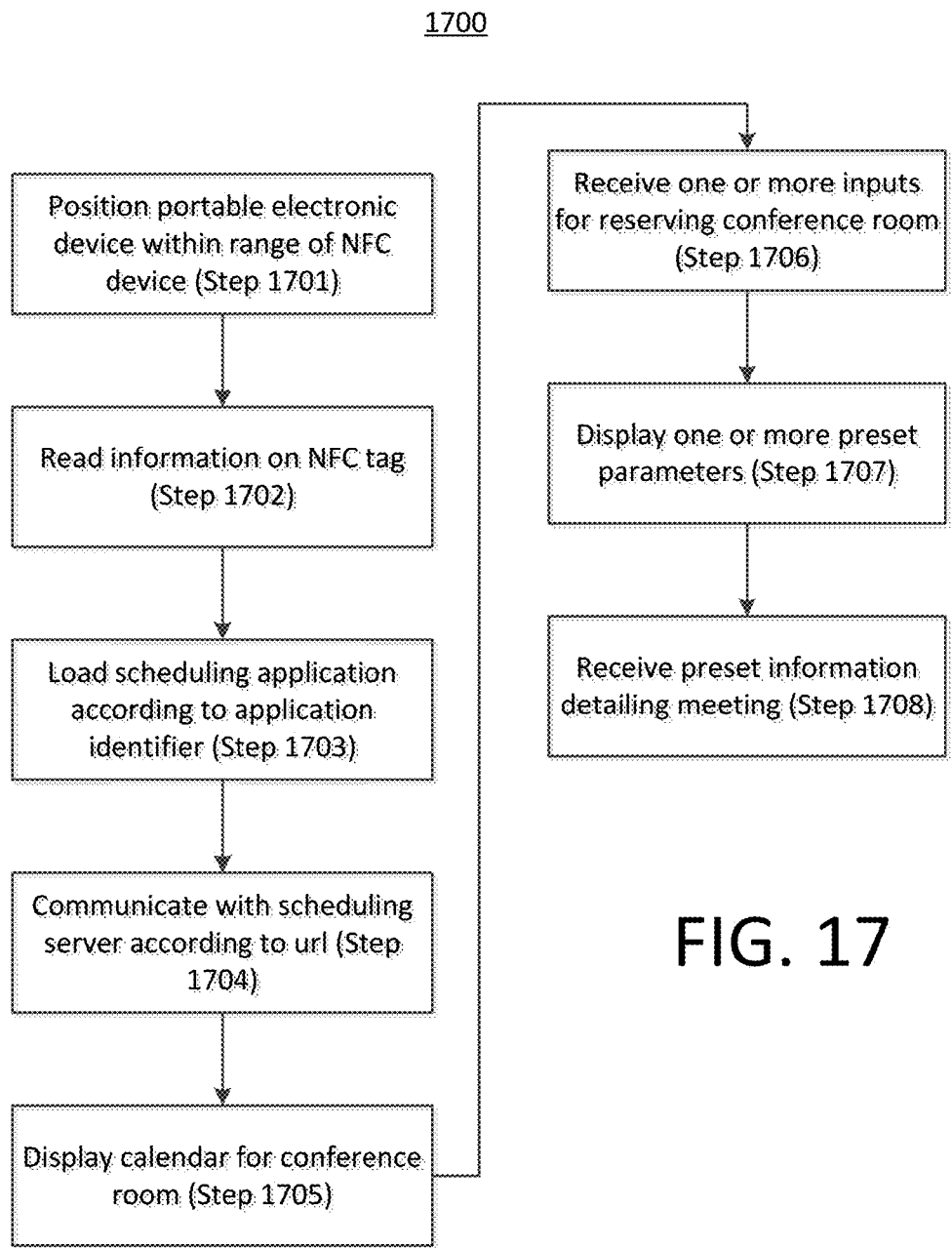

FIG. 17 is a flowchart showing steps for performing a method of accessing a conference room schedule, in accordance with an illustrative embodiment of the invention.

Figure 18:
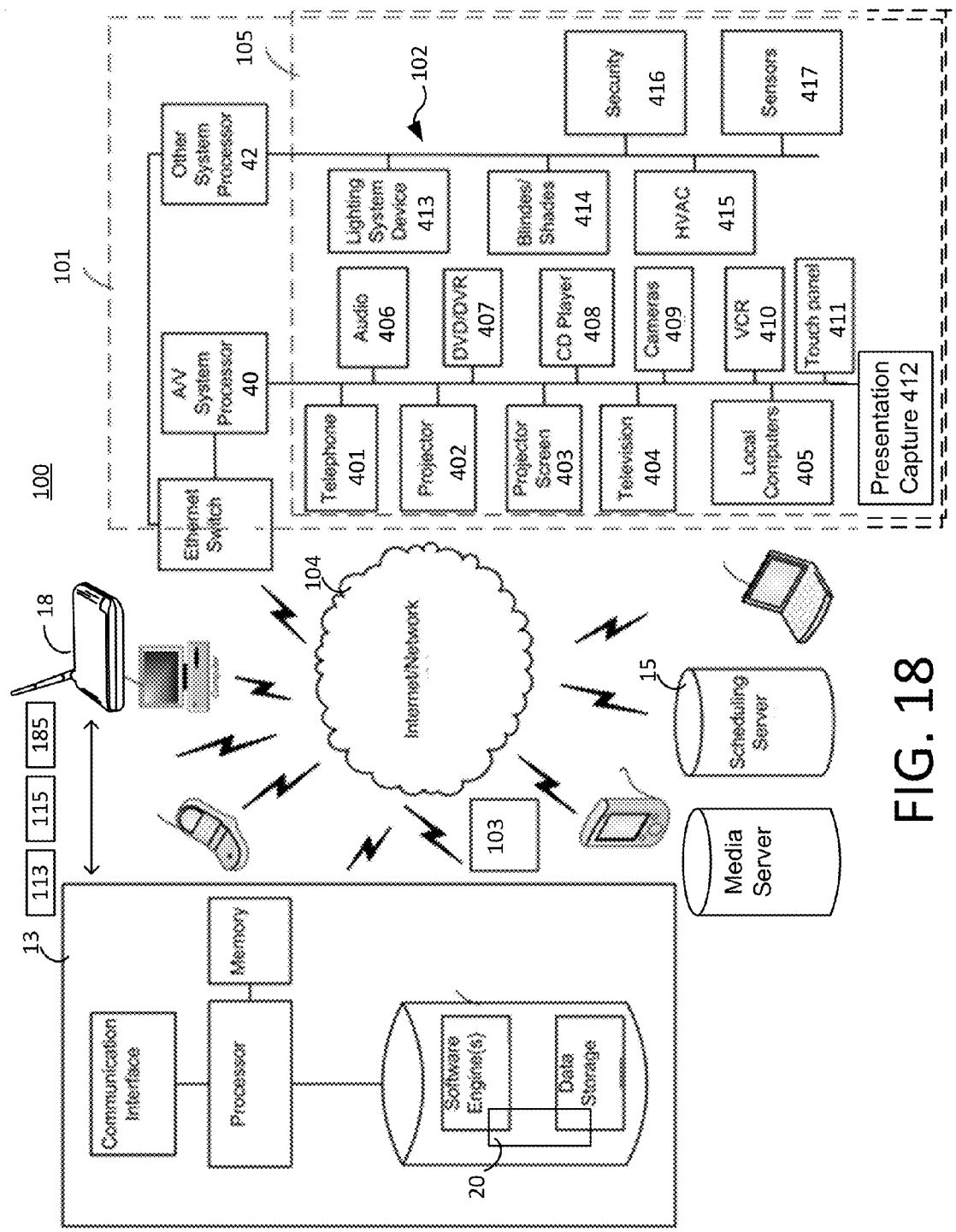

FIG. 18 illustrates an exemplary embodiment of a system for managing a conference room schedule via communication with an RF beacon, in accordance with an illustrative embodiment of the invention.

Figure 19:
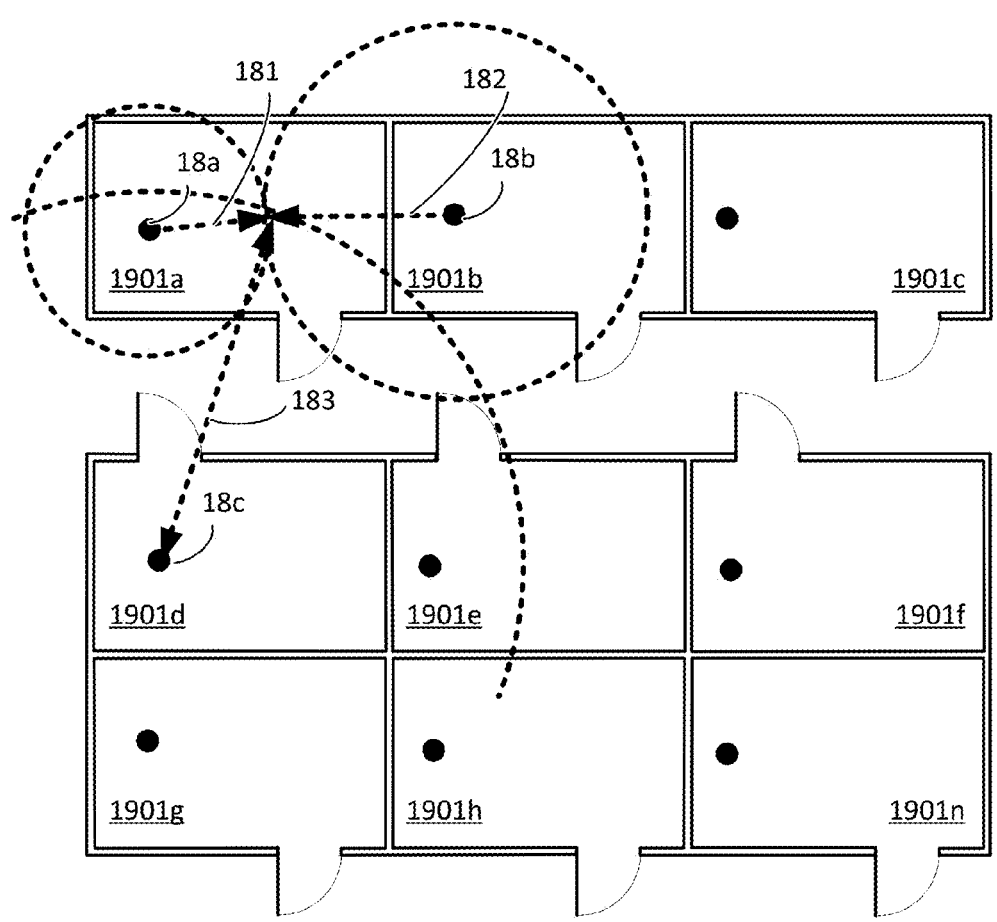

FIG. 19 shows a schematic of a facility with a plurality of rooms, each comprising an RF beacon, according to an illustrative embodiment of the invention.

Figure 20:
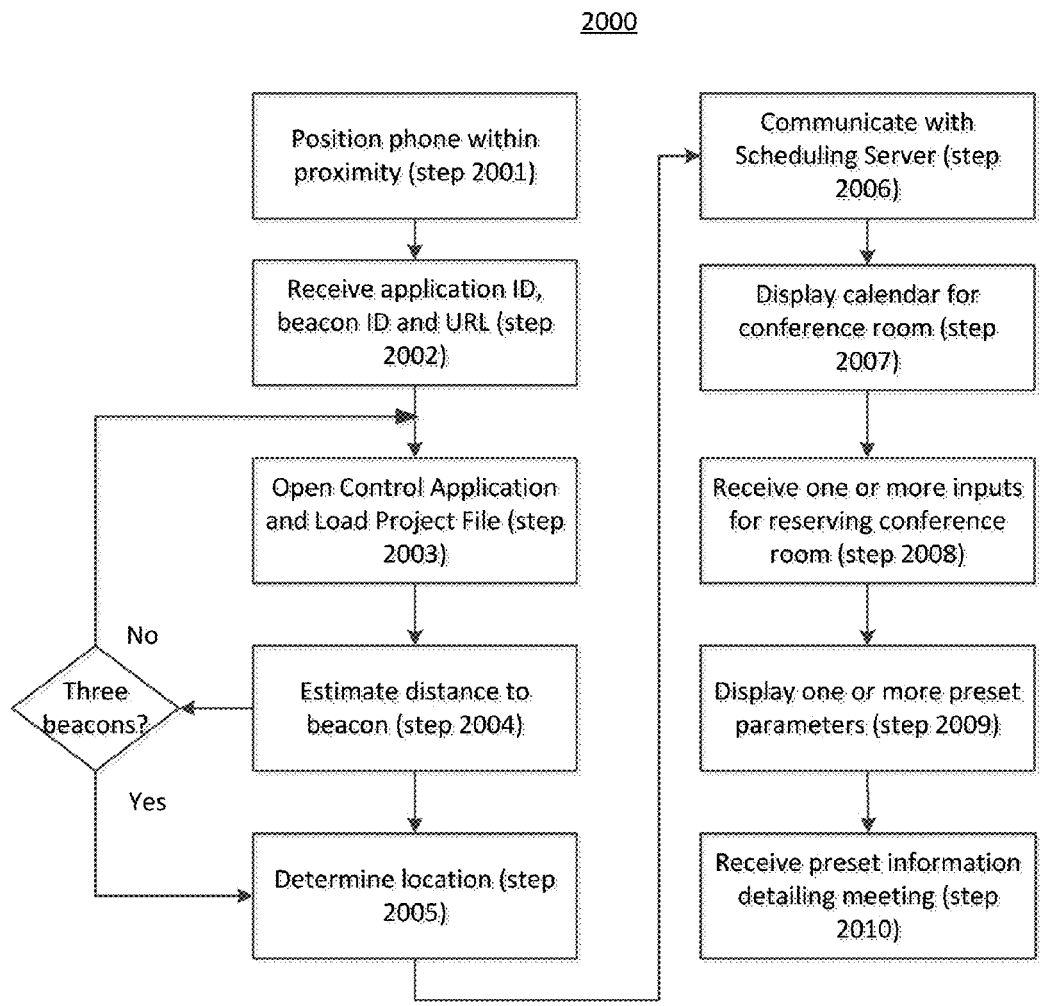

FIG. 20 is a flowchart showing steps for performing a method managing a conference room schedule via communication with an RF beacon, according to an illustrative embodiment of the invention.

Figure 21:
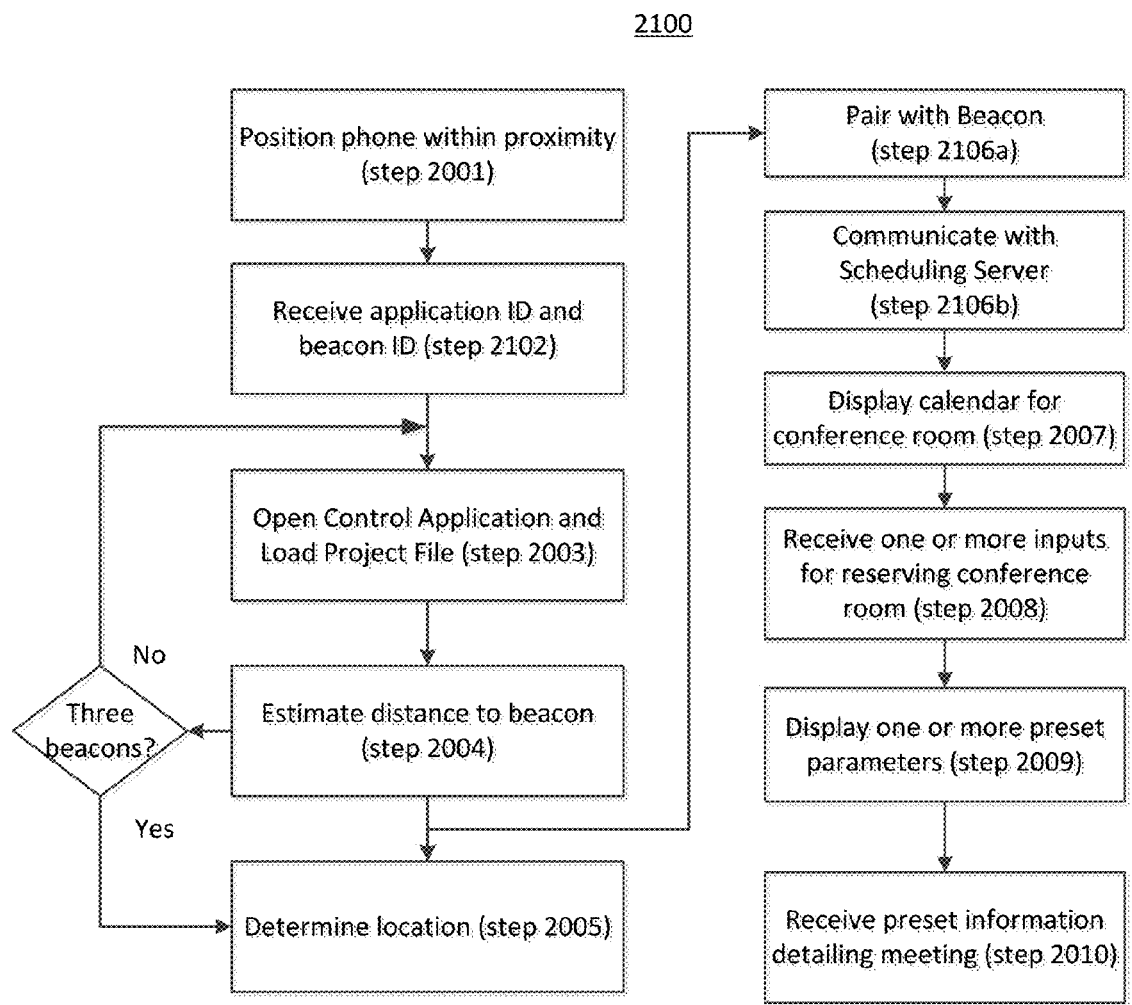

FIG. 21 is a flowchart showing steps for performing a method for managing a conference room schedule via communication with an RF beacon, according to an illustrative embodiment of the invention.

Figure 22A:
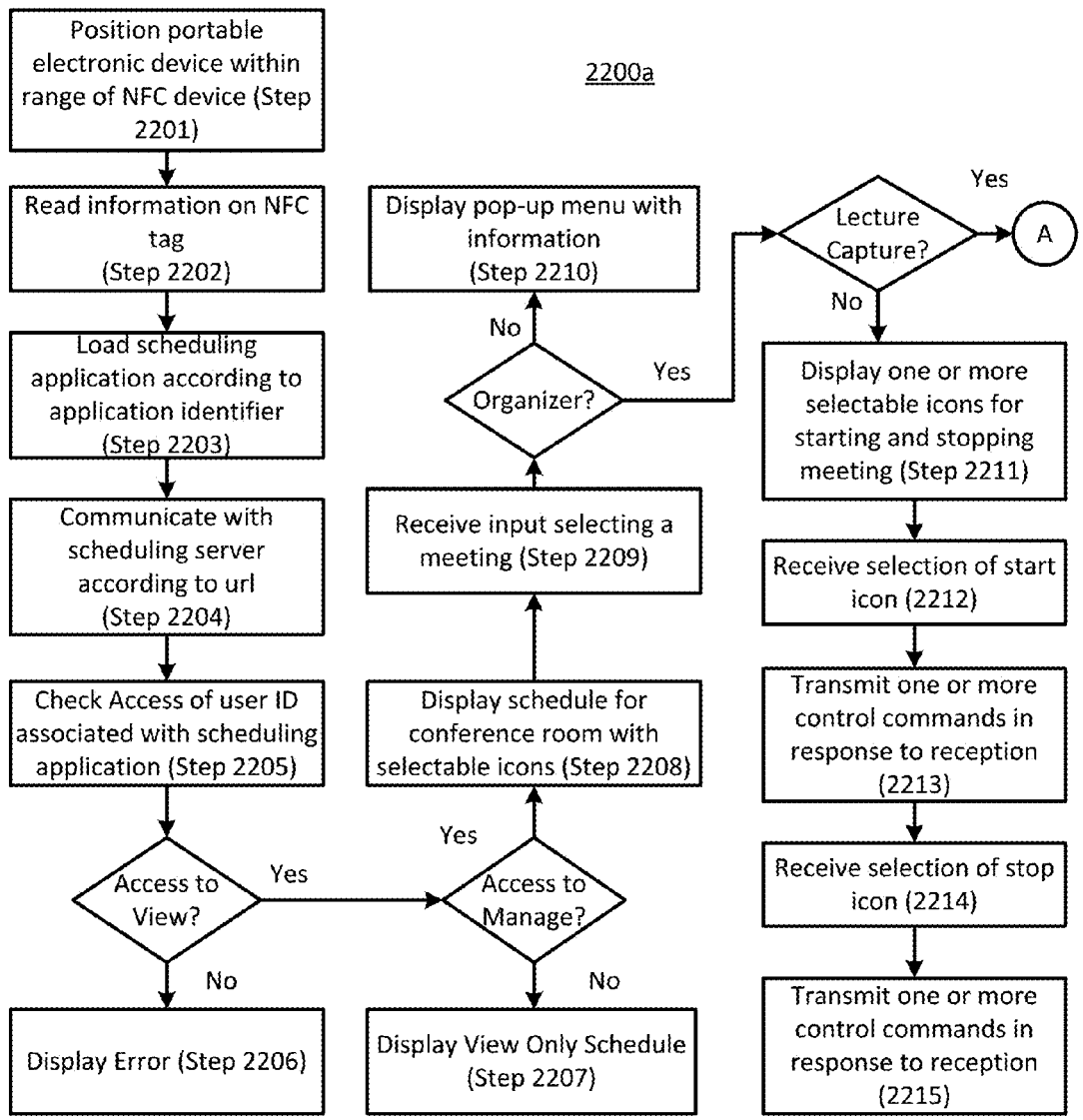

FIG. 22A is a portion of a flowchart showing steps for performing a method of accessing a conference room schedule, in accordance with an illustrative embodiment of the invention.

Figure 22B:
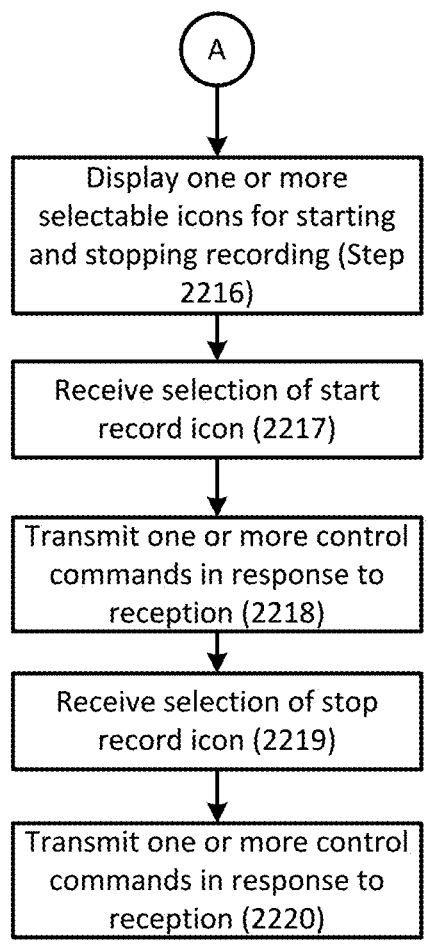

FIG. 22B is a portion of flowchart showing steps for performing a method of accessing a conference room schedule, in accordance with an illustrative embodiment of the invention.

Figure 23A:
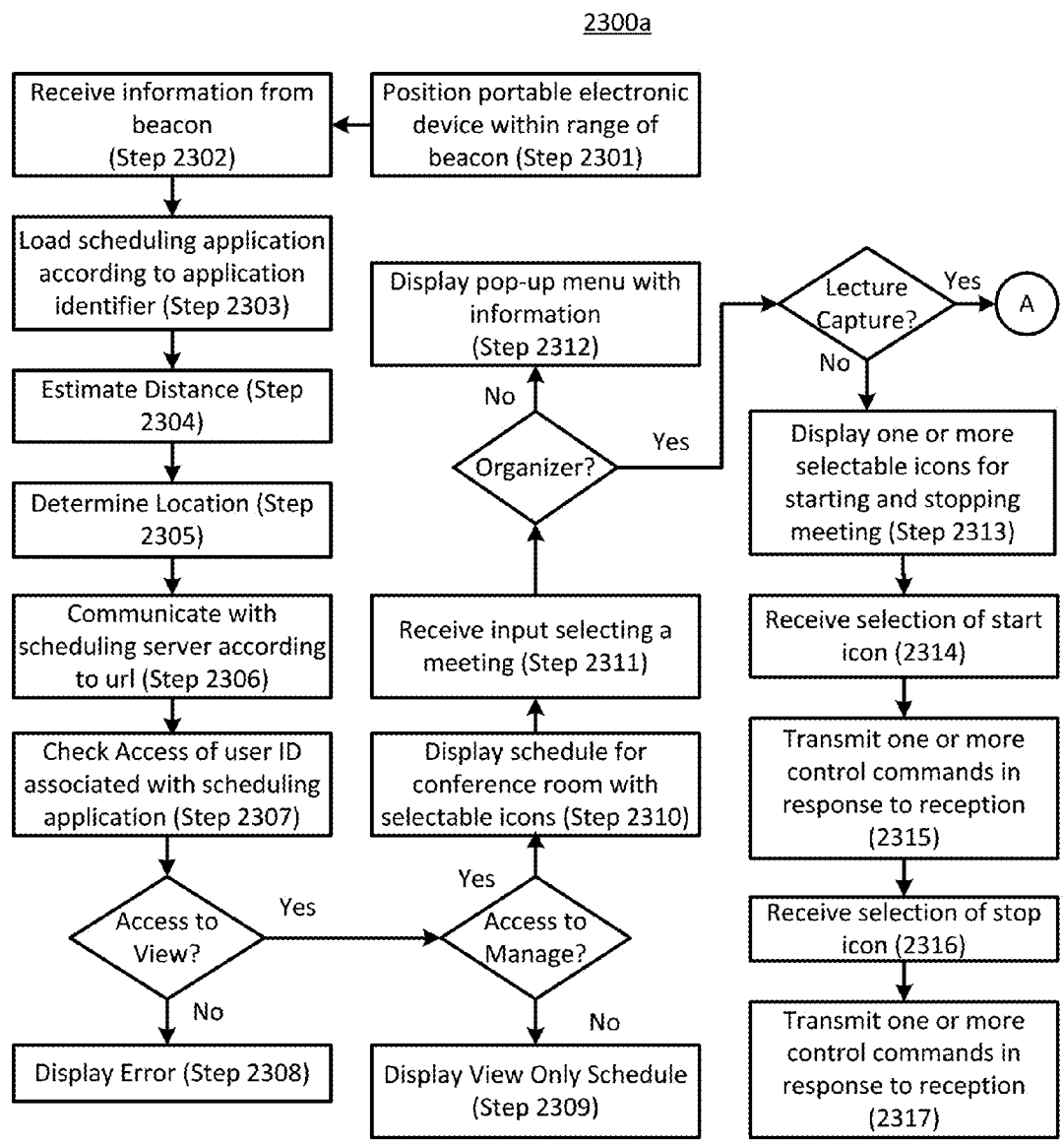

FIG. 23A is a portion of a flowchart showing steps for performing a method of accessing a conference room schedule, in accordance with an illustrative embodiment of the invention.

Figure 23B:
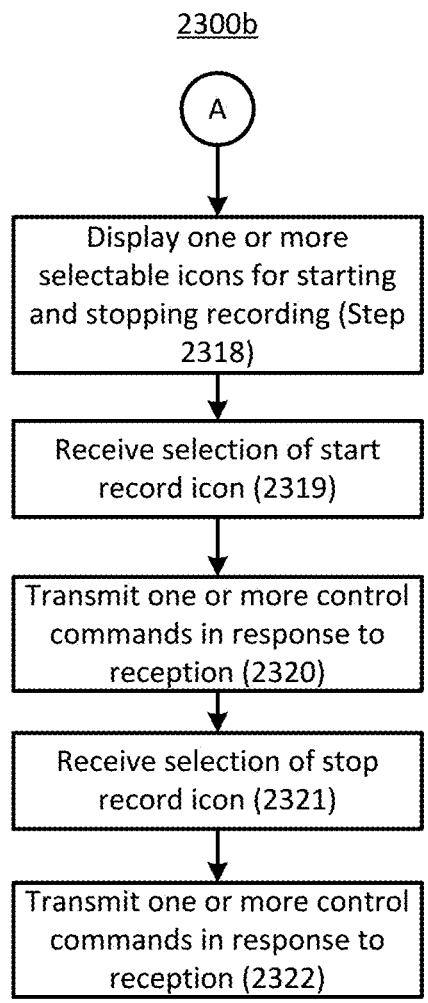

FIG. 23B is a portion of a flowchart showing steps for performing a method of accessing a conference room schedule, in accordance with an illustrative embodiment of the invention.

Figure 24:
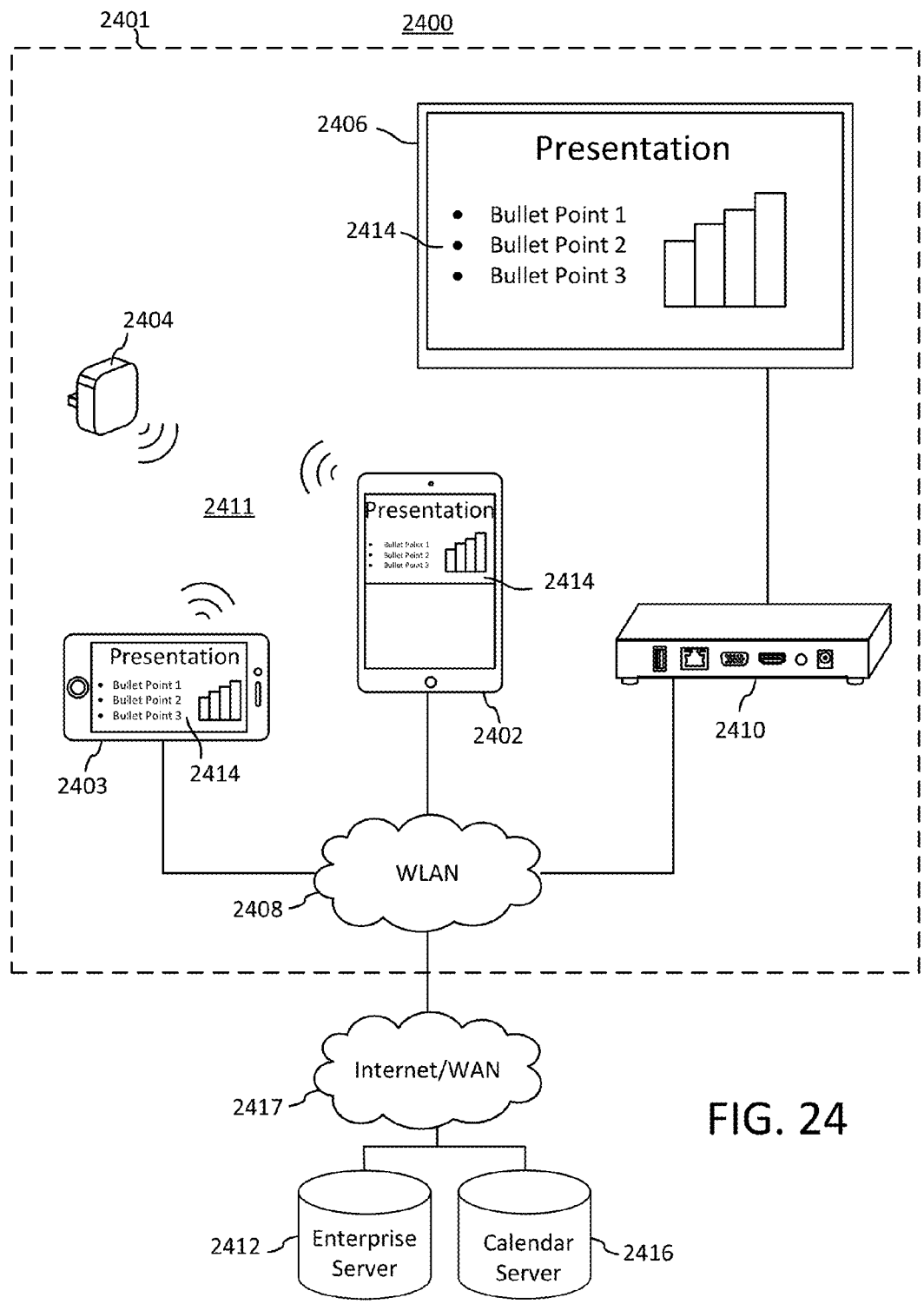

FIG. 24 illustrates a system for live presentation sharing between meeting presenter's and meeting attendees' portable electronic devices during a meeting in accordance with an illustrative embodiment.

Figure 25:
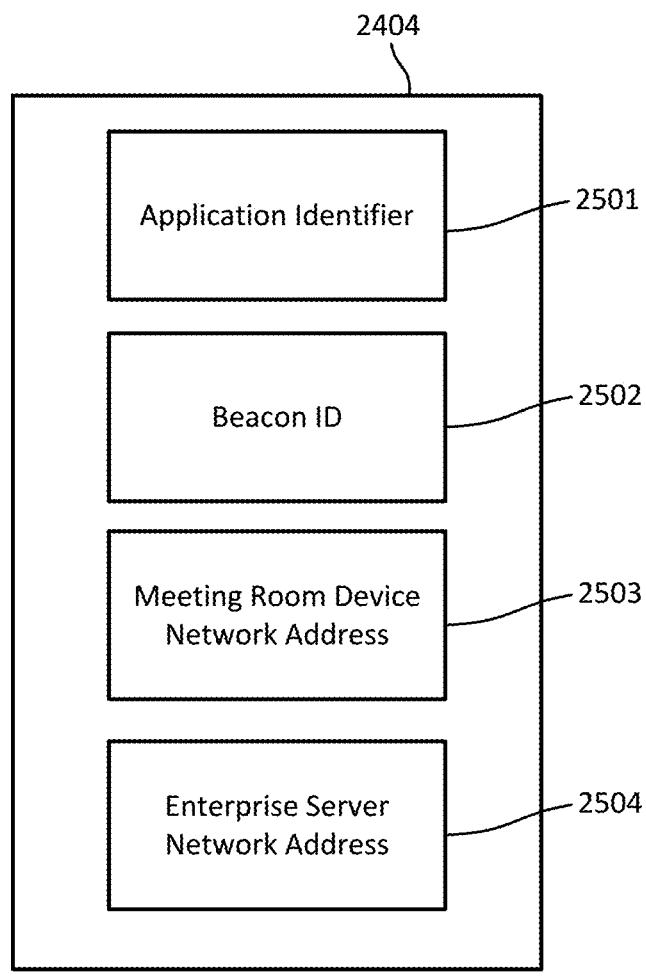

FIG. 25 is a block diagram of a radio frequency beacon employed in the system of FIG. 24 in accordance with an illustrative embodiment.

Figure 26:
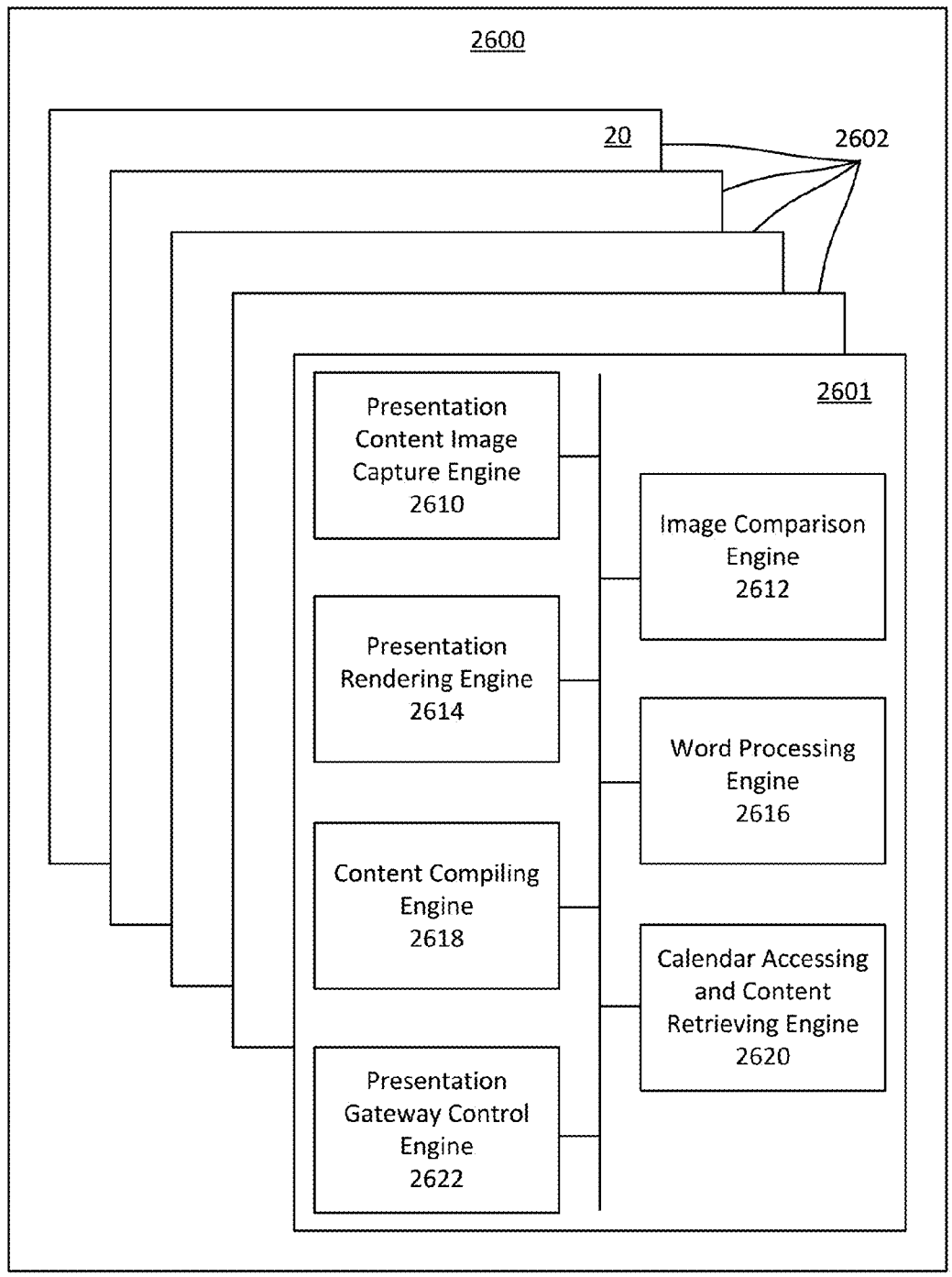

FIG. 26 illustrates a schematic diagram of a plurality of software engines of a presentation application of an enterprise meeting application in accordance with an illustrative embodiment.

Figure 27:
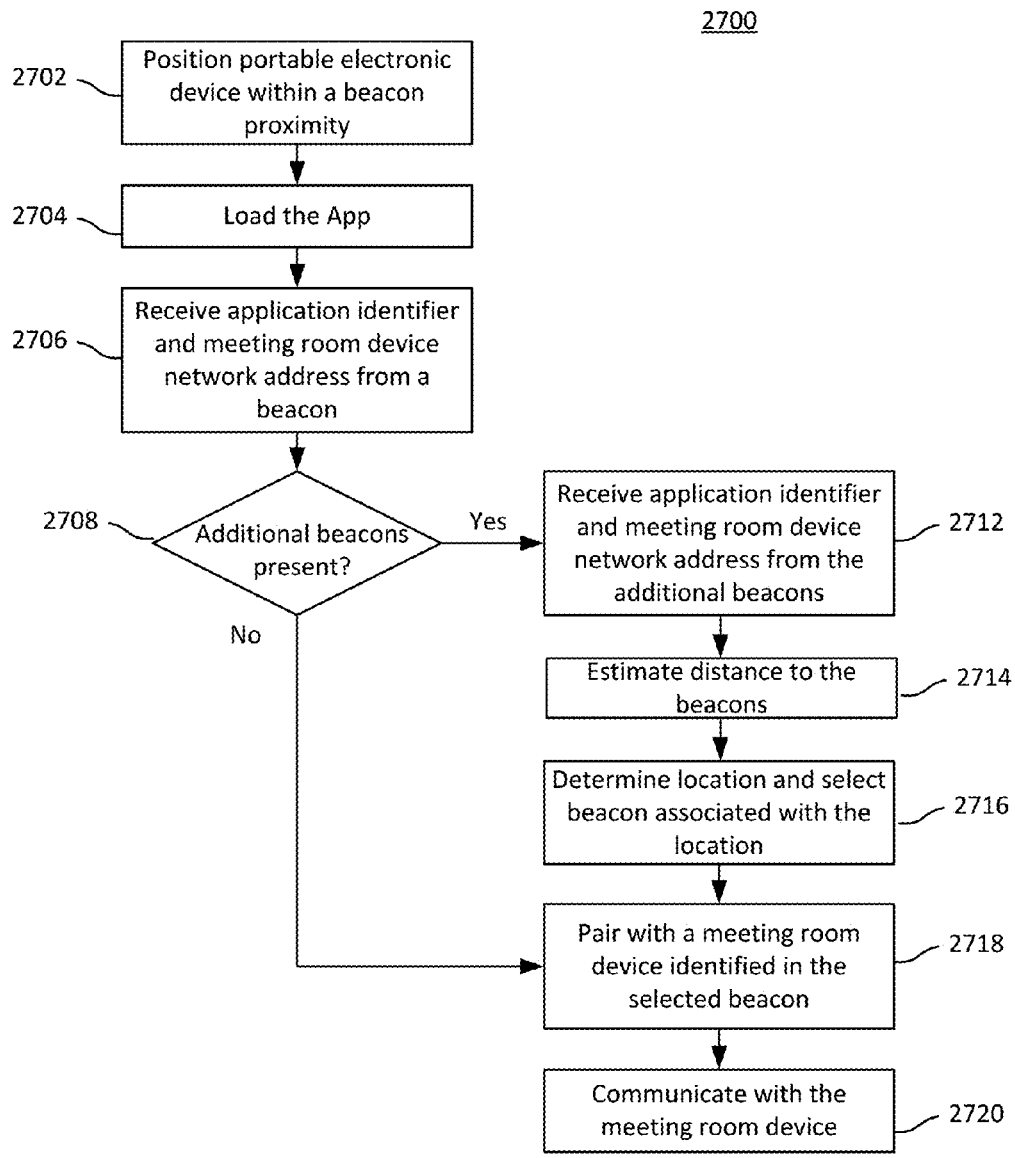

FIG. 27 illustrates a flowchart showing a method for pairing a portable electronic device with a meeting room device via a beacon in accordance with an illustrative embodiment.

Figure 28:
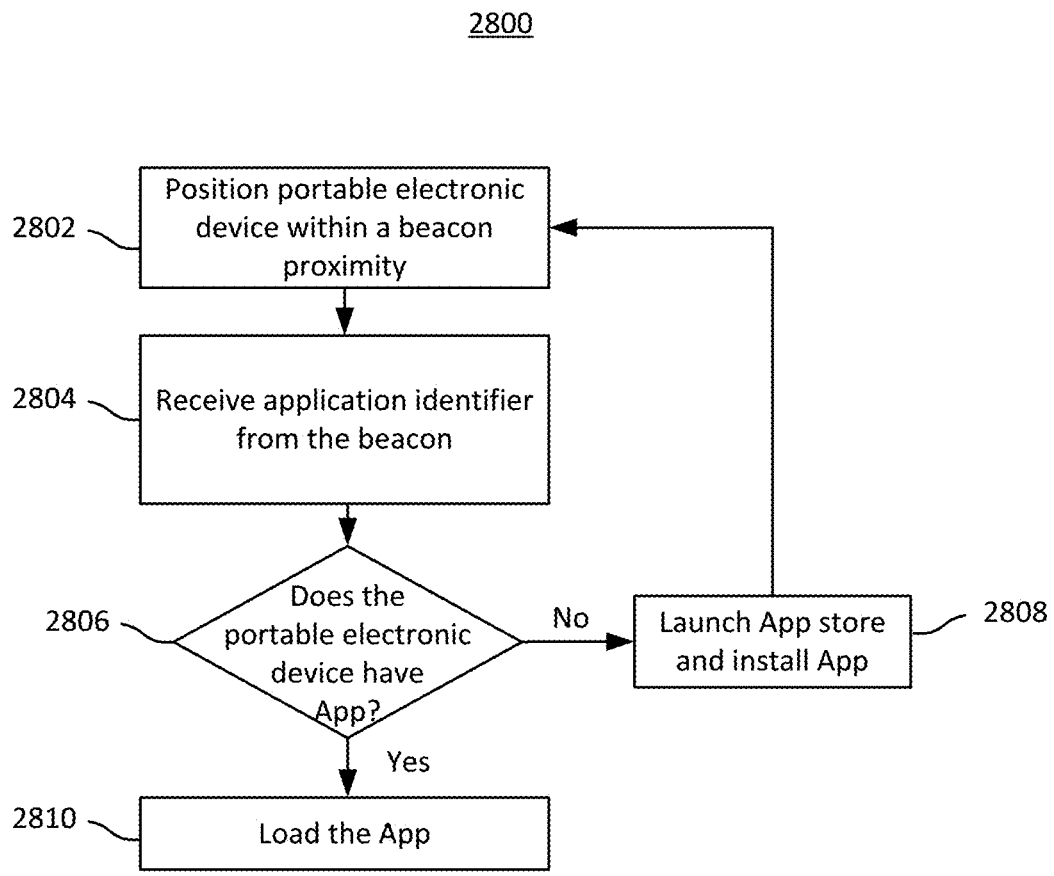

FIG. 28 illustrates a flowchart showing a method of automatically loading and/or installing an enterprise meeting application via a beacon in accordance with an illustrative embodiment.

Figure 29:
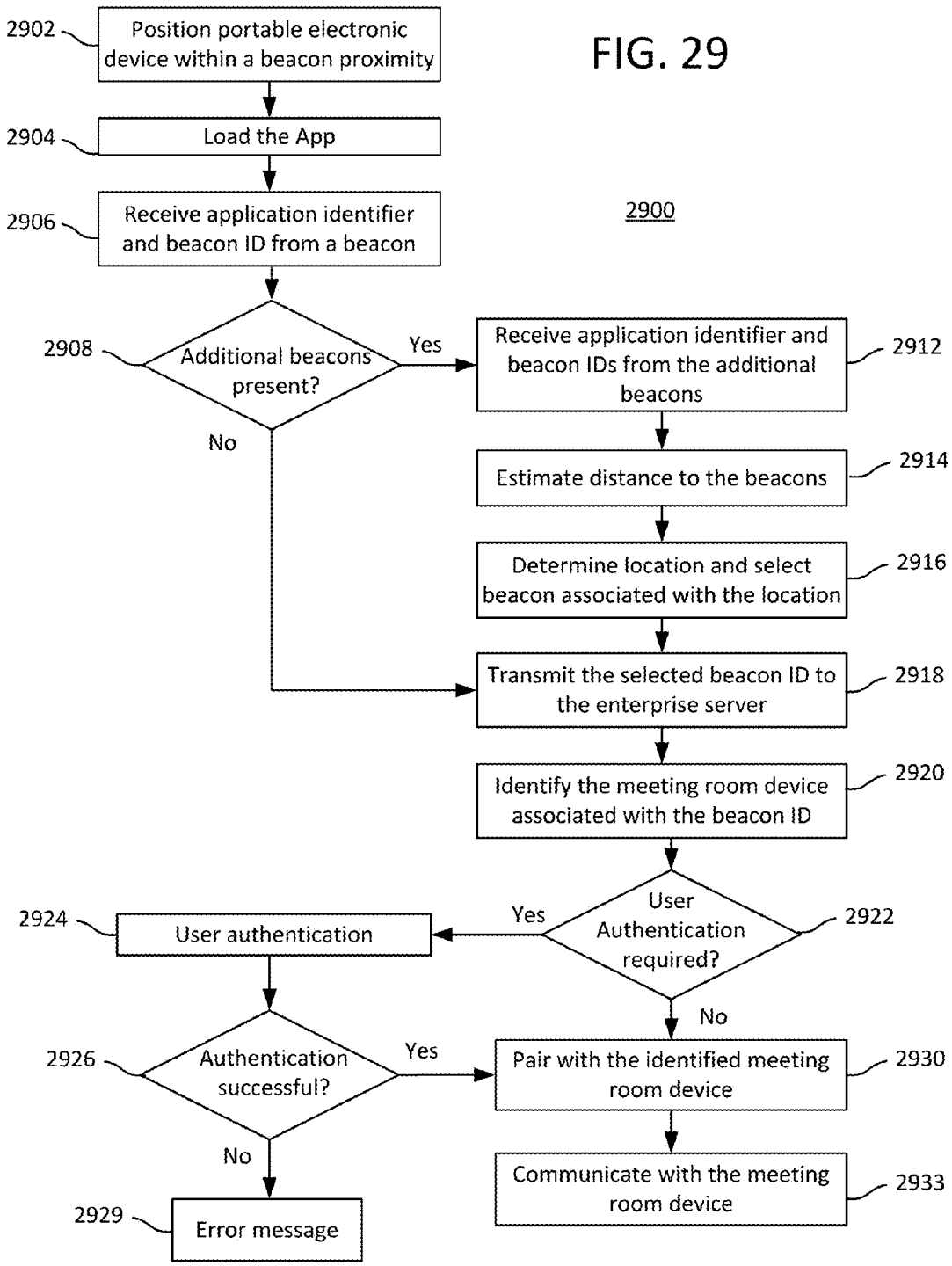

FIG. 29 illustrates a flowchart showing a method for pairing a portable electronic device with a meeting room device via one or more beacons and an enterprise server in accordance with an illustrative embodiment.

Figure 30:
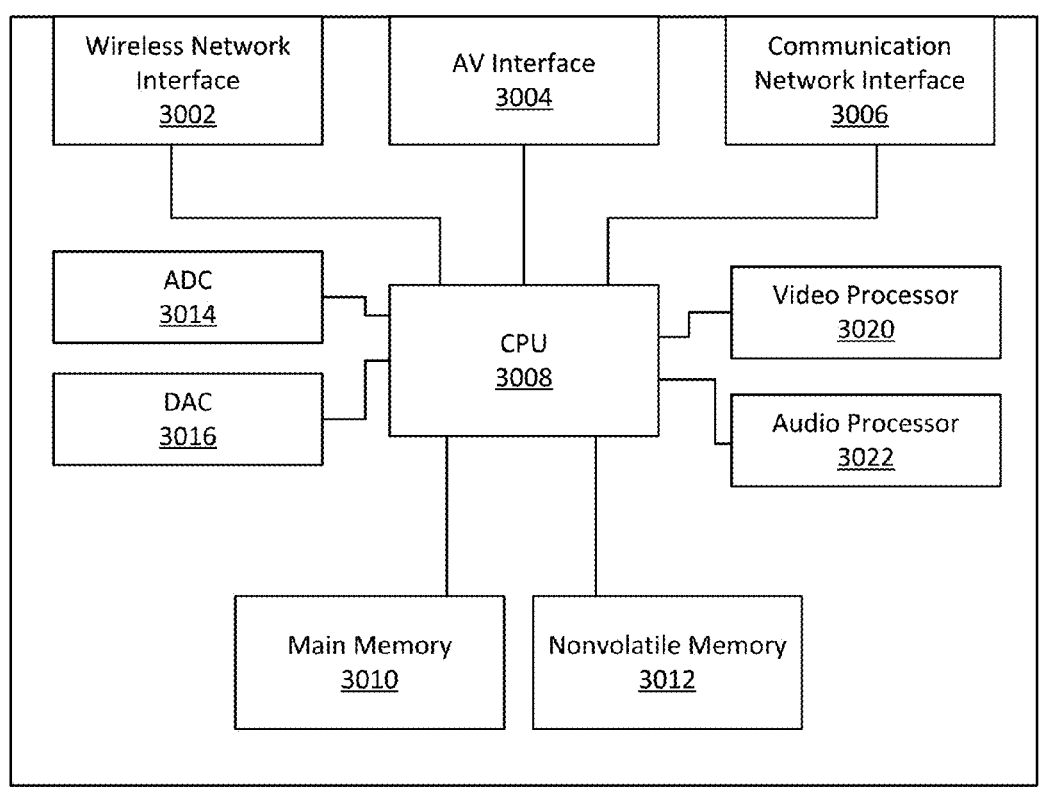

FIG. 30 is a block diagram of a presentation gateway employed in the system of FIG. 24 in accordance with an illustrative embodiment.

Figure 31:
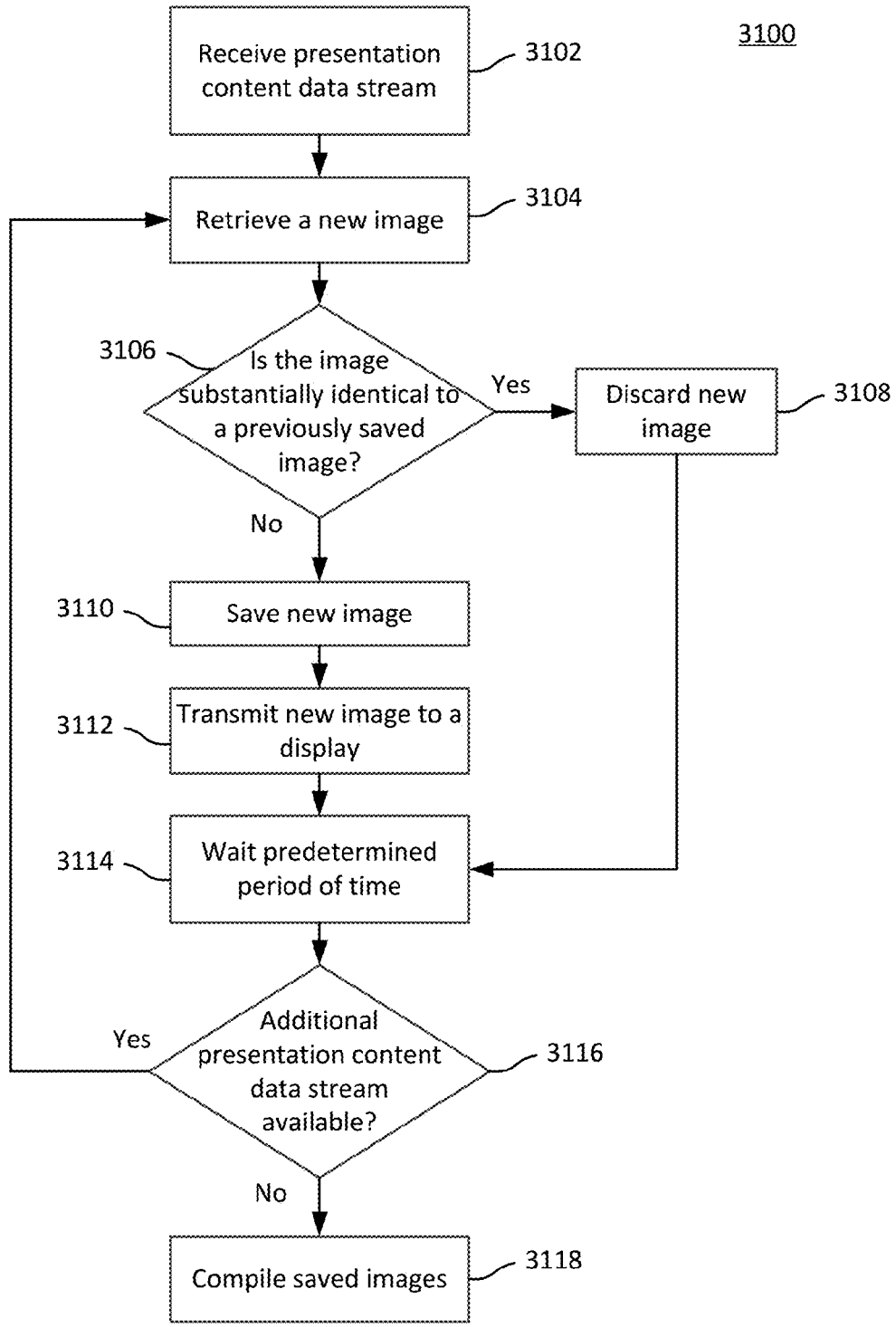

FIG. 31 illustrates a flowchart showing a method for capturing and displaying the presentation content by a presentation application on the attendee portable electronic device during a meeting in accordance with an illustrative embodiment.

Figure 32:
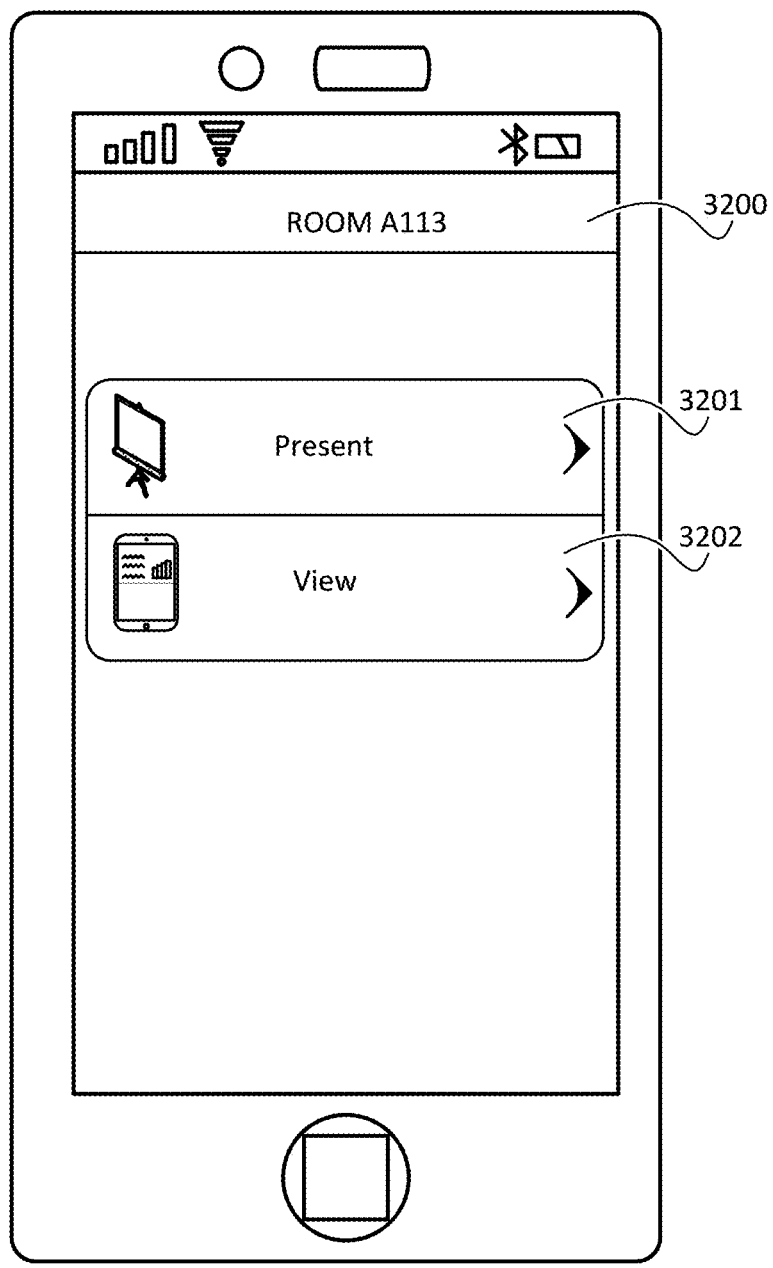

FIG. 32 illustrates a schematic diagram depicting an exemplary presentation page of the presentation application for presenting and viewing presentation content via the presentation gateway during a meeting in accordance with an illustrative embodiment.

Figure 33:
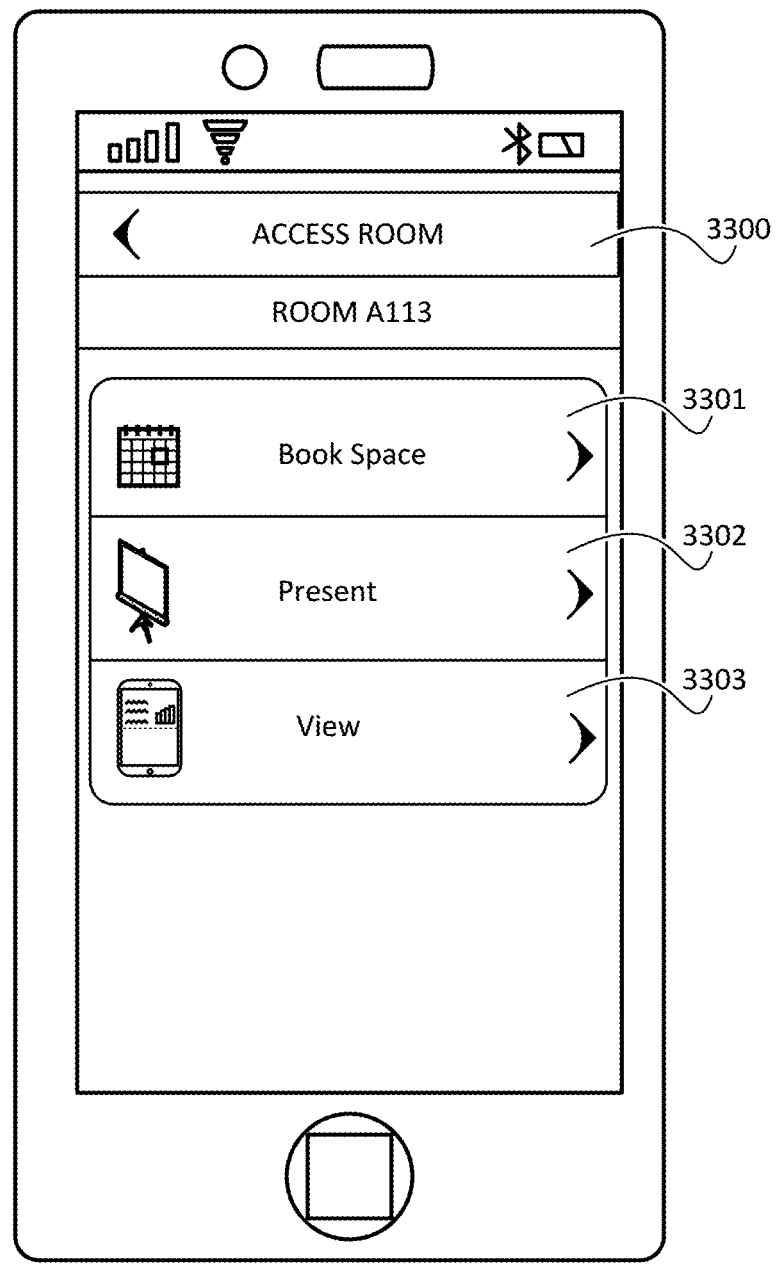

FIG. 33 illustrates a schematic diagram depicting an exemplary access room page of an enterprise meeting application that incorporates the scheduling application and the presentation application in accordance with an illustrative embodiment.

Figure 34A:
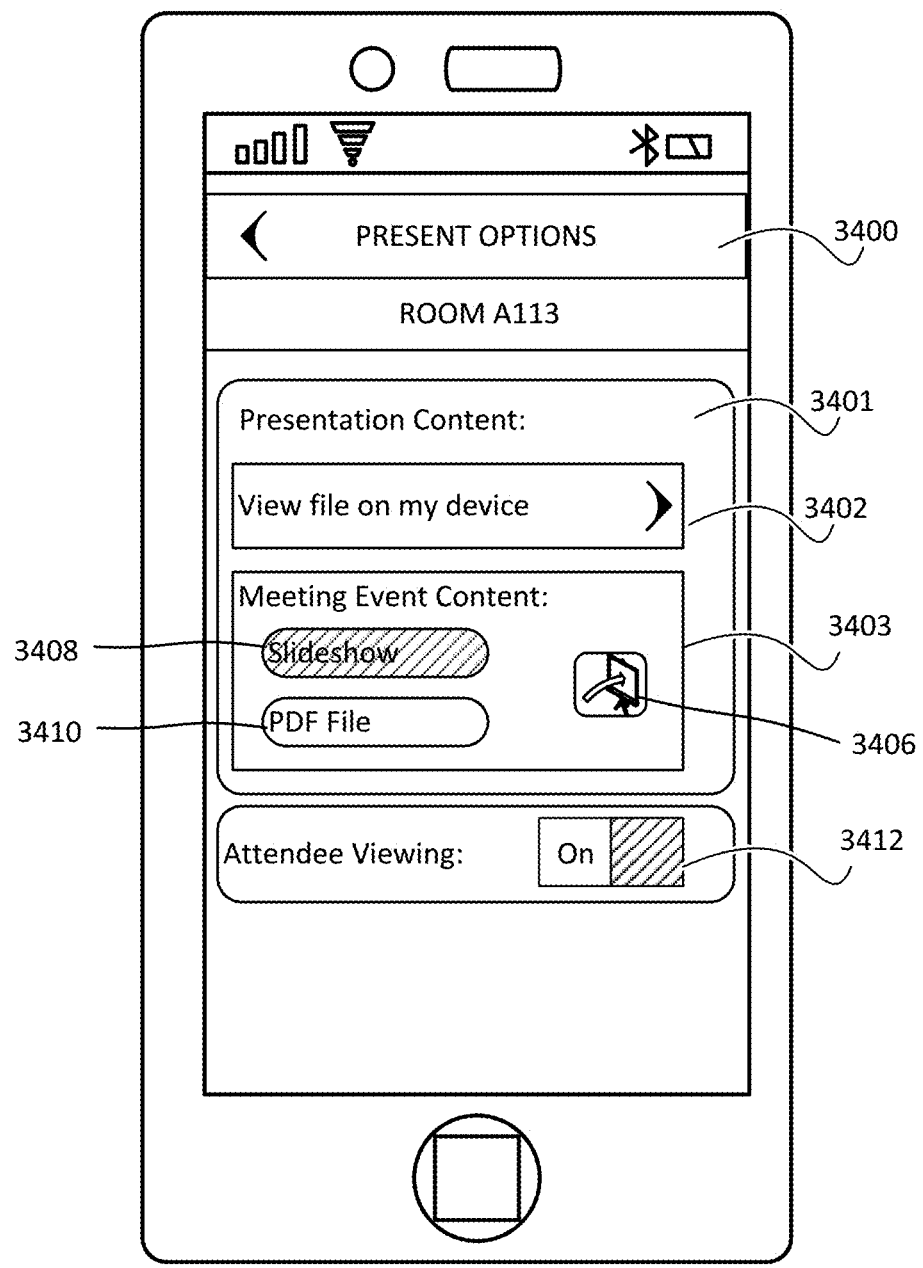

FIG. 34A illustrates a schematic diagram depicting a present options page of the presentation application for enabling a presenter to present presentation content during a meeting in accordance with an illustrative embodiment.

Figure 34B:
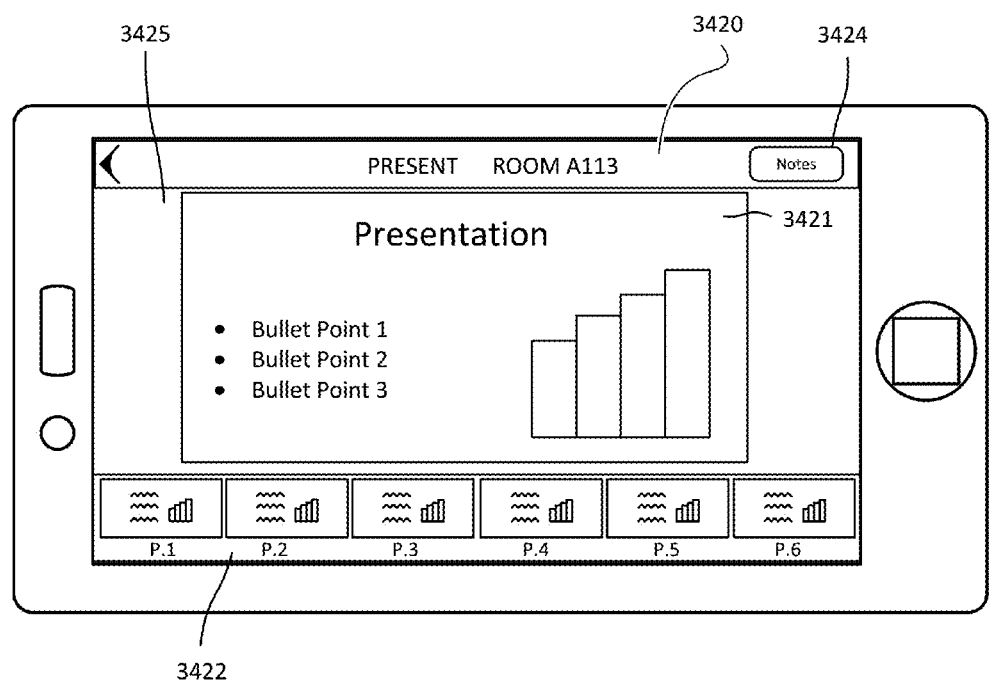

FIG. 34B illustrates a schematic diagram depicting a present page of the presentation application for enabling a presenter to present presentation content during a meeting in accordance with an illustrative embodiment.

Figure 35:
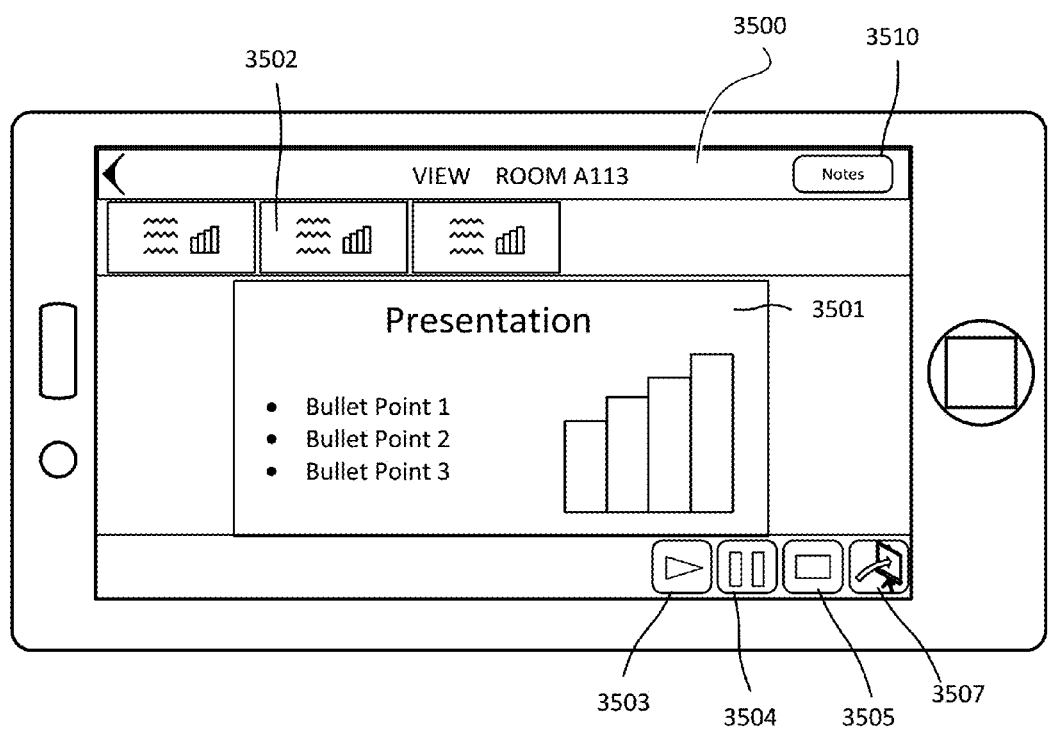

FIG. 35 illustrates a schematic diagram depicting a view page of the presentation application for enabling an attendee to view present presentation content during a meeting in accordance with an illustrative embodiment.

Figure 36:
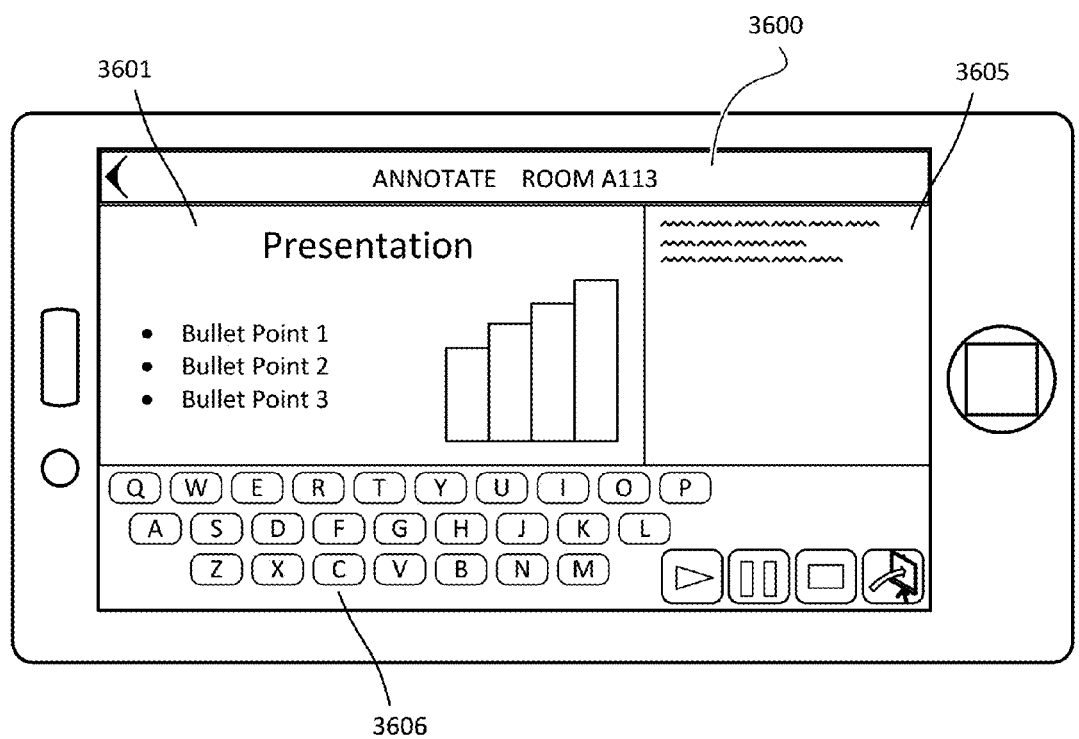

FIG. 36 illustrates a schematic diagram depicting an annotating page of the presentation application for enabling a presenter or an attendee to annotate the presentation content during a meeting in accordance with an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as presentation streaming products.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE MAJOR ELEMENTS IN THE DRAWING

The following is a list of major elements in the drawings in numerical order.
11 Near Field Communication (NFC) Tag
13 Portable Electronic Device
15 Scheduling Server
18 Radio Frequency (RF) Beacon (Collectively the RF Beacons of 18a-n)
20 Scheduling Application
40 AV Control Processor
42 Control System Processor
100 System
101 Conference Room
102 Conference Room Devices
103 Command
104 Communication Network
105 Preset Resources
106 Preset Parameter
107 Preset Information
108 Meeting/Conference Type
111 NFC Communication Channel
113 Application Identifier
115 Area Address
131 Central Processing Unit
132 Main Memory
133 Nonvolatile Storage
134 Display
135 User Interface
136 Location Sensing Circuitry
137 Wired I/O Interface
138 Network Interface
138a Personal Area Network Interface
138b Local Area Network Interface
138c Wide Area Network Interface
139 Near Field Communication Interface
140 Camera
141 Accelerometers
181 First Distance 182 Second Distance
183 Third Distance
185 Beacon ID
201 Data Storage Area
202 Availability Data Storage Area
204 Resource Data Storage Area
206 Presentation Engine
208 User Registration Engine
210 Preset Association Engine
212 Availability Data Engine
214 User Preference Engine
216 Access Engine
218 User Preference Data Storage Area
220 Access Data Storage Area
222 Resource Request and Reservation Management Engine
224 Notification Engine
226 Resource Availability Verification Engine
228 Control Engine
401 Telephone
402 Projector
403 Projector Screen
404 Television
405 Computer
406 Audio System Devices
407 DVD/DVR
408 CD Player
409 Camera
410 VCR
411 Touch Panel
412 Presentation Capture Device
413 Lighting System Device
414 Blinds/Shades
415 HVAC Device
416 Security Device
417 Sensor Device
500 Main Screen Page
501 Preferences Icon
502 Access Room Icon
503 Search Icon
600 Preferences Page
601 Lighting Level Preference Menu
602 HVAC Preference Menu
603 Email Notification Preference Menu
700 Schedule Page
701 Schedule
702 Add Meeting Button
703 Main Menu Button
704 Meeting Icon
705 Vacant Icon
706 Status Indicator
800 Information Pop-Up Screen
801 Room Information
802 Time Information
803 Organizer Information
804 Subject Information
805 Attendee Information
900 Information Pop-Up Screen
901 Start Meeting Selectable Icon
902 Stop Meeting Selectable Icon
903 Start Record Selectable Icon
904 Pause Record Selectable Icon
905 Stop Record Selectable Icon
1000 Scheduling Sub-Menu
1001 General Information Tab
1002 Subject
1003 Location
1004 Date
1005 Start Time
1006 End Time
1007 Recurrence
1100 Presets Tab
1102 Discussion
1103 Presentation
1104 Audio Call
1105 Video Call
1106 Audio and Video Call
1107 Welcome Message
1108 Image Source
1201 Shared Document
1301 Phone Number
1302 Pass Code
1401 Video Code
1600 People Tab
1601 Required Users
1602 Optional Users
1700 Flowchart Showing a Method for Accessing a Conference Room Schedule
1701-1708 Method Steps of Flowchart 1700
2000 A Flowchart Showing a Method for Managing a Conference Room Schedule via Communication with an RF Beacon
2001-2010 Method Steps of Flowchart 2000
2100 A Flowchart Showing a Method for Managing a Conference Room Schedule via Communication with an RF Beacon
2102, 2106a-b Method Steps of Flowchart 2100
2200a-b Flowchart Showing a Method for Accessing a Conference Room Schedule
2201-2220 Method Steps of Flowchart 2200a-b
2300a-b Flowchart Showing a Method for Accessing a Conference Room Schedule
2301-2322 Method Steps of Flowchart 2300a-b
2400 Presentation System
2401 Meeting Room
2402 Presenter Portable Electronic Device
2403 Attendee Portable Electronic Device
2404 Beacon
2406 Meeting Room Display
2408 Wireless Local Area Network
2410 Presentation Gateway
2411 Short-Range Communication
2412 Enterprise Server
2414 Presentation Content
2416 Calendar Server
2417 Communication Network
2501 Application Identifier
2502 Beacon ID
2503 Presentation Gateway Network Address
2504 Enterprise Server Network Address
2600 Enterprise Meeting Application
2601 Presentation Application
2610 Presentation Content Image Capture Engine
2612 Image Comparison Engine
2614 Presentation Rendering Engine
2616 Word Processing Engine
2618 Content Compiling Engine
2620 Calendar Accessing and Content Retrieving Engine
2622 Presentation Gateway Control Engine
2700 A Flowchart Showing a Method for Pairing a Portable Electronic Device with a Meeting Room Device via a Beacon to Enable Presentation Content Sharing
2702-2720 Method Steps of Flowchart 2700

2800 A Flowchart Showing a Method of Automatically Loading and/or Installing an Enterprise Meeting Application via a Beacon
2802-2810 Method Steps of Flowchart 2800
2900 A Flowchart Showing a Method for Pairing a Portable Electronic Device with a Meeting Room Device via One or More Beacons and an Enterprise Server to Enable Presentation Content Sharing
2902-2933 Method Steps of Flowchart 2900
3002 Wireless Network Interface
3004 Audiovisual Interface
3006 Communication Network Interface
3008 Central Processing Unit
3010 Main Memory
3012 Nonvolatile Memory
3014 Analog-To-Digital Converter
3016 Digital-To-Analog Converter
3020 Video Processor
3022 Audio Processor
3100 A Flowchart Showing a Method for Capturing and Displaying the Presentation Content by the Presentation Application on the Attendee Portable Electronic Device
3102-3118 Method Steps of Flowchart 3100
3200 Presentation Page
3201 Present Icon
3202 View Icon
3300 Access Room Page
3301 Book Space Icon
3302 Present Icon
3303 View Icon
3400 Present Page
3401 Presentation Content Section
3402 View File on My Device Icon
3403 Meeting Event Content Section
3406 Present Icon
3408 Slideshow Icon
3410 PDF File Icon
3412 Attendee Viewing Option
3420 Present Page
3421 Current Page
3422 Presentation Content Ribbon
3424 Notes Icon
3425 Presentation Content Window
3500 View Page
3501 Current Image of Presentation Content
3502 Timeline of Previously Saved Images
3503 Play Presentation Icon
3504 Pause Presentation Icon
3505 Stop Presentation Icon
3507 Present Icon
3510 Notes Icon
3600 Annotating Page
3601 Current Image
3605 User's Notes
3606 On-Screen Keyboard

LIST OF ACRONYMS USED IN THE DETAILED DESCRIPTION OF THE INVENTION

The following is a list of the acronyms used in the specification in alphabetical order.
ADC Analog-To-Digital Converter
ASIC Application Specific Integrated Circuit
AV Audio Visual
CPU Central Processing Unit
DAC Digital-To-Analog Converter
DVI Digital Visual Interface
GUI Graphical User Interface
LAN Local Area Network
HDMI High-Definition Multimedia Interface
I/O Input/Output
IP Internet Protocol
IR Infrared
NFC Near Field Communication
PAN Personal Area Network
PSTN Public Switched Telephone Network
RAM Random-Access Memory
REGEX Predetermined Regular Expression
RF Radio Frequency
RFID Radio Frequency Identification
RGBHV Red-Green-Blue-Horizontal Sync-Vertical Sync
RISC Reduced Instruction Set
ROM Read-Only Memory
UUID Universally Unique Identifier
VGA Video Graphics Array
WAN Wide Area Network
WLAN Wireless Local Area Network

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The present invention provides a system for leveraging short range communication technologies such as near field communications and Bluetooth 4.0 to manage the schedule of one or more areas in a facility, such as conference rooms in a corporate facility. A portable electronic device, such as a smart phone, communicates with an identification unit, such as NFC tag or one or more RF beacons, located in or near a conference room. The portable electronic device may read an application identifier and a room address or area address from the identification unit. The room address may be a uniform resource locator (URL) for a scheduling server. The application identifier identifies a scheduling application to open on the portable electronic device. The scheduling application then employs the URL to communicate with the scheduling server. Upon accessing the scheduling server, the user may manage the conference room schedule by viewing the schedule for the conference room, reserving the conference room for a period of time, reserving resources, pre-configuring room and resource settings, starting a meeting, ending a meeting, sharing documentation and viewing resources for the conference room among other things.

While the current invention is described as being implemented for managing the schedule of one or more conference rooms in a commercial facility it is not limited to such an implementation. The present invention may be employed to reserve any area or asset in which a common schedule is maintained. For example, one or more assets or areas in a commercial, residential, retail, or non-profit structure. For example, the present invention may be used to manage the schedule of a workstation for a hoteling employee.

Referring to FIG. 1, an exemplary embodiment of a system 100 for managing a conference room schedule is shown in accordance with an illustrative embodiment of the present invention. It should be noted that the exemplary embodiment of system 100 illustrated in FIG. 1 may be varied in one or more aspects without departing from the spirit and scope of the teachings disclosed herein.

The system 100 includes a portable electronic device 13. The portable electronic device 13 may be a smart phone, tablet, remote control, personal digital assistant or any other electronic device configured for storing a scheduling application 20 and communicating with other electronic devices via RF communication protocols. As will be further explained below, the portable electronic device 13 is configured to receive information via the identification unit, such as an NFC tag 11, communicate with a scheduling server 15 and send at least one command 103 to control preset resources 105 once a conference room 101 with the preset resources 105 is reserved.

The portable electronic device 13 is associated with a user ID. The user ID may be a characteristic of the device itself or assigned to the device, such as a manufacturer ID or a network address, which is associated with a user. Alternatively, the user ID may be an ID associated with an account of the user. For example, the user may register a user ID with a scheduling application on the portable electronic device.

For example, the portable electronic device 13 may be a smart phone running a scheduling application 20 available from Crestron Electronics, Inc. The scheduling application 20 may be downloaded and stored in the portable electronic device 13 from an application marketplace such as the Google Play marketplace, the iTunes® application marketplace or other similar marketplace.

FIG. 2 is a block diagram depicting the portable electronic device 13, in accordance with an illustrative embodiment of the invention. The portable electronic device 13 may include at least one central processing unit (CPU) 131. For example, the CPU 131 may represent one or more microprocessors, and the microprocessors may be "general purpose" microprocessors, a combination of general and special purpose microprocessors, or application specific integrated circuits (ASICs). Additionally or alternatively, the CPU 131 may include one or more reduced instruction set (RISC) processors, video processors, or related chip sets. The CPU 131 may provide processing capability to execute an operating system, run various applications, and/or provide processing for one or more of the techniques described herein. Applications that may run on the portable electronic device 13 may include, for example software for managing a calendar and software for controlling other electronic devices via a control network.

A main memory 132 may be communicably coupled to the CPU 131, which may store data and executable code. The main memory 132 may represent volatile memory such as RAM, but may also include nonvolatile memory, such as read-only memory (ROM) or Flash memory. In buffering or caching data related to operations of the CPU 131, the main memory 132 may store data associated with applications running on the portable electronic device 13.

The portable electronic device 13 may also include nonvolatile storage 133. The nonvolatile storage 133 may represent any suitable nonvolatile storage medium, such as a hard disk drive or nonvolatile memory, such as Flash memory. Being well-suited to long-term storage, the nonvolatile storage 133 may store data files such as media (e.g., music and video files), software (e.g., for implementing functions on the portable electronic device 13), preference information (e.g., room and resource preset preferences), wireless connection information (e.g., information that may enable media device to establish a wireless connection such as a control network connection) and identity information (information to identify a user) and access information (information that may enable an individual to access restricted areas).

It should be appreciated that data associated with maintaining, scheduling and initiating a conference schedule may be saved in the nonvolatile storage 133. Nonvolatile storage 133 includes one or more software engines operable to enable the maintenance, management, scheduling, initiating, publication, presentation, provision and/or other data manipulation capability of resource availability and reservation information as well as perform other operations. Depending upon implementation, various aspects of teachings of the present invention may be implemented in a single software engine, in a plurality of software engines, in one or more hardwired components or in a combination of hardwired and software systems.

In addition to one or more software engines, nonvolatile storage 133 also includes one or more data storage areas. Data storage area is operably associated with the main memory and CPU 131. Data storage area of non-volatile storage may be leveraged to maintain data concerning the availability of one or more conference rooms or resources maintained for reservation, descriptive information concerning the one or more resources maintained for reservation, preset information, preset parameters, shared documentation, as well as other information pertinent to the management, maintenance, scheduling, initiating, publication, presentation and/or provision of resource availability and reservation information. Data storage area, or portions thereof, may also be utilized to store myriad other data.

Depending upon implementation, nonvolatile storage 133 may be implemented within a portable electronic device 13, in a storage area network operably coupled to a portable electronic device 13, and/or in other storage media, including removable media, compatible with and accessible by portable electronic device 13. In one embodiment, the one or more software engines and data storage areas cooperate in the management of the one or more conference room schedules, according to teachings of the present invention.

A display 134 may display images and data for the portable electronic device 13. It should be appreciated that only certain embodiments may include the display 134. The display 134 may be any suitable display 134, such as liquid crystal display (LCD), a light emitting diode (LED) based display, an organic light emitting diode (OLED) based display, a cathode ray tube (CRT) display, or an analog or digital television. In some embodiments, the display 134 may function as a touch screen through which a user may interact with the portable electronic device 13.

The portable electronic device 13 may further include a user interface 135. The user interface 135 may represent indicator lights and user input structures, but may also include a graphical user interface (GUI) on the display 134. In practice, the user interface 135 may operate via the CPU 131, using memory from the main memory and long-term storage in the nonvolatile storage. In an embodiment lacking the display 134, indicator lights, sound devices, buttons, and other various input/output (I/O) devices may allow a user to interface with the portable electronic device 13. In an embodiment having a GUI, the user interface 135 may provide interaction with interface elements on the display 134 via certain user input structures, user input peripherals such as a keyboard or mouse, or a touch sensitive implementation of the display 134. The user may interact with the graphic user interface via touch means on a touch screen, input means via one or more keyboard buttons, mouse buttons etc., or voice instructions.

As should be appreciated, one or more applications may be open and accessible to a user via the user interface 135 and displayed on the display 134 of the portable electronic device 13. The applications may run on the CPU 131 in conjunction with the main memory 132, the nonvolatile storage 133, the display 134, and the user interface 135. The applications may run on the CPU 131 in conjunction with the main memory, the nonvolatile storage, the display, and the user interface. As will be discussed below, instructions stored in the main memory, the nonvolatile storage, or the CPU 131 of the portable electronic device 13 may enable a user to access and manage a schedule for a building. For example, a user may view and manipulate one or more schedules for a building or search for an available conference room based on resources and availability. As such, it should be appreciated that the instructions for carrying out such techniques on the portable electronic device 13 may represent a standalone application, a function of the operating system of the portable electronic device 13, or a function of the hardware of the CPU 131, the main memory, the nonvolatile storage, or other hardware of the portable electronic device 13.

One such application that may be open and accessible to the user is a scheduling application 20 for enabling access to a scheduling server 15. For example, the scheduling application 20 may be mobile application based on Fusion RV software available from Crestron Electronics, Inc. of Rockleigh, N.J. The scheduling application 20 may provide similar functionality as the Fusion RV software by enabling a user to: check the availability of one or more conference rooms; book one or more conference rooms for a predefined time either presently or at some future date; search for a desirable conference room based on availability and resources such as size, AV equipment, catering, etc., determine the direction of a desired conference room based on the location of the NFC tag 11; and check-in to a meeting and end a meeting. By checking in and ending a meeting, actions may be triggered from an accompanying control system controlling one or more devices and environmental aspects of the conference room.

Additionally, because the portable electronic device 13 may be used to identify a user, the scheduling application 20 may provide additional functionality. The scheduling software may know the identity of a user booking a conference room remotely and update the schedule of the conference room and the user accordingly. Additionally, a control system in communication with the scheduling software may alter one or more control settings based on the user. For example, the scheduling application may communicate personal settings for the conference room to the control network. The scheduling application may check user identity against a database to determine access rights for the user to view or manage the schedule of an area or resource. A user may have limited or no access to certain areas or resources based on time of day, priority, employment level or a myriad of other factors.

The scheduling application 20, such as Crestron Roomview or other similar scheduling application 20 may be downloaded from an application marketplace such as from the Google Play application marketplace or the Apple iTunes® application marketplace. The portable electronic device 13 communicates with a scheduling server 15 to upload and/or download one or more aspects of availability data associated with a conference room or resource to be maintained for reservation. Upon opening, the scheduling application 20 may communicate with a scheduling server 15 to download a project file of the facility. In another embodiment, the scheduling application 20 may not require a local file for the facility and may be completely web-based. The project file may comprise information regarding the facility such as the number and type of conference rooms, the resources available for each conference room and information regarding the control system associated with the conference room, such as information enabling communication with one or more control processors.

The scheduling application 20 comprises a series of menu pages each further comprising selectable elements and graphical elements. One or more of the menu pages may comprise a schedule of a conference room 101. The portable electronic device 13 transmits information to the scheduling server 15 according to inputs from the user. Additionally, the scheduling server 15 may communicate with the portable electronic device 13, such as by providing updates to the schedule and providing feedback such as confirmation notices to the portable electronic device 13.

In certain embodiments, the portable electronic device 13 may include location sensing circuitry 136. The location sensing circuitry 136 may represent global positioning system (GPS) circuitry, but may also represent one or more algorithms and databases, stored in the nonvolatile storage or main memory and executed by the CPU 131, which may be used to infer location based on various observed factors. For example, the location sensing circuitry may represent an algorithm and database used to approximate geographic location based on the detection of local 802.11x (Wi-Fi) networks or nearby cellular phone towers.

The portable electronic device 13 may also include a wired input/output (I/O) interface 137 for a wired interconnection between one electronic device and another electronic device. The wired I/O interface 137 may represent, for example, a universal serial bus (USB) port or an IEEE 1394 or FireWire® port, but may also represent a proprietary connection. Additionally, the wired I/O 137 interface may permit a connection to user input peripheral devices, such as a keyboard or a mouse.

An infrared (IR) interface may enable the portable electronic device 13 to receive and/or transmit signals with infrared light. By way of example, the IR interface may comply with an infrared IrDA specification for data transmission. Alternatively, the IR interface may function exclusively to receive control signals or to output control signals. In this way, the portable electronic device 13 may issue signals to control other electronic devices that may lack other interfaces for communication.

One or more network interfaces 138 may provide additional connectivity for the portable electronic device 13. The network interfaces 138 may represent, for example, one or more network interface cards (NIC) or a network controller. In certain embodiments, the network interface 138 may include a personal area network (PAN) interface 138a. The PAN interface 138a may provide capabilities to network with, for example, a Bluetooth® network, an IEEE 802.15.4 (e.g., ZigBee) network, or an ultra wideband network (UWB). As should be appreciated, the networks accessed by the PAN interface 138a may, but do not necessarily, represent low power, low bandwidth, or close range wireless connections. The PAN interface 138a may permit one electronic device to connect to another local electronic device via an ad-hoc or peer-to-peer connection. However, the connection may be disrupted if the separation between the two electronic devices exceeds the range of the PAN interface.

The network interface may also include a local area network (LAN) interface 138b. The LAN interface 138b may represent an interface to a wired Ethernet-based network, but may also represent an interface to a wireless LAN, such as an IEEE 802.11x wireless network. The range of the LAN interface 138b may generally exceed the range available via the PAN interface 138a. Additionally, in many cases, a connection between two electronic devices via the LAN interface 138b may involve communication through a network router or other intermediary device.

For some embodiments of the portable electronic device 13, the network interfaces 138 may include the capability to connect directly to a wide area network (WAN) via a WAN interface 138c. The WAN interface 138c may permit a connection to a cellular data network, such as the Enhanced Data rates for GSM Evolution (EDGE) network or other 3G network. When connected via the WAN interface 138c, the portable electronic device 13 may remain connected to the Internet and, in some embodiments, to another electronic device, despite changes in location that might otherwise disrupt connectivity via the PAN interface 138a or the LAN interface 138b. As will be discussed below, the wired I/O interface 137 and the network interfaces 138 may represent high-bandwidth communication channels for transferring user data using the simplified data transfer techniques discussed herein.

The portable electronic device 13 may also include a near field communication (NFC) interface 139. The NFC interface 139 may allow for extremely close range communication at relatively low data rates (e.g., 464 kb/s), and may comply with such standards as ISO 18092 or ISO 21521, or it may allow for close range communication at relatively high data rates (e.g., 560 Mbps), and may comply with the TransferJet® protocol. The NFC interface 139 may have a range of approximately 2 to 4 cm. The close range communication with the NFC interface 139 may take place via magnetic field induction, allowing the NFC interface 139 to communicate with other NFC interfaces or to retrieve information from tags having radio frequency identification (RFID) circuitry. As discussed below, the NFC interface 139 may provide a manner of initiating or facilitating a transfer of user data from one electronic device to another electronic device.

The portable electronic device 13 may also include a camera 140. With the camera 140, the portable electronic device 13 may obtain digital images or videos. In combination with optical character recognition (OCR) software, barcode-reading software, or matrix-code-reading software running on the portable electronic device 13, the camera 140 may be used to input data from printed materials having text or barcode information. Such data may include information indicating how to control another device from a matrix barcode that may be printed on the other device, as described below.

In certain embodiments of the portable electronic device 13, one or more accelerometers 141 may sense the movement or orientation of the portable electronic device 13. The accelerometers 141 may provide input or feedback regarding the position of the portable electronic device 13 to certain applications running on the CPU 131.

The one or more communication interfaces described above enables communications with a plurality of user communication devices via communication network. User communication devices which may be leveraged in accordance with teachings of the present invention include, without limitation, mobile telephone, personal digital assistant, computer system, video display/conferencing system, touch panel, laptop computer as well as other communication enabled devices.

Referring to FIG. 1, communication network 104 may include one or more gateway devices (not expressly shown). Other user communication devices may communicate with the gateway devices of communication network 104 just as portable electronic device 13 communicates with the gateway devices. In this manner, user communication devices may be in selective communication with portable electronic device 13 via the gateway devices and communication network 104.

The gateways of communication network 104 preferably provide portable electronic device 13 with an entrance to communication network 104 and may include software and/or hardware components to manage traffic entering and exiting communication network 104 and conversion between the communication protocols used by user communication devices, portable electronic device 13 and communication network 104. In certain embodiments, the gateways of communication network 104 may function as a proxy server and a firewall server for user communication devices as well as portable electronic device 13. Further, the gateways may be associated with a router (not expressly shown) operable to direct a given packet of data that arrives at a gateway and a switch (not expressly shown) operable to provide a communication path into and out of each gateway.

In one embodiment, communication network 104 may be a public switched telephone network (PSTN). In alternate embodiments, communication network 104 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present invention.

In one embodiment, user communication devices may include a variety of forms of equipment connected to communication network 104 and accessible to a user. User communication devices may be, employ or include telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. User communication devices may be equipped for connectivity to communication network via a PSTN, DSLs, cable network, wireless network, or other communication channel.

The AV control system processor 40 is connected to various conference room devices 102 via a wire line or wireless connection. The conference room devices 102 include various types of audio/visual equipment. For example, audio/visual equipment includes, but is not limited to, cameras 409, VCR 410, audio system device 406, DVD/DVR 407, telephone 401, projector 402 and projector screen 403, CD player 408, touch panel 411, one or more local computers 405, cable television box (not shown), and television 404 such as plasma, liquid crystal display, light-emitting diode flat panel, and cathode ray tube television.

The AV control system processor 40 may be a Crestron 3-Series Control system available from Crestron Electronics, Inc. of Rockleigh, N.J. The Crestron 3-Series Control system provides a complete integrated AV or automation solution. Every audio, video, and environmental element of the conference room 101 becomes integrated and accessible through the AV system processor 40.

The control system processor 42 is used for, among other things, controlling and monitoring various devices and environmental conditions throughout a structure. The control system may control one or more of the following controllable devices: AN devices including but not limited to content sources, content sinks, video recorders, audio receivers, speakers, and projectors; lighting devices 413 including but not limited to lamps, ballasts, light emitting diode (LED) drivers; HVAC devices 415 including but not limited to thermostats, occupancy sensors, air conditioning units, heating units, filtration systems, fans, humidifiers; shading elements 414 including but not limited to motorized window treatments, dimmable windows; security elements 416 including but not limited to security cameras, monitors and door locks; household appliances including but not limited to refrigerators, ovens, blenders, microwaves; control devices including but not limited to switches, relays, current limiting devices; and industrial devices including but not limited to motors, pumps, chillers, and air compressors.

One or more network interfaces may provide connectivity for the AV and control system processors (collectively processors). The network interface may represent, for example, one or more NICs or a network controller. In certain embodiments, the network interface may include a PAN interface. The PAN interface may provide capabilities to network with, for example, a Bluetooth® network, an IEEE 802.15.4 (e.g. Zigbee network), or an ultra wideband network. As should be appreciated, the networks accessed by the PAN interface may, but do not necessarily, represent low power, low bandwidth, or close range wireless connections. The PAN interface may permit one electronic device to connect to another local electronic device via an ad-hoc or peer-to-peer connection. However, the connection may be disrupted if the separation between the two electronic devices exceeds the range of the PAN interface.

The network interface may also include a LAN interface. The LAN interface may represent an interface to a wired Ethernet-based network but may also represent an interface to a wireless LAN, such as an 802.11x wireless network. The range of the LAN interface may generally exceed the range available via the PAN interface. Additionally, in many cases, a connection between two electronic devices via the LAN interface may involve communication through a network router or other intermediary device.

Ethernet connectivity enables integration with IP-controllable devices and allows the processors to be part of a larger managed control network. Whether residing on a sensitive corporate LAN, a home network, or accessing the Internet through a cable modem, the control processor may provide secure, reliable interconnectivity with IP-enabled devices, such as touch screens, computers, mobile devices, video displays, Blu-ray Disc® players, media servers, security systems, lighting, HVAC, and other equipment—both locally and globally.

The processors may also include one or more wired input/output (I/O) interface for a wired connection between one electronic device and another electronic device. One or more wired interfaces may represent a serial port, for example a COM port or a USB port. Additionally, the wired I/O interface may represent, for example, a Cresnet port. Cresnet provides a network wiring solution for Crestron keypads, lighting controls, thermostats, and other devices that don't require the higher speed of Ethernet. The Cresnet bus offers wiring and configuration, carrying bidirectional communication and 24 VDC power to each device over a simple 4-conductor cable.

One or more IR interfaces may enable the processors to receive and/or transmit signals with infrared light. The IR interface may comply with an infrared IrDA specification for data transmission. Alternatively, the IR interface may function exclusively to receive control signals or to output control signals. The IR interface may provide a direct connection with one or more devices such as a centralized AV sources, video displays, and other devices.

One or more programmable relay ports may enable the processors to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

For some embodiments of the processors, the network interfaces may include the capability to connect directly to a WAN via a WAN interface. The WAN interface may permit connection to a cellular data network, such as the EDGE network or other 3G network. When connected via the WAN interface, the processors may remain connected to the Internet and, in some embodiments, to another electronic device, despite changes in location that might otherwise disrupt connectivity via the PAN interface or the LAN interface.

By leveraging remote access of the processors, a user may control the devices or environment settings in a building from anywhere in the world using a portable electronic device 13.

The portable electronic device 13 communicates with a scheduling server 15 to upload and/or download one or more aspects of availability data associated with a resource to be maintained for reservation. For example, a user may upload or download information concerning one or more resources from or to one or more applications maintained by the user on a local computer, personal digital assistant, or other information handling system as well from a user maintained network site such as a web-based calendaring application or another content site. Examples of applications or utilities from which information may be uploaded or to which information may be downloaded another, without limitation, Microsoft Outlook®, Yahoo! Calendar®, Lotus Notes®, as well as other calendaring applications.

FIG. 3 is a block diagram of an NFC tag 11 employed in the system of FIG. 1 in accordance with an illustrative embodiment of the invention. The portable electronic device 13 reads the NFC tag 11 to quickly access the schedule of one or more conference rooms. The NFC tag 11 encodes an application identifier 113 and an area address 115, such as a uniform resource locator (URL) for the room. In an embodiment of the invention, the NFC tag 11 is configured for being read by an NFC interface in a passive communication mode. In this mode, the NFC tag 11 draws its operating power from the electromagnetic field provided by the NFC interface of the initiator device. Advantageously, the NFC tag 11 does not require a power supply for operation.

The NFC tag 11 may be an element of a control point located in or near the conference room or may be an independent device disposed on a surface located in or near the conference room. For example, the control point may provide limited functionality, such as displaying the status and schedule of the room, while the portable electronic device 13 provides the interface to access the scheduling program to manipulate the schedule of the room or to view and manipulate the schedule of other conference rooms.

Referring now to FIG. 4, one embodiment of a scheduling application 20 comprising a collection of software engines and data storage areas is shown according to teachings of the present invention. As mentioned above, the number of software engines and data storage areas may be varied and, as such, the specific arrangement discussed herein is presented primarily for descriptive purposes.

As illustrated in FIG. 4, data storage area 201 of nonvolatile storage may include one or more resource availability data storage areas 202. Resource availability data storage area 202 includes data pertaining to times, dates or other information concerning when a resource may be reserved. In one embodiment, resource availability data storage area 202 may cooperate with other data maintained in one or more data storage areas as well as one or more software engines. Data storage area 201 also includes one or more resource data storage areas 204.

Resource data storage area 204 is operable to maintain data concerning one or more aspects of information regarding a resource maintained for reservation. In addition, resource data storage area 204 also includes, for example, various preset parameters 106 (e.g., FIG. 10), preset information 107 (e.g., FIG. 10), preset resources 105 (FIG. 1), and conference type 108 (e.g., FIG. 11). In general, preset resources 105 are conference room devices 102 such as video projector 402, CD player 408, touch panel 411, audio 406, camera 409, DVD/DVR player 407, VCR 410, lighting system device 413, touch panel 411, blinds/shades 414, HVAC system 415, security system 416, sensor system 417, and local computer 405 (FIG. 1). In general, preset parameters 106 (e.g., FIG. 10) are information related to the meeting or conference. For example, preset parameters 106 could include start and end time of the conference, meeting and event types discussion, presentation, audio call, video call, audio and video call, shared documentation, phone number, passcode, and video number. These preset parameters 106 will be further explained below. In general, preset information 107 (e.g., FIG. 10) is information from the preset parameters 106 received from the user. For example, preset information 107 is the actual time (i.e., 8:30 AM) in response to the preset parameter 106 of the meeting start time 1005. It should be understood that preset parameters 106, preset information 107, preset resources 105, and conference type 108 may include other data/information that is programmable depending upon the various aspects of the teachings of the present invention. For example, images, descriptive information, as well as other information regarding a resource maintained for reservation may be stored in resource data storage area. Further, resource data storage area 204 includes information defining relationships between resources, such as relationship details among preset resources 105, preset information 107, and preset parameter 106. Additional information may be maintained in resource data storage area 204 without departing from the spirit and scope of teachings of the present disclosure.

Data storage area 201 also includes one or more user preference data storage areas 218. User preference data storage area 218 is operable to maintain data concerning one or more aspects of information regarding the preferences of the user associated with the personal electronic device 13. Data storage area 201 may comprise settings for resources, conference room devices and environmental controls.

Data storage area 201 also includes one or more access data storage areas 220. Access data storage area 220 is operable to maintain data concerning one or more aspects of information regarding the access information of a user associated with the personal electronic device 13, access information of other users or access information corresponding to one or more resources. This information may include one or more databases linking users and resources with permissions.

Teachings of the present invention may be implemented or effected using a variety of components and/or techniques. In an exemplary embodiment of the present invention, one or more software engines may be leveraged in the management of one or more schedules of conference rooms. As such, according to teachings of the present invention, one or more software engines preferably associated with portable electronic device 13 cooperate to achieve and effect teachings discussed herein.

As illustrated in FIG. 4, an exemplary embodiment of the present invention may include user registration engine 208. User registration engine 208 requires or requests a variety of data from a user during a registration process. For example, requests for data may include the user's name and password for registration purposes. In addition to performing such conventional user registration tasks as requiring or requesting a user to create a user name and/or password, an embodiment of user registration engine 208 employed by portable electronic device 13 preferably requires or requests a registering resource provider to submit availability data as to one or more resources the resource provider desires to maintain for reservation. In addition, user registration engine 208 may also request or require that a resource provider submit information describing the one or more resources to be maintained for reservation. Further, user registration engine 208 may request or require that a resource provider set desired access rights for resource requesters seeking to view the resources maintained for reservation by the resource provider.

Various other data may be gathered from a registering user by a user registration engine 208 incorporating teachings of the present invention. It should be noted that user registration engine 208 may leverage one or more additional software engines in the performance of the exemplary operations discussed above and that in operations discussed, with respect to certain circumstances, user registration engine 208 may be supplanted by alternative software engine functionality.

In addition to user registration engine 208, an example embodiment of a system, method and software incorporating teachings of the present invention also includes preset association engine 210. Preset association engine 210 provides preset parameters 106 to be displayed and defines the association between the preset resources 105 and the preset information 107 obtained by the user from the preset parameters 106. For example, the portable electronic device 13 displays a preset parameter 106 such as asking for a conference type 108 and providing options such as a meeting or an event type of conference. The user seeking to make one or more resources available for reservation may select, for example, a meeting type 108. The preset association engine 210 associates the meeting type (preset information 107) with a list of more preset parameters 106 and/or resources (e.g., conference room devices 102). Once the user chooses the type of conference 108, another preset parameter 106 is requested for the user to enter additional preset information 107. For example, as shown in FIG. 11, if the user chooses a meeting type 108, another preset parameter 106 is prompted to request the user to enter a type of meeting type 108 such as discussion 1102, presentation 1103, audio call 1104, video call 1105, or audio and video call 1106. If the user chooses audio and video call 1106, another preset parameter 106 of upload shared document 1201 (e.g., FIG. 12) is requested of the user. The preset association engine 210 may then associate the audio and video call 1106 with preset resources 105 (e.g., conference room devices 102). Referring to FIG. 1, in this example, the preset resources 105 are telephone 401, video projector 402, camera 409, and computer 405. It should be understood that the preset resources 105 may be altered depending upon the various aspects of the teachings of the present invention.

In an embodiment of the invention, the scheduling application 20 may find an alternative conference room for an attendee due to a scheduling conflict or a lack of required resources in the conference room. Referring back to FIG. 4, the preset association engine 210 operates with an availability data engine 212 as well as other software engines, to determine a conference room 101 that has the required preset resources 105 for the audio and video call 210 and reserve such conference room 101. The availability data engine 212 also includes a synchronization function that enable users to maintain coherency between a portable or local calendaring utility or application and a publicly accessible resource availability and reservation system. Synchronization capabilities also include functionality operable to resolve conflicts between a user's calendaring utility and availability scheduling maintained by the resource availability and reservation system.

In addition to the preset association engine 210, an example embodiment of a system, method and software incorporating teachings of the present invention also includes user preference engine 214. User preference engine 214 provides preset parameters 106 to be displayed and requests a variety of data from a user during a setup process. For example, requests for data may include preferred lighting level, preferred thermostat setting and preferred notification settings.

The software engine also includes a resource request and reservation management engine 222. In one embodiment, the resource request and reservation management engine 222 is employed to monitor and ensure compliance with reservation criteria established by the providers of the resources available for reservation. Further, resource request and reservation management engine 222 may be employed to monitor and ensure compliance with one or more reservation linking requirements requested by a provider of one or more resources available for reservation. In addition, resource request and reservation management engine 222 may, such as through cooperation with notification engine 224, be operable to notify a resource provider of a resource reservation request, to notify a resource requester as to the status of a reservation request for a selected resource, generate one or more meeting requests or reminders indicative of the resource reservation, as well as perform other tasks.

Resource availability verification engine 226 may also be included in an embodiment of the present invention. In one aspect, resource availability verification engine 226 may be used to perform one or more checks on resources maintained for reservation to ensure that postings regarding such resources accurately reflect substantially current or up-to-date availability. In another aspect, resource availability verification engine 226 may, upon receipt of a resource reservation request, verify that a selected resource remains available and has not been reserved in the interim period between a posting of the selected resource's reservation availability and the time when a user makes or initiates a reservation request process. Other operations and benefits may flow from a resource availability verification engine 226 incorporating teachings of the present invention.

In addition to or in lieu of one or more software engines discussed above, notification engine 224 may also be included in an exemplary embodiment of the present invention. Notification engine 224, according to teachings of the present invention, may be employed to provide real-time status information of resources in each conference room including the preset resources 105 such as environmental resources and conference room devices. The notification engine may notify a resource requester or other people such as IT specialist as to the status of the submitted reservation requests and/or acknowledged reservations.

Notification engine 224 may also be leveraged to deliver messages sent between various people such as a user from one conference room to an IT specialist. For example, notification engine 224 in cooperation with other engines and information handling system may provide instant messaging service, short messaging service, multimedia messaging service, or email. It may be appreciated that other situations exist in which a notification would be preferred or required. As such, a variety of other notifications may be performed by notification engine 224 included in an exemplary embodiment of the present invention without departing from the spirit and scope of the teachings discussed herein.

The software engines also include a control engine 228. In general, the control engine 228 may be leveraged in association with one or more included software engines and data available in data storage area to send at least one command to control the associated preset resources once the conference room 101 with the preset resources is reserved. Referring to FIG. 1, for example, the control engine 228 sends a command to control the associated preset resources 105 in response to the start and end time of the conference. The at least one command includes a command to power on/off the video projector, CD player, touch panel, audio, camera, DVD/DVR player, and VCR. The at least one command may also include a command to display and power on/off or dim the lighting system device, control the touch panel, raise/lower the blinds/shades, power on/off or adjust the temperature of the HVAC system, enable/disable the security system, power on/off or move the sensor system, and power on/off local computer. Depending upon implementation, other control commands are contemplated by the present invention.

The software engine also includes a presentation engine 206. In general, the presentation engine 206 may be leveraged in association with one or more included software engines and data available in data storage area to enable visual layout and presentation structure of a management resource reservation, real-time diagnostic and control content pages. For example, presentation engine 206 may enable general content site presentation of one or more resources maintained for 1) reservation, 2) preset parameter, 3) real-time diagnostic, control, and monitor of conference room devices, 4) one or more search features or viewer customization presentation features, 5) meeting start and stop functionality and 6) user communication device formatting, as well as other aspects of delivering resource availability and reservation information to a viewer or registered user via a content site. FIG. 5 through FIG. 16, discussed below, include embodiments of content pages whose presentation and layout may be effected using one or more content presentation engines such as presentation engine 206.

An example embodiment of a system, method and software incorporating teachings of the present invention also includes an access engine 216. The access engine 216 may check the access of a user to a resource such as by maintaining a database listing access permissions for resources and users as identified by the user ID of the portable electronic device. The access engine 216 may subsequently restrict a user's access to view or manage the schedule of a resource. Access may restricted based on a number of factors including time of day or date, location of resource, popularity of resource, priority level of user, employment status or level of user. Additionally, the access engine 216 may limit the functions of the scheduling application based on a user's role in the meeting. For example, a meeting organizer may have more access to modify the meeting than an invited participant.

FIG. 5 is a schematic diagram depicting a main screen page 500 of the scheduling application 20 for a system of managing a conference room schedule, in accordance with an illustrative embodiment of the invention. Upon opening the application manually, a user may be presented with this screen. Main screen options include a preferences icon 501, an access room icon 502, and search icon 503. By selecting the preferences option 501, the user may access a menu for setting certain preferences unique to the user. Selecting the current area 502 may bring up a screen in which the user may enter a URL for a room schedule on a scheduling server or employ an interface of the phone, such as an NFC interface or a Bluetooth interface as will be described below. The search icon 503 allows a user to access a menu where the scheduling application 20 may locate a suitable conference room according to the time of the meeting and required size and resources of the conference room.

FIG. 6 is a schematic diagram depicting a preferences page 600 of the scheduling application 20 for a system of managing a conference room schedule, in accordance with an illustrative embodiment of the invention. The preferences page 600 presents fields in which the user may enter certain preferences for conference room environments and meeting presets. For example, a user may provide preference information regarding lighting levels, HVAC settings, and notification settings for the conference. The preference page comprises a lighting level pull down menu 601, a thermostat setting fillable field 602 and a notification setting pull down menu 603. In an embodiment of the invention, upon reserving a conference room, the scheduling application 20 may forward the preference information to a control processor 42 either directly or via the scheduling server 15.

In another embodiment of the invention, upon entering preference information, the preference information is uploaded and stored by the scheduling server 15 or the control processor 42 and associated with a user ID. Upon the user reserving a conference room with the user ID, the scheduling server 15 or control processor 42 associates the preference information with the reserved conference room.

FIG. 7 is a schematic diagram depicting a schedule page 700 of the scheduling application 20 for a system of managing a conference room schedule, in accordance with an illustrative embodiment of the invention. Upon placing the portable electronic device 13 within communication range of an NFC tag 11 within the area, according to the application ID and area address encoded on the tag, the portable electronic device 13 will launch the scheduling application 20 and display the schedule page 700 for the area. Alternatively, the user may launch the application and manually enter a room address or scan the NFC tag 11 from any menu page in the application to access the schedule page 700.

The schedule page 700 comprises a schedule 701 of the area. The schedule 701 shown in FIG. 7 is a daily schedule with fifteen minute increments; however, the scheduling application 20 may display the schedule 701 in a different time scale and with different increments as well. For example, the scheduling application 20 may display a daily schedule divided into ten minute increments or a weekly or monthly schedule 701 as well.

In addition to the schedule 701 of the area, the schedule page 700 further comprises selectable items comprising an add meeting button 702 and a main menu button 703. As will be described below, by selecting the add meeting button 702, the user may add a meeting for the area. By selecting the main menu button 703, the user may be presented with selectable options of the main menu, either by displaying the selectable options on a portion of the schedule page 700 or by navigating to the main menu page.

The schedule 701 displays the day as time periods divided by fifteen minute increments. Each time period comprises a status indicator 706, indicating whether the room is booked or available during the time period. The status indicator 706 may be selectable icon covering one or more time periods. For example, the selectable icon may be displayed in a certain color or shape to indicate whether the time period is booked or vacant. Additionally, the status indicator may be the absence of a selectable icon or visual indicator. For example, the absence of a selectable icon with meeting information may indicate vacant.

In FIG. 7, each time period is displayed as vacant or booked. For example, shaded may indicate booked and not shaded may indicate available. In an embodiment of the invention, the time period may be highlighted a third color to indicate another state of the conference room. For example, yellow may indicate that the conference room is tentatively booked such as when a meeting confirmation is still pending.

In FIG. 7, the time period from 2:00 PM to 3:30 PM comprises a shaded meeting icon 704 indicating that conference room is booked for this time period. Additionally in the shaded time periods, a title for the meeting, "Patent Review" is displayed. Conversely, the time period from 3:30 PM to 5:15 PM comprises an unshaded vacant icon 705 indicating that it is available.

A booked time period may display the name of the meeting and/or the organizer of the meeting. A user may interact with the schedule 701 such as by scrolling down to view other time periods or by selecting one or more time periods to view information pertaining to a booked time period or to book the time period if available.

A user may reserve the room by either selecting a vacant time period (e.g., 705) on the schedule 701 or selecting the "Add Meeting" button (702).

In an embodiment of the invention, prior to displaying the schedule of the room, the scheduling application may check the access level of the user ID associated with the portable electronic device. The scheduling application may check the access level to determine whether the user may view the schedule, book meetings on the schedule and with what preset resources.

FIG. 8 is a schematic diagram depicting an information pop-up screen 800 of the scheduling application 20 for non-meeting organizers, in accordance with an illustrative embodiment of the invention. The information pop-up screen 800 details information for a meeting scheduled in the conference room. Upon selecting a booked time period, the pop up screen may detail the room information 801, the time information 802 comprising a starting time and ending time, the name of the organizer 803, the subject of the meeting 804, the number of participants in the meeting 805, and other information pertaining to the meeting. The organizer of the meeting may choose which meeting details to display on the scheduling application 20 when organizing the meeting.

In another embodiment of the invention, the information pop-up screen 801 may display the location for shared documentation, a list of one or more requested resources, preconfigured room settings and other information.

FIG. 9 is a schematic diagram depicting an information pop-up screen 900 of the scheduling application 20 for meeting organizers, in accordance with an illustrative embodiment of the invention. The information pop-up screen 900 details information for a meeting scheduled in the conference room. Upon selecting a booked time period, the pop up screen 900 may detail the room information 801, the time information 802 comprising a starting time and ending time, the name of the organizer 803, the subject of the meeting 804, the number of participants in the meeting 805, and other information pertaining to the meeting.

In an embodiment of the invention, the scheduling application checks the user ID associated with the portable electronic device with the user ID listed as the organizer prior to displaying the information pop-up screen 900. The information pop-up screen 900 comprises additional information and selectable icons if the user ID is listed as one of the organizers of the meeting.

In addition to the general information, the information pop-up screen 900 includes one or more selectable icons for operating a meeting comprising a "start meeting" selectable icon 901, a "stop meeting" selectable icon 902, a "start record" selectable icon 903, a "pause record" selectable icon 904, and a "stop record" selectable icon 905.

The "start meeting" selectable icon 901 allows the organizer to begin the meeting. Upon receiving a selection of the start meeting button 901, the scheduling application 20 may send one or more control signals to the preset resources 105 in the conference room. In response to receiving a selection to start a video and audio call, the scheduling application 20 may send a control signal to a video source, such as a TV 404 or projector 403, one or more lighting devices 413, one or more HVAC devices 415, and one or more AV devices. For example, the scheduling application 20 may send a control signal for the projector screen to be lowered, the projector turned on, the lights lowered, and the audio or video pass code to be entered.

Upon receiving a selection to start a presentation, the scheduling application may send a control signal to a video source to display shared documentation, to turn on the lights, and to power on a local computer or networked computer with the shared document.

Depending upon implementation, other control commands are contemplated by the present invention.

Additionally, in response to receiving a selection of the start icon 901, the scheduling application 20 may communicate with the scheduling server 15 to alert the scheduling server 15 that the meeting has started and that the room is not available for other meetings. In the absence of such a communication, after a predetermined amount of time, the scheduling server 15 may allow the conference room to be reserved by other users.

The "stop meeting" selectable icon 902 allows the organizer to stop the meeting. Upon receiving a selection of the stop meeting button 902, the scheduling application 20 may send one or more control signals to the preset resources 105 in the conference room. In response to receiving a selection to stop a video and audio call, the scheduling application 20 may send a control signal to a video source such as a TV or projector. For example, the scheduling application may send a control signal for the projector screen to be raised, the projector powered down, the lights raised, and the audio or video call to be terminated.

Upon receiving a selection to stop a presentation, the scheduling application may send a control signal to a video source to stop displaying shared documentation, to turn off one or more lights and to power down a local or networked computer with the shared document.

Depending upon implementation, other control commands are contemplated by the present invention.

Additionally, in response to receiving a selection of the stop icon, the scheduling application may communicate with the scheduling server to alert the scheduling server that the meeting has ended and that the room is not available for other meetings. This is especially advantageous for meetings that have ended early.

In an embodiment of the invention, the "start meeting" icon 901 and the "stop meeting" icon 902 are the same icon. For example, the selectable icon may be a binary icon whose state depends on the state of the meeting. When the meeting is progressing, the icon functions as a "stop meeting" icon and when the meeting is stopped, the icon functions as a "start meeting" icon. The icon may be displayed differently depending on the state of the icon.

In embodiments of the invention, in which the conference room is equipped with a presentation or lecture capture device 412, the "start record", "stop record" and "pause record" selectable icons 903, 904, 905 allow for the user to control recording via the portable electronic device 13. The portable electronic device 13 may communicate with the lecture capture device 412 via communication with the control server or via the scheduling server 15.

The "start record" selectable icon 903 allows the organizer to begin recording the meeting. Upon receiving a selection of the start record selectable icon 903, the scheduling application 20 may send one or more control signals to the presentation capture device 412 in the conference room to start recording. Upon receiving a selection of the pause record selectable icon 904, the scheduling application 20 may send one or more control signals to the presentation capture device 412 in the conference room to pause recording. Upon receiving a selection of the stop record selectable icon 905, the scheduling application 20 may send one or more control signals to the presentation capture device 412 in the conference room to conclude recording the meeting. Additionally, in response to a selection of the stop record selectable icon 902, the scheduling application 20 may send one or more control signals to the presentation capture device 412 to upload to the recording to a media server according to preferences associated with the user ID.

In an embodiment of the invention, the information pop-up screen may also display control settings for other devices such as AV resources or lighting resources. The portable electronic device 13 may communicate with the AV resources via communication with the control server through the communication network or via the scheduling server 15.

In an embodiment of the invention, the "start recording" icon 903 and the "stop recording" icon 905 are the same icon. For example, the selectable icon may be a binary icon whose state depends on the state of the meeting. When the meeting is progressing, the icon functions as a "stop recording" icon and when the meeting is stopped, the icon functions as a "start recording" icon. The icon may be displayed differently depending on the state of the icon.

FIG. 10 is a schematic diagram depicting a general information scheduling tab 1001 of the scheduling application 20, in accordance with an illustrative embodiment of the invention. Upon a user selecting one or more consecutive time periods (e.g., 705, FIG. 7) to book a meeting, the scheduling sub-menu 1000 is displayed, allowing the user to book the area for a period of time. Alternatively, a user may select the book meeting menu 702 displayed on the schedule page 700 (FIG. 7) of the scheduling application 20.

The scheduling menu 1000 comprises three tabs: a general information tab 1001, a presets tab 1100, and a people tab 1600. The general information tab 1001 includes preset parameters 106 associated with general information for the meeting. The preset parameters 106 solicit the subject of the meeting 1002, the location of the meeting 1003, the date of the meeting 1004, the start time of the meeting 1005, the end time of the meeting 1006 and the recurrence of the meeting 1007. Aside from the subject preset parameter 1002 and the recurrence preset parameter 1007, the scheduling application 20 fills in preset information 107 according to the room, date and time period selected from the calendar by the user. If the user accessed the scheduling menu from the "Add meeting" button 702, the preset parameters 106 may not be filled in by the scheduling application 20. The user may edit this information 107 from the general information tab 1001.

The responses to the preset parameters 106 are preset information 107 that may be used to associate with resources. The associated resources are preset resources 105 that are reserved for the meeting. The resources are conference room resources such as the conference room 101 itself and conference room devices 102 or other type of resources that are programmable depending upon the various aspects of the teachings of the present invention. In this example, the resource may be a conference room A113 for the meeting.

FIG. 11 is a schematic diagram depicting a presets tab 1100 of the scheduling application 20 for a discussion, in accordance with an illustrative embodiment of the invention. The preset parameters 106 displayed in the presets tab 1100 are associated with the conference type 108. The preset parameters 106 include the type of meeting 108 such as discussion 1102, presentation 1103, audio call 1104, video call 1105, and audio and video call 1106. The preset parameters 106 may also include a "welcome message" 1107 and "image source" 1108 for sharing and/or displaying.

FIG. 12 is a schematic diagram depicting a presets tab 1100 of the scheduling application 20 for a presentation 1103, in accordance with an illustrative embodiment of the invention. For each meeting type 108, there may be another set of preset parameters 106 displayed in the conference type section of the tab. For example, if the user selects a "presentation" meeting type 1103, the preset parameter 106 includes shared document 1201 as shown in FIG. 12. This shared document 1201 is available for the presentation 1103. The preset information 107 obtained from the preset parameter 106 is associated with a need for a computer 405, lighting system 413, and projector 402 for the presentation 1103 type of meeting. The portable electronic device 13 may automatically send at least one command to turn on the lights in the conference room and power on the computer and projector 402 to display the shared document. In this example, the user will save setup time because the user will not have to turn on the lights or setup the computer and projector 402 to display the shared file since this will be done automatically. Moreover, the shared file 1201 is shared with the conference participants and therefore saves the user the time and effort of emailing every participant the file.

In another embodiment, the user selects the "Audio Call" type 1104 of conference, another set of preset parameters 106 are displayed on the screen as shown in FIG. 13. The displayed preset parameters 106 include the shared document 1201, phone number 1301, and passcode 1302 for access into the audio call 1104. In this particular example, the conference room resources associated with an audio call 1104 are a computer 405, speaker phone 401, lighting system 413, projector 402 and projector screen 403. At the start time of the conference, the portable electronic device 13 sends at least one command to power on the lighting system 413 and projector 402, lowers the projector screen 403, display the shared file on to the projector screen 403, and dials into the audio call 1104 using the phone number and passcode. The user comes to the conference room without having to setup the audio call.

In another embodiment, the user selects the "Video Call" type 1105 of conference, another set of preset parameters 106 are displayed on the screen as shown in FIG. 14. The displayed preset parameters 106 include the shared document 1201 and video number 1401. In this particular example, the conference room resources are computers 405, webcams, HD cameras 409, headsets, projector screen 403, lighting system 413, and conference room microphones. At the start time of the conference, the portable electronic device 13 sends at least one command to power on the various preset resources, adjust the lighting system, dial the video number, and lower the projector screen 403. The user comes to the conference room without having to setup the video call. The video connection is established for the video call.

In another embodiment, the user selects the "Video and Audio Call" type 1106 of conference, another set of preset parameters 106 are displayed on the screen as shown in FIG. 15. The displayed preset parameters 106 include the shared document 1201, phone number 1301, passcode 1302, and video number 1401. Based on the present information 107 that is received from the user in response to the preset parameters 106, the scheduling application 20 associates the preset parameter 106 with the required conference room resources. In this particular example, the conference room resources are computers 405, speakerphones, lighting system 413, projector 402 and projector screen 403, webcams, HD cameras 409, headsets (not shown), and conference room microphones (not shown). At the start time of the conference, the portable electronic device 13 sends at least one command to power on the various preset resources, adjust the lighting system, dial the video number, and lower the projector screen 403. The user arrives in the conference room without having to setup the video call.

FIG. 16 is a schematic diagram depicting a people tab 1600 of the scheduling application 20, in accordance with an illustrative embodiment of the invention. The people tab 1600 may display preset parameters 106 of required users 1601 and optional users 1602. The user may enter the names of participants to be invited to the meeting. Advantageously, via integration with email system of the area, participants may be emailed a request for the meeting.

FIG. 17 is a flowchart 1700 showing steps for performing a method of accessing a conference room schedule, in accordance with an illustrative embodiment of the invention. In step 1701, a user positions the portable electronic device 13 such that the NFC interface is in communication range with the NFC tag 11. The user may tap a surface of the phone near the NFC tag 11 or position the NFC interface of the portable electronic device 13 to within a range of approximately two to four centimeters of the NFC tag 11.

In step 1702, the portable electronic device 13 reads the information encoded on the NFC tag 11, such as the application identifier 113, and the room or location address 115 over an NFC communication channel 111. The room or location address 115 may be a URL of the scheduling server 15. Upon placing the portable electronic device 13 within NFC communication range of the NFC tag 11, the NFC interface of the portable electronic device 13 creates an electromagnetic field, thereby energizing the NFC tag 11. The NFC tag 11 is configured for manipulating the generated electromagnetic field according to the encoded information via load modulation. The NFC interface of the portable electronic device 13 reads the encoded information from the modulated electromagnetic field.

In embodiments of the invention in which the NFC tag 11 encodes information in addition to the application identifier 113 and the server URL for the room the NFC interface reads this information from the NFC tag 11, as well.

In step 1703, the smart phone loads the scheduling application 20 according to the application identifier 113. The application identifier 113 read from the NFC tag 11, instructs the portable electronic device 13 which scheduling application 20 to launch.

In step 1704, upon launching the scheduling application 20, the scheduling application 20 is configured for establishing communication with the scheduling server 15 according to the URL encoded on the NFC tag 11. The scheduling application 20 may communicate the user ID associated with the scheduling application 20 to the scheduling server 15 thereby allowing the scheduling server 15 to determine the identity and location of the user.

In step 1705, the scheduling application 20 displays a calendar of the schedule application according to the address of the conference room received via the NFC tag 11. The schedule may be displayed as a spreadsheet containing one or more columns corresponding to one or more days and rows corresponding to one or more time periods, such as fifteen minute increments. Time periods in which the conference room is booked may be highlighted a first color such as red and time periods in which the conference room is available may be displayed as not highlighted. Additionally, information concerning the event for which a room is booked may be listed in the relevant cell.

In step 1706, the scheduling application 20 receives on or more inputs for reserving a conference room. From the calendar page of the scheduling application 20, a user may book the room during an available time period by selecting the time period. The user may select the time period by selecting one or more cells from the scheduling application 20 or from a scheduling content page which the scheduling application 20 may display.

In step 1707, the scheduling application 20 displays one or more preset parameters for receiving preset information detailing the meeting. The scheduling content page may comprise one or more fields to determine one or more of the following: date of the event, the start time of the event, the end time of the event, a title of the event, the number of attendees of the event, the name of the event, shared documentation for the event, resources required for the event, presets for the resources, and environmental conditions for event.

In step 1708, the scheduling application 20 receives one or more preset information detailing the meeting. For example, the scheduling application 20 may receive the start time and end time of the meeting, the subject of the meeting, the recurrence of the meeting, participants in the meeting, the type of meeting and conference information associated with the meeting, a welcome message and an image.

Additionally, the user may access a search content page (503, FIG. 5) which will allow a user to search for an available conference room. The search may be dependent on one or more of the following: date of the event, start time of the event, end time of the event, number of attendees, and required resources.

Further from the scheduling application 20, the user may start the meeting and end a meeting early. For example, the scheduling application 20 may recognize the user ID of the portable electronic device 13 and the location of the NFC tag 11 and at an appropriate time display a selectable item for starting the meeting. While the meeting is in progress, the scheduling application 20 may then display a selectable icon for ending the meeting.

FIG. 18 shows an exemplary embodiment of a system 100 for managing a conference room schedule in accordance with an illustrative embodiment of the present invention. It should be noted that the exemplary embodiment of system 100 illustrated in FIG. 18 may be varied in one or more aspects without departing from the spirit and scope of the teachings disclosed herein.

In this embodiment, the identification unit comprises one or more RF beacons 18. The one or more RF beacons 18 may be configured for communicating via Bluetooth 4.0 protocols. Specifically, the RF beacons 18 may utilize Bluetooth 4.0 Low Energy protocol to broadcast information.

The RF beacons 18 periodically broadcast information comprising their beacon ID 185 and an application identifier 113. The beacon ID 185 may be an identification number independent of location, such as network address, or may be a location such as coordinates or a room address. There are advantages associated with each of these schemes. By broadcasting beacon ID 185 as a location, the portable electronic device 13 does not need to match an identity with a location. Accordingly, no lookup tables associating an address to a location need be stored by the portable electronic device. However, each beacon must then be dedicated to a certain location or configured to broadcast a different location as a beacon ID 185 upon redeployment.

Contrastingly, by broadcasting a network address as a beacon ID 185, the location need not be programmed on the RF beacon and the beacons 18 may be relocated after deployment without reprogramming the beacon. However, the scheduling application may then require a lookup table indexing address with location.

In an embodiment of the invention, the beacon ID 185 is the room address 115 (i.e. scheduling server address). In this embodiment, the scheduling application may then be configured to match scheduling server address with a room to determine location. For example, the scheduling application may comprise a lookup table listing scheduling server addresses by location in the facility. In another embodiment of the invention, each RF beacon 18 is configured for transmitting both a beacon ID 185 and a scheduling server address 115.

Preferably, a plurality of RF beacons 18 are placed strategically throughout a structure to enable the portable electronic device to be in communication range with three RF beacons 18 at any time. In this embodiment, the system comprises at least three RF beacons 18. Advantageously, this allows for estimation of location to a point using trilateration. In other embodiments, with less than three RF beacons 18, location may be estimated within a range.

However, it should be noted that the system may comprise less than three RF beacons 18. The particular layout of a structure may only require that a portable electronic device be in communication with one or two RF beacons 18 to accurately determine in which room or location the portable electronic device is located.

The personal area network interface of the portable electronic device 13 is configured for determining the received signal strength of each received beacon broadcast. For example, the personal area network interface may measure signal strength of broadcasts by received signal strength indicator (RSSI). By utilizing the received signal strength of each beacon, the portable electronic device 13 may estimate its distance to each beacon 18. The scheduling application 20 may comprise a lookup table indexing distances from beacon to RSSI. Accordingly, by mapping the beacon ID 185 to a location in the facility and by determining its distance to one or more beacons 18, the portable electronic device 13 may determine its location in a facility.

FIG. 19 shows a schematic of a facility with a plurality of rooms, each comprising an RF beacon 18*a-n*, according to an illustrative embodiment of the invention. For example, the facility may be a corporate building comprising offices and conference rooms. An RF beacon 18*a-n* is placed in each room of the facility. The RF beacon 18*a-n* may be placed in a common location such as a light switch or touch panel or may be placed in a remote location out of view. Each RF beacon 18*a-n* periodically, transmits its beacon ID 185, the application identifier 113 and in some embodiments, the scheduling server address 115. The portable electronic device 13 periodically listens for RF beacon transmissions. The scheduling application 20 determines a first distance 181, a second distance 182 and a third distance 183 to a first RF beacon 18*a*, a second RF beacon 18*b*, and a third RF beacon 18*c*, respectively. Preferably, the scheduling application 20 determines the first distance 181, the second distance 182 and the third distance 183 with the three RF beacons 18*a-c* with the strongest received signal according to RSSI. The scheduling application 20 may determine its location by calculating the intersection of a first range with the first distance 181 as a radius, a second range with the second distance 182 as a radius, and a third range with the third distance 183 as a radius. By strategically placing RF beacons 18*a-n* throughout a facility, the portable electronic device 13 may determine its location throughout the facility by periodically calculating its range to any three RF beacons 18*a-n*.

FIG. 20 is a flowchart 2000 showing steps for performing a method managing a conference room schedule via communication with an RF beacon 18, according to an illustrative embodiment of the invention. In step 2001, a user positions the portable electronic device 13 such that the PAN interface is in communication range with a first RF beacon 18*a*, a second RF beacon 18*b*, and a third RF beacon 18*c*. The user may position the portable electronic device 13 by simply walking within while carrying the portable electronic device.

In step 2002, the portable electronic device 13 receives the information broadcast by the first RF beacon 18*a*, second RF beacon 18*b*, and third RF beacon 18*c*, such as the application identifier 113 and each beacon ID 185. In embodiments of the invention, each RF beacon additionally broadcasts a URL for accessing the schedule of the location on a scheduling server.

In step 2003, the portable electronic device 13 loads the scheduling application 20 according to the application identifier 113. The application identifier 113 received from the RF beacons 18, instructs the portable electronic device 13 which scheduling application 20 to launch.

In step 2004, the scheduling application 20 estimates a distance to the RF beacon 18. By utilizing the received signal strength of each beacon 18, the scheduling application 20 may determine its distance from each RF beacon 18. In an embodiment of the invention, the PAN interface of the portable electronic device 13 measures the RSSI of each received broadcast and utilizes a lookup table listing distance to beacon by RSSI to determine a distance to the RF beacon 18.

In another embodiment of the invention, the PAN interface may compare the ratio of received signal strength to broadcast signal strength to determine a distance to the beacons 18. In this embodiment, the broadcast signal strength of the RF beacon 18 may be a known quantity. In another embodiment of the invention, the RF beacon 18 broadcasts this quantity.

In this embodiment, the portable electronic device 13 continues listening until receiving a broadcast from three RF beacons 18*a-c*. In embodiments in which more than three beacons 18 are in range, the scheduling application 20 may use the three strongest received signals. Additionally, the scheduling application 20 may use the identity and signal strength of additional RF beacons 18 as an error check or redundancy. The scheduling application 20 repeats steps 2004 for each of the RF beacons 18 thereby estimating a range to at least three RF beacons 18.

In step 2005, the scheduling application 20 determines its location according to the location information received from the RF beacons 18 via trilateration. The position of each RF beacon 18 is known by the scheduling application 20 as well as an estimated distance to at least three RF beacons 18, the scheduling application 20 may determine its location in coordinates. By determining the intersection point of the three ranges to three RF beacons 18, the scheduling application 20 may determine the location of the portable electronic device 13.

The scheduling application 20 maps to a floor plan of the facility to determine a location by room or area. By mapping the location to a floor plan, the scheduling application may know which room the portable electronic device, and therefore the user, is located.

In step 2006, upon launching the scheduling application 20, the scheduling application 20 is configured for establishing communication with the scheduling server 15 according to a URL of the room stored by the scheduling application 20 or received from the RF beacon 18. The scheduling application 20 may communicate the user ID associated with the scheduling application 20 to the scheduling server 15 thereby allowing the scheduling server 15 to determine the identity and location of the user.

However as will be discussed in reference to FIG. 21, in certain embodiments the portable electronic device 13 may not be configured to communicate via the communication network 104 (FIG. 18). In these applications, the one or more RF beacons 18 may act as an intermediary gateway between the portable electronic device 13 and the control processor 40/42.

In step 2007, the scheduling application 20 displays a schedule of the schedule application 20 according to the location of the portable electronic device 13. The schedule may be displayed as a spreadsheet containing one or more columns corresponding to one or more days and rows corresponding to one or more time periods, such as fifteen minute increments. Time periods in which the conference room is booked may be highlighted a first color such as red and time periods in which the conference room is available may be displayed as not highlighted. Additionally, information concerning the event for which a room is booked may be listed in the relevant cell.

In step 2008, the scheduling application 20 receives on or more inputs for reserving a conference room. From the calendar page of the scheduling application 20, a user may book the room during an available time period by selecting the time period. The user may select the time period by selecting one or more cells from the scheduling application 20 or from a scheduling content page which the scheduling application 20 may display.

In step 2009, the scheduling application 20 displays one or more preset parameters 106 for receiving preset information 107 detailing the meeting. The scheduling content page may comprise one or more fields to determine one or more of the following: date of the event, the start time of the event, the end time of the event, a title of the event, the number of attendees of the event, the name of the event, shared documentation for the event, resources required for the event, presets for the resources, and environmental conditions for event.

In step 2010, the scheduling application 20 receives one or more preset information 107 detailing the meeting. For example, the scheduling application 20 may receive the start time and end time of the meeting, the subject of the meeting, the recurrence of the meeting, participants in the meeting, the type of meeting and conference information associated with the meeting, a welcome message and an image.

Additionally, the user may access a search content page which will allow a user to search for an available conference room. The search may be dependent on one or more of the following: date of the event, start time of the event, end time of the event, number of attendees, and required resources.

Further from the scheduling application 20, the user may start the meeting and end a meeting early. For example, the scheduling application 20 may recognize the user ID and location of the portable electronic device 13 and at an appropriate time display a selectable item for starting the meeting. While the meeting is in progress, the scheduling application 20 may then display a selectable icon for ending the meeting.

FIG. 21 is a flowchart showing steps for performing a method for managing a conference room schedule via communication with an RF beacon 18, according to an illustrative embodiment of the invention.

In certain embodiments the portable electronic device 13 may not be configured to communicate via the communication network 104. In these applications, the one or more RF beacons 18 may act as an intermediary gateway between the portable electronic device 13 and the control processor 40/42.

In this method, steps 2001, 2003-2005, 2007-2010 are performed in substantially the same manner as in the method shown in FIG. 20.

In step 2102, the portable electronic device 13 receives the information broadcast by the first RF beacon 18a, second RF beacon 18b, and third RF beacon 18c, such as the application identifier 113 and each beacon ID 185. In contrast to the method shown in FIG. 20, the RF beacon 18 does not broadcast and the portable electronic device 13 need not receive a URL for the scheduling server 15.

In step 2106a, upon launching the scheduling application 20, the scheduling application 20 pairs the portable electronic device 13 to the nearest RF beacon 18 using RF communication protocols such as Bluetooth communication protocols. The scheduling application 20 may determine the nearest RF beacon 18 based on signal strength of the received broadcast or by looking up the nearest RF beacon 18 to its location from a stored directory.

In step 2106b, the scheduling application 20 may communicate the user ID associated with the scheduling application 20 to the paired RF beacon 18 which in turn may communicate to the scheduling server 15 thereby allowing the scheduling server 15 to determine the identity and location of the user. The RF beacon 18 and the scheduling server 15 may communicate via a LAN or PAN.

FIGS. 22A-22B is a flowchart 2200a-b showing steps for performing a method of accessing a conference room schedule, in accordance with an illustrative embodiment of the invention. In step 2201, a user positions the portable electronic device 13 such that the NFC interface is in communication range with the NFC tag 11. The user may tap a surface of the phone near the NFC tag 11 or position the NFC interface of the portable electronic device 13 to within a range of approximately two to four centimeters of the NFC tag 11.

In step 2202, the portable electronic device 13 reads the information encoded on the NFC tag 11, such as the application identifier 113, and URL 115 of the scheduling server 15, over an NFC communication channel 111. Upon placing the portable electronic device 13 within NFC communication range of the NFC tag 11, the NFC interface of the portable electronic device 13 creates an electromagnetic field, thereby energizing the NFC tag 11. The NFC tag 11 is configured for manipulating the generated electromagnetic field according to the encoded information via load modulation. The NFC interface of the portable electronic device 13 reads the encoded information from the modulated electromagnetic field.

In embodiments of the invention in which the NFC tag 11 encodes information in addition to the application identifier 113 and the server URL 115 the NFC interface reads this information from the NFC tag 11, as well.

In step 2203, the smart phone 13 loads the scheduling application 20 according to the application identifier 113. The application identifier 113 read from the NFC tag 11, instructs the portable electronic device 13 which scheduling application 20 to launch.

In step 2204, upon launching the scheduling application 20, the scheduling application 20 is configured for establishing communication with the scheduling server 15 according to the URL 115 encoded on the NFC tag 11. The scheduling application 20 may communicate the user ID associated with the scheduling application 20 to the scheduling server 15 thereby allowing the scheduling server to determine the identity and location of the user.

In step 2205, the scheduling application 20 checks the access of the user ID associated with the scheduling application 20. The scheduling application 20 may check against a database to determine whether the user may view the schedule of that area, book meetings on the schedule of the area and with what preset resources and the role of the user ID in any meetings scheduled for the area.

If the user ID associated with the scheduling application 20 does not have access to view the schedule of the area, in step 2206, the scheduling application 20 displays an error page.

If the user ID associated with the scheduling application 20 does have permission to view the schedule of the area but not to manage it, in step 2207, the scheduling application 20 displays the schedule of the area without selectable time periods allowing to schedule a meeting. For example, the schedule may be a view only schedule or may allow the user to select meetings to view information about the meetings. The user will not, however, be presented with selectable time periods.

If the user ID associated with the scheduling application 20 does have permission to view the schedule of the area and permission to manage it, in step 2208, the scheduling application 20 displays the schedule of the area with selectable time periods allowing to schedule a meeting.

In step 2209, the scheduling application 20 receives one or more inputs selecting a meeting from the schedule. From the calendar page of the scheduling application 20, a user may select one of the selectable time periods with a meeting status indicator.

If the user ID is not an organizer of the meeting, as determined by the access of the user ID, in step 2210, the scheduling application 20 displays a pop-up menu with meeting information such as in FIG. 8. The user may view information about the meeting comprising the organizer, the subject, the start and end time, the date and the attendees.

If the user ID is an organizer of the meeting, as determined by the access of the user ID, in step 2211, the scheduling application 20 displays a pop-up menu with meeting information and selectable icons for starting a meeting 901 and ending a meeting 902 such as in FIG. 9.

As will be discussed in reference to step 2216, if the meeting comprises the preset resource of a presentation or lecture capture device, the scheduling application 20 displays a pop menu further comprising selectable icons to start recording 903, pause recording 904, and stop recording 905, such as in FIG. 9.

In step 2212, the scheduling application 20 receives a selection to start the meeting. For example, a user may select a "start meeting" icon 901 of the pop-up menu page 900 in FIG. 9.

In step 2213, the scheduling application 20 transmits one or more control signals in response to receiving a selection of the "start meeting" icon 901.

In step 2214, the scheduling application 20 receives a selection to stop the meeting. For example, a user may select a "stop meeting" icon 902 of the pop-up menu page 900 in FIG. 9.

In step 2215, the scheduling application 20 transmits one or more control signals in response to receiving a selection of the "stop meeting" icon 902.

In step 2216, if the meeting comprises the preset resource of a presentation or lecture capture device, the scheduling application 20 displays a pop menu 900 further comprising selectable icons to start recording 903, pause recording 904, and stop recording 905, such as in FIG. 9.

In step 2217, the scheduling application 20 receives a selection to start recording the meeting. For example, a user may select a "start recording" icon 903 of the pop-up menu page 900 in FIG. 9.

In step 2218, the scheduling application 20 transmits one or more control signals in response to receiving a selection of the "start recording" icon 903.

In step 2219, the scheduling application 20 receives a selection to stop recording the meeting. For example, a user may select a "stop recording" icon 905 of the pop-up menu page 900 in FIG. 9.

In step 2220, the scheduling application 20 transmits one or more control signals in response to receiving a selection of the "stop recording" icon 905.

FIGS. 23A-B is a flowchart 2300a-b showing steps for performing a method of accessing a conference room schedule, in accordance with an illustrative embodiment of the invention. In step 2301, a user positions the portable electronic device 13 such that the PAN interface is in communication range with a first RF beacon 18a, a second RF beacon 18b, and a third RF beacon 18c. The user may position the portable electronic device 13 by simply walking within while carrying the portable electronic device 13.

In step 2302, the portable electronic device 13 receives the information broadcast by the first RF beacon 18a, second RF beacon 18b, and third RF beacon 18c, such as the application identifier 113 and each beacon ID 185.

In step 2303, the portable electronic device 13 loads the scheduling application 20 according to the application identifier 113. The application identifier 113 received from the RF beacons 18, instructs the portable electronic device 13 which scheduling application 20 to launch.

In step 2304, the scheduling application 20 estimates a distance to at least three RF beacons 18a-c. By utilizing the received signal strength of each beacon 18, the scheduling application may determine its distance from each RF beacon 18. In an embodiment of the invention, the PAN interface of the portable electronic device 13 measures the RSSI of each received broadcast and utilizes a lookup table listing distance to beacon by RSSI to determine a distance to the RF beacon 18.

In this embodiment, the portable electronic device 13 continues listening until receiving a transmission from three RF beacons 18a-c. In embodiments in which more than three beacons 18 are in range, the scheduling application 20 may use the three strongest received signals. Additionally, the scheduling application 20 may use the identity and signal strength of additional RF beacons 18 as an error check or redundancy. The scheduling application 20 repeats steps 2304 for each of the RF beacons 18 thereby estimating a range to at least three RF beacons 18.

In step 2305, the scheduling application 20 determines its location according to the location information received from the RF beacons 18 via trilateration. The position of each RF beacon 18 is known as well as an estimated distance to at least three RF beacons 18, the scheduling application 20 may determine its location by coordinates. By determining the intersection point of the three ranges to three RF beacons 18, the scheduling application 20 may determine the location of the portable electronic device 13.

The scheduling application 20 maps to a floor plan of the facility to determine a location by room. By mapping the location to a floor plan, the scheduling application 20 may know which room the portable electronic device, and therefore the user, is located.

In step 2306, upon launching the scheduling application 20, the scheduling application 20 is configured for establishing communication with the scheduling server 15 according to the URL received from the RF beacon. The scheduling application 20 may communicate the user ID associated with the scheduling application 20 to the scheduling server 15 thereby allowing the scheduling server 15 to determine the identity and location of the user.

In step 2307, the scheduling application 20 checks the access of the user ID associated with the scheduling application 20. The scheduling application 20 may check against a database to determine whether the user may view the schedule of that area, book meetings on the schedule of the area and with what preset resources and the role of the user ID in any meetings scheduled for the area.

If the user ID associated with the scheduling application 20 does not have access to view the schedule of the area, in step 2308, the scheduling application 20 displays an error page.

If the user ID associated with the scheduling application 20 does have permission to view the schedule of the area but not to manage it, in step 2309, the scheduling application 20 displays the schedule of the area without selectable time periods allowing to schedule a meeting. For example, the schedule may be a view only schedule or may allow the user to select meetings to view information about the meetings. The user will not, however, be presented with selectable time periods.

If the user ID associated with the scheduling application 20 does have permission to view the schedule of the area and permission to manage it, in step 2310, the scheduling application 20 displays the schedule of the area with selectable time periods allowing to schedule a meeting.

In step 2311, the scheduling application 20 receives one or more inputs selecting a meeting from the schedule. From the calendar page of the scheduling application 20, a user may select one of the selectable time periods with a meeting status indicator.

If the user ID is not an organizer of the meeting, as determined by the access of the user ID, in step 2312, the scheduling application 20 displays a pop-up menu with meeting information such as in FIG. 8. The user may view information about the meeting comprising the organizer, the subject, the start and end time, the date and the attendees.

If the user ID is an organizer of the meeting, as determined by the access of the user ID, in step 2313, the scheduling application 20 displays a pop-up menu with meeting information and selectable icons for starting a meeting and ending a meeting such as in FIG. 9.

As will be discussed in reference to step 2318, if the meeting comprises the preset resource of a presentation or lecture capture device, the scheduling application 20 displays a pop menu further comprising selectable icons to start recording, pause recording, and stop recording.

In step 2314, the scheduling application 20 receives a selection to start the meeting. For example, a user may select a "start meeting" icon of the pop-up menu page.

In step 2315, the scheduling application 20 transmits one or more control signals in response to receiving a selection of the "start meeting" icon.

In step 2316, the scheduling application 20 receives a selection to stop the meeting. For example, a user may select a "stop meeting" icon of the pop-up menu page.

In step 2317, the scheduling application 20 transmits one or more control signals in response to receiving a selection of the "stop meeting" icon.

In step 2318, if the meeting comprises the preset resource of a presentation or lecture capture device, the scheduling application 20 displays a pop menu further comprising selectable icons to start recording, pause recording, and stop recording.

In step 2319, the scheduling application 20 receives a selection to start recording the meeting. For example, a user may select a "start recording" icon of the pop-up menu page.

In step 2320, the scheduling application 20 transmits one or more control signals in response to receiving a selection of the "start recording" icon.

In step 2321, the scheduling application 20 receives a selection to stop recording the meeting. For example, a user may select a "stop recording" icon of the pop-up menu page.

In step 2322, the scheduling application 20 transmits one or more control signals in response to receiving a selection of the "stop recording" icon.

In addition to scheduling meeting rooms, the systems of the present embodiments leverage short range communication technologies, such as Near Field Communication and Bluetooth, to enable enterprise end users to easily and quickly utilize their portable electronic devices 13, such as smartphones, to connect to and efficiently utilize devices or equipment located within one or more areas in a facility, such as conference room devices 102 in meeting room 101 in a corporate facility (FIGS. 1 and 18). One or more portable electronic devices 13, such as a smartphone, can pair with one or more meeting room devices 102 via one or more beacons 18 (or NFC tags 11) allowing the enterprise end user to utilize and control the resources provided in the meeting room. The one or more beacons 18 are configured to broadcast information via short-range communication. The end user's portable electronic device 13 comprises one or more software applications configured for reading the broadcasted information, using that information to pair with the meeting room devices or equipment 102, and allowing the end users to utilize and control the meeting room devices or equipment 102. These one or more software applications, as well as the scheduling application 20 discussed above, can comprise modules of an enterprise meeting application designed to enable enterprise end users to efficiently utilize meeting rooms.

FIG. 24 shows an exemplary embodiment of a system 2400 for enabling enterprise end users to utilize their portable electronic devices 2402, 2403 to connect to and utilize presentation facilitating devices or equipment, such as a presentation gateway 2410, located within a meeting room 2401. Particularly, presentation system 2400 enables live presentation content sharing between meeting presenter's and meeting attendees' portable electronic devices during a meeting. It should be noted that the exemplary embodiments of presentation system 2400 may be varied in one or more aspects without departing from the spirit and scope of the teachings disclosed herein. While the embodiments are described herein as being implemented for presentation content sharing during a business meeting in a commercial conference room, it is not limited to such an implementation. The present embodiments may be employed to share presentation content in other venues, facilities, or gatherings where presentation content sharing is desired. For example, system 2400 may be employed within commercial, residential, retail, or non-profit venue structures, as well as for professional, education, entertainment, and general communication. Presentation content sharing of the present embodiments may be utilized in a small scale conference room with few attendees, during a mid-sized live lecture, or during a large scale seminar or commercial event with hundreds of attendees.

According to one embodiment, the presentation system 2400 includes a presentation gateway 2410, presenter portable electronic device 2402, a meeting room display 2406, attendee portable electronic device 2403, and one or more radio frequency beacons 2404 located within a meeting room 2401.

Aspects of the embodiments described herein provide cross-platform presentation system 2400 that eases presentations by using network connections to allow presenters to share their presentation content without dealing with physical connection to the meeting room display or equipment. The presentation system 2400 quickly and simply pairs the presenter portable electronic device 2402 and attendee portable electronic device 2403 with the presentation gateway 2410 via one or more radio frequency beacons 2404. The presentation system 2400 provides an enhanced collaborative environment. It allows a meeting presenter to present presentation content 2414 from the presenter portable electronic device 2402 on a meeting room display 2406. A presenter utilizes the presentation system 2400 described herein to present presentation content 2414 on a meeting room display 2406 during a meeting, such as on a display screen in a conference room in a corporate facility, by pairing the presenter portable electronic device 2402 with the presentation gateway 2410.

System 2400 further allows meeting attendees to view the presentation content 2414 at their portable electronic devices 2403, as well as to annotate, manipulate, and further share the presentation content during a meeting. A meeting attendee can view the presentation content 2414 on any portable electronic device 2403 substantially in synch with the presentation displayed on the meeting room display 2406 by pairing the attendee portable electronic device 2403 with the presentation gateway 2410. In other words, the displayed image on the portable electronic device 2403 "mirrors" the image on the meeting room display 2406. Any number of second screen devices can view the image at the same time. The meeting presenter and/or the attendee can further manipulate the presentation content 2414, such as by annotating, zooming, stretching, pausing, rotating, viewing previous slides, saving, among other features further described herein.

Presentation system 2400 may further comprise remote servers for additional processing and functionality. For example, presentation system 2400 can include an enterprise server 2412, which can incorporate the scheduling server 15 described above, for enabling room scheduling and allocation of room resources, such as the presentation gateway 2410. Presentation system 2400 can further include a calendar server 2416 for receiving user's calendar information. In an embodiment, calendar server 2416 can be integrated with the enterprise server 2412. Portable electronic devices 2402, 2403 and presentation gateway 2410 can communicate with one or more remote servers via the communication network 2417. Communication network 2417 can comprise similar configuration to communication network 104 discussed above, and can comprise a wide area network (WAN), such as the Internet.

Presenter portable electronic device 2402 and attendee portable electronic device 2403 can comprise any portable electronic device known in the art, including but not limited to a laptop computer, a smartphone, a tablet, or the like. Presenter portable electronic device 2402 and attendee portable electronic device 2403 can comprise similar construction as portable electronic device 13 shown in FIG. 2 and described above. Portable electronic devices 2402, 2403 may comprise one or more software applications, including an enterprise meeting application 2600, discussed below with reference to FIG. 26, for enabling users to pair with one or more meeting room devices, such as the presentation gateway 2410. The enterprise meeting application 2600 can comprise a presentation application 2601 for enabling users to share presentation content 2414 via the presentation gateway 2410. The presentation application 2601 can be a stand-alone application, or it can be a module of the enterprise meeting application 2600.

Devices 2402 and 2403 are paired with the presentation gateway 2410 by means of one or more beacons 2404 to share presentation content 2414 as described in further detail below. Beacons 2404 communicate with the portable electronic devices 2402, 2403 via short-range communication 2411, which can comprise any short-range communication standard known in the art, such as Bluetooth Low Energy communication standard, NFC communication standard, or other short-range communication standards known in the art or later discovered.

After pairing, portable electronic devices 2402, 2403 can wirelessly communicate with the presentation gateway 2410 via a wireless local area network (WLAN) 2408 to share the presentation content 2414. The wireless local area network 2408 can comprise a Wi-Fi network or a related standard. In one embodiment, the presentation gateway 2410 can comprise a wireless network access point such that portable electronic devices 2402, 2403 can directly connect to the presentation gateway 2410. In another embodiment, portable electronic devices 2402, 2403 can connect to the presentation gateway 2410 via a local area network comprising one or more wireless gateway devices, such as routers, hubs, gateways, or the like. The local area network 2408 can be a publically accessible network, or it can be a secured network, such as a secured corporate network.

The presenter portable electronic device 2402 transmits the presentation content 2414 to the presentation gateway 2410. The originating presentation content 2414 can comprise various forms of data in a series of slides, including but not limited to text, graphics, images, photographs, videos, animation, or the like. For example, the originating presentation content 2414 can comprise a PowerPoint® slideshow. In other embodiments, presentation content 2414 can comprise Excel®, Word and PDF documents, as well as a series of photographs. Presentation content 2414 can further comprise audio accompanying the visual presentation or slideshow. The presentation content 2414 can be transmitted from the presenter portable electronic device 2402 to the presentation gateway 2410 as a content data stream. The content data stream can include text, graphics, images, photographs, video, audio, or any combination thereof. The content data stream can further comprise one or more commands to control the operation of the presentation gateway 2410. The presenter can view the presentation content 2414 on the presenter portable electronic device 2402 and navigate through the presentation content 2414 on the presenter portable electronic device 2402 using the presentation application 2601.

Presentation gateway 2410 receives presentation content 2414 from the presenter portable communication device 2402. Presentation gateway 2410 is described in more detail below with reference to FIG. 30. Presentation gateway 2410 can comprise similar configuration to the AM-100 Presentation Gateway available from Crestron Electronics, Inc. of Rockleigh, N.J., which enables wireless presentation of HD content using laptops, tablets, and smartphones.

Presentation gateway 2410 processes and transmits the presentation content 2414 received from the presenter portable communication device 2402 to the meeting room display 2406 located in the meeting room 2401. The meeting room display 2406 can comprise a projector and a projector screen, flat-panel display, a television, or the like. Presentation gateway 2410 further transmits the presentation content 2414 to the attendee portable communication device 2403 for viewing.

Referring to FIG. 26, one embodiment of an enterprise meeting application 2600, incorporating a presentation application 2601, is shown. As discussed above, the presentation application 2601 may be a standalone application, or it may be a module of an enterprise meeting application 2600 containing various application modules 2602, such as the scheduling application 20 shown in FIG. 4, for performing various meeting room functions. Enterprise meeting application 2600 may further comprise one or more engines and data storage areas shown in FIG. 4 and described above, including data storage area 201 comprising resource availability data storage area 202, resource data storage area 204, user preference data storage area 218, access data storage area 220, as well as user registration engine 208, present association engine 210, resource availability verification engine 226, availability data engine 212, access engine 216, presentation or display engine 206, resource request and reservation management 222, notification engine 224, user preference engine 214, control engine 228, and any combination thereof.

Presentation application 2601 may comprise one or more of a presentation content image capture engine 2610, image comparison engine 2612, presentation rendering engine 2614, word processing engine 2616, content compiling engine 2618, calendar accessing and content retrieving engine 2620, and presentation navigating engine 2622.

The presentation content image capture engine 2610 is configured for capturing images of a presentation content data stream received from the presentation gateway 2410. The image comparison engine 2612 performs image processing to compare the captured images so that only updated images are displayed to the attendee. The presentation rendering engine 2614 is configured for displaying the images to the attendee on the attendee portable electronic device 2403. The word processing engine 2616 allows the attendee to annotate the presentation content 2414 during the meeting. The content compiling engine 2618 compiles saved presentation images and any annotations into a compiled presentation data file. The calendar accessing and content retrieving engine 2620 accesses the calendar of the user to access meeting information and retrieve presentation content therefrom. The presentation gateway control engine 2622 is configured for allowing the presenter portable electronic device 2402 to send one or more commands to control the operation of the presentation gateway 2410. The functions of the various engines of the presentation application 2601 are described in greater detail below.

The following section describes the methods of pairing the portable electronic devices 2402, 2403 to the presentation gateway 2410 via one or more beacons 2404 according to some aspects of the embodiments. However, the methods described herein can be used to pair portable electronic devices to other type of devices or equipment located within a meeting room.

The one or more beacons 2404 are configured to broadcast information via short-range communication 2411, such as Bluetooth Low Energy communication, NFC communication, or other short-range communication. The beacon 2404 is encoded with various information, which it periodically broadcasts for enabling one or more portable electronic devices 2402 to be paired with the meeting room devices, such as the presentation gateway 2410. FIG. 25 is a visual representation of a beacon 2404 according to an illustrative embodiment. In various aspects of the embodiments, beacon 2404 may be encoded with one or more of an application identifier 2501, a beacon ID 2502, one or more meeting room devices network addresses 2503, an enterprise server network address 2504, and any combinations thereof.

The application identifier 2501 identifies the application associated with the beacon 2404, such as the enterprise meeting application 2600 or presentation application 2601. In certain embodiments, the application identifier 2501 is encoded according to operating system requirements. For example, in the Android operating system, each program approved to be offered in the Google Play store requires an application identifier. This application identifier 2501 is understood by the Android operation system.

The beacon ID 2502 identifies the beacon 2404 and may comprise a universally unique identifier (UUID) of the beacon.

The meeting room device network address 2503 identifies the particular meeting room device associated with the beacon 2404 and located within the same meeting room. A meeting room device network address 2503 may comprise an IP address, a URI address, a URL address, a host name, or the like, or any combination thereof. A single beacon 2404 may be encoded with network addresses of a plurality of meeting room devices located within the same meeting room. For example, the meeting room device network address 2503 may comprise a presentation gateway network address that identifies the particular presentation gateway 2410 associated with the beacon 2404.

The enterprise server network address 2504 identifies the enterprise server 2412 associated with the beacon 2404, and may comprise an IP address, a URI address, a URL address, a host name, or the like. In various aspects of the embodiments, beacon 2404 may be encoded with all the information shown in FIG. 25, or it may comprise only some of the information, such as the application identifier 2501 and the beacon ID 2502.

According to one embodiment, system 2400 can comprises a standalone or semi-standalone system that can operate without or with minimal interactivity with a central management server, a system processor, such as system processor 40 or 42, or remote servers, such as an enterprise server 2412 and calendar server 2416. Such implementation is useful in a small scale application where the use of a central management server is impractical or undesired. The system 2400 can comprise one or more meeting room devices, such as presentation gateways 2410, and dedicated beacons 2404 strategically dispersed throughout a building or a floor. Each meeting room device can be associated with one or more dedicated beacons which store the network address of the meeting room device, such as an IP address, a URI address, a URL address, a host name, or the like. In one embodiment, one or more dedicated beacons are placed within the same meeting room as their associated meeting room devices. In another embodiment, a dedicated beacon can be integrated within the meeting room device, such as within the presentation gateway 2410. The dedicated beacon broadcasts an application ID and the network address of its associated meeting room device. The enterprise meeting application 2600 uses the network address to connect the portable communication device 2402, 2403 to the appropriate meeting room device, such as the presentation gateway 2410.

FIG. 27 is a flowchart 2700 showing a method for paring the presenter portable electronic device 2402 and/or the attendee portable electronic device 2403 with a meeting room device, such as a presentation gateway 2410, via one or more beacon 2404 of such a standalone or semi-standalone system according to an illustrative embodiment.

In step 2702, a user positions the portable electronic device 2402, 2403 in communication range with a beacon 2404. The user may position the portable electronic device 2402, 2403 by walking within the meeting room 2401 while carrying the portable electronic device 2402, 2403. In step 2704, the user loads the enterprise meeting application 2600, which instructs the portable electronic device 2402, 2403 to scan for any nearby beacons 2404. In step 2606, the portable electronic device 2402, 2403 receives the information broadcasted by the beacon 2404. In the current embodiment, the portable electronic device 2402, 2403 receives the application identifier 2501 and the meeting room device network address 2503, such as the presentation gateway network address, encoded in the beacon 2404. Upon receiving the application identifier 2501 and the meeting room device network address 2503 from a beacon in step 2606, the portable electronic device 2402, 2403 provides that information to the enterprise meeting application 2600 based on the received application identifier 2501.

After the application is loaded and the broadcasted information from the beacon is read, the enterprise meeting application 2600 determines whether any additional beacons are present in step 2708. If the portable electronic device 2402, 2403 detects the presence of only a single broadcasting beacon, in step 2718, the portable electronic device 2402, 2403 uses the received meeting room device network address 2503 to pair with the meeting room device associated with the selected beacon. Particularly, the portable electronic device 2402, 2403 establishes communication with the meeting room device, such as the presentation gateway 2410, via the local area network 2408.

If there are additional broadcasting beacons detected, in step 2712, the portable electronic device 2402, 2403 receives application identifiers and meeting room device network addresses from the additional beacons. In step 2714, the enterprise meeting application 2600 then estimates the distance of the portable electronic device 2402, 2403 to each of the plurality of broadcasting beacons. For example, the personal area network interface of the portable electronic device 2402, 2403 is configured for measuring the received signal strength of each received beacon broadcast. The enterprise meeting application 2600 may log the RSSI of each measured distances in a table according to signal strength.

In step 2716, the enterprise meeting application 2600 determines the location of the portable electronic device 2402, 2403 and selects the beacon associated with the location. In one embodiment, the enterprise meeting application 2600 determines the location and selects the beacon by identifying the nearest beacon by comparing the received signal strengths and identifying the strongest received signal according to RSSI. In step 2718, the enterprise meeting application 2600 uses the meeting room device network address received from the selected beacon (e.g., the nearest beacon) to pair the portable electronic device 2402, 2403 with the corresponding meeting room device. In step 2720, the portable electronic device 2402, 2403 communicates with the meeting room device, such as the presentation gateway 2410, via local area network 2408. For example, the presenter portable electronic device 2402 can transmit the presentation content 2414 to the paired presentation gateway 2410, and the attendee portable electronic device 2403 can receive presentation content from the paired presentation gateway 2410.

According to one embodiment, each meeting room device associated with a beacon, such as the presentation gateway 2410, can comprise a network access point and a built-in web server associated with a unique URL address. Each meeting room device, such as the presentation gateway 2410, can be associated with one or more beacons 2404 encoded with the corresponding unique URL address as the meeting room device network address 2503. Upon identifying the nearest beacon, such as beacon 2404, the enterprise meeting application 2600 on the portable communication device 2402, 2403 receives from the beacon 2404 the application identifier 2501 and the associated URL address of the meeting room device. The enterprise meeting application 2600 instructs the portable communication device 2402, 2403 to connect to the built-in server of the meeting room device via the unique URL address.

According to some aspects of the embodiments, the enterprise meeting application 2600 is automatically loaded on the portable electronic device 2402, 2403 once the portable electronic device 2402, 2403 comes in communication proximity with a beacon 2404. FIG. 28 illustrates a flowchart 2800 showing the method of automatically loading and/or installing the enterprise meeting application 2600 via a beacon. Referring to FIG. 28, in step 2802, a user positions the portable electronic device 2402, 2403 in communication range with a beacon 2404. The user may position the portable electronic device 2402, 2403 by walking within the meeting room 2401 while carrying the portable electronic device 2402, 2403.

In step 2804, the portable electronic device 2402, 2403 receives the information broadcasted by the beacon, such as the application identifier 2501 encoded in the beacon. If after reading the application identifier 2501, the portable electronic device 2402, 2403 determines in step 2806 that the application associated with the application identifier 2501 is not downloaded, in step 2808 the portable electronic device 2402, 2403 directs the user to an application marketplace where they can download the application associated with the application identifier 2501. For example, the portable electronic device 2402, 2403 may load a relevant application page of the iTunes® application marketplace or Google Play application marketplace.

If the enterprise meeting application 2600 associated with the application identifier 2501 is already stored on the portable electronic device 2402, 2403, in step 2810 the portable electronic device 2402, 2403 loads the enterprise meeting application 2600. The application identifier 2501 read from the beacon instructs the portable electronic device 2402, 2403 which application to launch. Thus, the portable electronic device 2402, 2403 loads the enterprise meeting application 2600 upon receiving the application identifier 2501.

According to another embodiment, presentation system 2400 can be integrated into an enterprise-wide system, such as system 100 shown in FIG. 18, and can be connected to the enterprise server 2412, such as scheduling server 15 described above. Presentation system 2400 may further comprise additional servers, including a calendar server 2416 for receiving a user's calendar information. Calendar server 2416 can be integrated with the enterprise server 2412. Such an implementation is useful in large-scale enterprise control.

As described above, the enterprise server 2412 may store room information or record associated with each conference room in an enterprise, such as meeting room 2401. Such room data may include one or more of the following: the conference room name, a universally unique identifier (UUID) of the room, beacon ID associated with that room, location of the room in a room tree of a building, physical address of the building where the room is located, resources available in the room, such as conference room devices 102, maximum capacity of the room, an image of the room, associated calendar information for the room, access rights information, such as a list of users which have room access, among other type of information. For example, room data for meeting room 2401 may include the meeting room name (e.g., "Room A113"), a UUID of the meeting room 2401, beacon ID of beacon 2404 located within meeting room 2401, information that the room is equipped with presentation gateway 2410 and display 2406, and the network address of the presentation gateway 2410. In such an implementation, the beacon 2404 may broadcast an application identifier and its beacon ID. Upon identifying the closest beacon, such as beacon 2404, the enterprise meeting application 2600 on the portable electronic device 2402, 2403 receives from the beacon 2404 the application identifier and its beacon ID. The enterprise meeting application 2600 receiving the beacon ID would query the enterprise server 2412 for the network address of the presentation gateway 2410.

FIG. 29 illustrates one embodiment of a flowchart 2900 showing the method for pairing the presenter portable electronic device 2402 and/or the attendee portable electronic device 2403 with a meeting room device, such as the presentation gateway 2410, via one or more beacons 2404 and the enterprise server 2412. In step 2902, a user positions the portable electronic device 2402, 2403 in communication range with a beacon 2404. The user may position the portable electronic device 2402, 2403 by walking within the meeting room 2401 while carrying the portable electronic device 2402, 2403.

In step 2904, the enterprise meeting application 2600 is loaded. The enterprise meeting application 2600 can be loaded manually by the user. In another embodiment, as described above with reference to FIG. 28, the enterprise meeting application 2600 can be loaded automatically or be downloaded upon receiving an application identifier 2501 from a beacon 2404.

After being loaded, the enterprise meeting application 2600 can instruct the portable electronic device 2402, 2403 to scan for any nearby beacons 2404. In step 2906, the portable electronic device 2402, 2403 receives the information broadcasted by the beacon 2404. In this embodiment, the portable electronic device 2402, 2403 receives the application identifier 2501 and the beacon ID 2502 encoded in the beacon 2404. Upon receiving the application identifier 2501 and beacon ID 2502 from a beacon in step 2906, the portable electronic device 2402, 2403 provides that information to the enterprise meeting application 2600 based on the received application identifier 2501.

Then in step 2908, the enterprise meeting application 2600 determines whether there are any additional beacons present. If in step 2908 the portable electronic device 2402, 2403 detects the presence of only a single broadcasting beacon, in step 2918, the portable electronic device 2402, 2403 communicates the selected beacon ID to the enterprise server 2412. According to one embodiment, the enterprise meeting application 2600 contains in its memory the network address of the enterprise server 2412 to enable communication. In another embodiment, the enterprise meeting application 2600 receives the enterprise server network address 2504 from the selected beacon 2404 in order to connect with a correct enterprise server 2412 associated with the presentation system 2400.

If in step 2908 the enterprise meeting application 2600 detects additional broadcasting beacons, in step 2912, the portable electronic device 2402, 2403 receives application identifiers and beacon IDs from the additional beacons. The enterprise meeting application 2600 then estimates the distance of the portable electronic device 2402, 2403 to each of the plurality of broadcasting beacons in step 2914. For example, the personal area network interface of the portable electronic device 2402, 2403 is configured for measuring the received signal strength of each received beacon broadcast. The enterprise meeting application 2600 may log the RSSI of each measured distances in a table according to signal strength.

In step 2916, the enterprise meeting application 2600 determines the location of the portable electronic device 2402, 2403. In one embodiment, the enterprise meeting application 2600 determines the location by identifying the nearest beacon. The enterprise meeting application 2600 selects the nearest beacon by comparing the received signal strengths and determining which beacon 2404 has the strongest signal according to RSSI. After selecting the nearest beacon 2404, the enterprise meeting application 2600 transmits the selected beacon ID to the enterprise server 2412 in step 2918. In step 2920, the enterprise server 2412 uses the transmitted beacon ID to identify the meeting room 2401 associated with the beacon 2404, and particularly, the meeting room device network addresses of the meeting room devices present in the meeting room 2401. The meeting room device network address may comprise an IP address, a URI address, a URL address, a host name, or the like.

According to another embodiment, the enterprise meeting application 2600 determines in which room the portable electronic device 2402, 2403 is located via trilateration as discussed above with reference to step 2005 of FIG. 20. For example, the enterprise meeting application 2600 can estimate its distance to at least three beacons, determine its location coordinates using trilateration, map that location on a floor plan, and identify the room the portable electronic device is located. The floor plan may be downloaded from the enterprise server 2412. The enterprise meeting application 2600 may communicate with the enterprise server 2412 to perform the above steps for determining the room location of the portable electronic device 2402, 2403, and some of the above steps may be performed by the enterprise server 2412 itself. Once the meeting room is identified, the enterprise meeting application 2600 can query the enterprise server 2412 for the room information associated with the identified meeting room to retrieve its associated meeting room device network addresses.

According to another embodiment, during setup, the enterprise meeting application 2600 downloads an enterprise room file from the enterprise server 2412 containing room information for each conference room in an enterprise, such as meeting room 2401. The enterprise meeting application 2600 can download an entire record for each room, or only a portion of the room record. The enterprise room file is saved on the memory of the portable electronic device 2402, 2403. The enterprise room file can be updated regularly by having the enterprise meeting application 2600 query the enterprise server 2412 for updates or by having the enterprise server 2412 push updates to the enterprise meeting application 2600. For example, the enterprise meeting application 2600 can download a record for meeting room 2401 containing the meeting room name (e.g., "Room A113"), beacon ID of beacon 2404 located within meeting room 2401, and network addresses of meeting room devices located within meeting room 2401, such as the network address of the presentation gateway 2401. After determining the location of the portable electronic device 2402, 2403 within meeting room 2401 and selecting the beacon 2404 associated with the location as discussed above in step 2916, the enterprise meeting application 2600 can query the locally stored enterprise room file to retrieve the meeting room device network addresses associated with the selected beacon in step 2920.

Next, in step 2922, the enterprise server 2412 may determine whether user authentication is required. As discussed above, the enterprise server 2412 may store access rights information for each meeting room that identifies a list of users that have access rights to use the room and its resources, as well as the scope of the access rights. For example, meeting room 2401 may be a general conference room with access rights that allows any user to access its resources, and as such authentication is not required. In another embodiment, access rights can specify that the meeting room 2401 may only be used by a list of certain users. In yet another embodiment, room access rights can give certain rights to authenticated users and limited rights to unauthenticated users. For example, an authenticated user can use any available resources located within the meeting room 2401. An unauthenticated user can, for example, only receive shared presentation content from the presentation gateway, but not transmit presentation content. In another embodiment, a user may have limited or no access to certain areas or resources based on time of day, priority, employment level or a myriad of other factors.

In another embodiment, a scheduled meeting event of the room for a particular time period (e.g., meeting schedule 800 shown in FIG. 8) may list users participating in the meeting, identifying whether the user is the meeting organizer or a meeting attendee. Access rights may permit only the meeting organizer to transmit presentation content to the presentation gateway during the scheduled period of time. Access rights may permit only the meeting attendees listed in the meeting schedule to retrieve the presentation content on their portable electronic devices. Accordingly, the enterprise server 2412 allows for controlling which user can present presentation content and receive presentation content, eliminating inadvertent sharing of confidential material.

If authentication is required, the enterprise meeting application 2600 communicates with the enterprise server 2412 to authenticate the user in step 2924. In one embodiment, the user is authenticated by having the enterprise meeting application 2600 automatically transmit to the enterprise server 2412 authentication information of the user, such as the user ID, the portable electronic device ID, or the like. In another embodiment, the user is prompted to input authentication information, such as a user ID, a password, a biometric indicator, such as a fingerprint, or the like. In one embodiment, the user registration engine 206 of the enterprise meeting application 2600 handles user authentication. The enterprise server 2412 may compare the received authentication information to a list of users which have room access. In another embodiment, a user can be authenticated against a corporate directory using Lightweight Directory Access Protocol (LDAP). LDAP is a directory service protocol implemented on a layer above the TCP/IP stack used to connect to, search, and modify Internet directories.

If in step 2926 the enterprise server 2412 determines that authentication is unsuccessful, the enterprise server 2412 sends an error message 2929 to the portable electronic device 2402, 2403. If the authentication is successful, the enterprise server 2412 can transmit a data file containing the permitted access rights for the user to the enterprise meeting application 2600 of the portable communication device 2402, 2403. Particularly, the data file containing the access rights can be transmitted to the access data storage area 220 and used by the access engine 216 of the enterprise meeting application 2600, as described above with reference to FIG. 4. Access engine 216 can use the access rights to restrict communication between the portable electronic device 2402, 2403 and the presentation gateway according to the received access rights.

If the user is successfully authenticated, or if authentication is not required, in step 2930, the enterprise server 2412 transmits the identified meeting room device network address to the portable electronic device 2402, 2403, and the enterprise meeting application 2600 uses the meeting room device network address to pair the portable electronic device 2402, 2403 with the corresponding meeting room device, such as the presentation gateway 2010. In step 2933, the portable electronic device 2402, 2403 communicates with the meeting room device, such as the presentation gateway 2410, via local area network 2408. For example, the presenter portable electronic device 2402 can transmit the presentation content 2414 to the paired presentation gateway 2410, and the attendee portable electronic device 2403 can receive presentation content from the paired presentation gateway 2410.

In yet another embodiment, the beacon 2404 can transmit to the user's portable electronic device 2402, 2403 the application identifier 2501, the beacon ID 2502, and the meeting room device network address 2503. The enterprise meeting application 2600 can operate in an authenticated mode or unauthenticated mode. In an unauthenticated mode, wherein a user may not be registered with the enterprise server 2412, or who does not choose to get authenticated, the enterprise meeting application 2600 can provide limited predefined access rights to the presentation gateway 2410, as well as other resources in the room. In an authenticated mode, a user registered with the enterprise server 2412 can use the portable electronic device 2402, 2403 to get additional features and information according with the user's access rights.

According to an aspect of the embodiments, after a portable electronic device 2402, 2403 is successfully paired with a meeting room device, such as a presentation gateway 2410, within meeting room 2401, the enterprise application 2600 relates that information to the scheduling application 20. If the status indicator for the meeting room 2401 is vacant for a particular time period subsequent to pairing, the scheduling application 20 can designate the status indicator for the meeting room 2401 as "booked" for the particular time period and communicate the status indicator to the scheduling server 15. The time period may begin as soon as the portable electronic device 2402, 2403 is paired with a meeting room device and can last for a predetermined amount of time, such as thirty minutes. In another embodiment, the user can be prompted to indicate the length of the time period the user wishes to use the meeting room 2401. As shown in FIG. 7, the scheduling application 20 may illustrate the status indicator 706 as a selectable icon that color codes the time period to indicate to other enterprise users that the time period is booked. Thereby, the enterprise user may remain using the room uninterrupted.

After successful pairing, the presentation application 2601 of the enterprise meeting application 2600 on the presenter portable electronic device 2402 can transmit the presentation content 2414 to the presentation gateway 2410 for displaying via meeting room display 2406 and sharing with the attendee portable electronic device 2403. According to various aspects, the originating presentation content 2414 can comprise a slideshow, such as a PowerPoint® slideshow, Excel®, Word, and PDF documents, a series of images or photographs, or the like. The presentation content 2414 can further comprise audio accompanying the visual presentation or slideshow. The presentation content 2414 can be opened and displayed within a window of the presentation application 2601 on a display screen of the presenter portable electronic device 2402. The presenter can view the presentation content 2414 on the presenter portable electronic device 2402 and navigate through the presentation content 2414 on the presenter portable electronic device 2402 using the presentation application 2601. The presentation content 2414 can be continuously transmitted to the presentation gateway 2410 via the local area network 2408 while the presenter navigates through the presentation.

The presentation content 2414 can be transmitted to the presentation gateway 2410 as a content data stream, which can include text, graphics, images, photographs, video, audio, or any combinations thereof. For example, the presentation content 2414 can be transmitted to the presentation gateway 2410 as a video data stream, or as an audiovisual data stream when audio accompanies the presentation content 2414. In another embodiment, the presentation content 2414 can be transmitted to the presentation gateway 2410 as a series of images.

In another embodiment, the presentation application 2601 can share the presentation content 2414 via desktop sharing techniques known in the art. The presentation content 2414 can be rendered within a window of the presentation application 2601 on the presenter portable electronic device 2402. Content data stream containing packets of information can be sent from the presenter portable electronic device 2402 to the presentation gateway 2410 as encrypted data that renders what is being displayed within the window of the presentation application 2601 on the presenter portable electronic device 2402 at any given time. Conveniently, only the window rendering the presentation content 2414 within the presentation application 2601 is being shared with the presentation gateway 2410. Other data or information that may be displayed on the display screen of the presenter portable electronic device 2402 is not shared. As such, the presenter may perform other tasks, such as taking notes or previewing other slides in the deck. The content data stream can comprise various formats, including image files (JPEGs and GIFs), or individual pixels assigned to a particular X and Y coordinates. Desktop sharing techniques can be implemented that only send information updates on the sections of the screen that have changed, minimizing the amount of necessary bandwidth.

The presentation content 2414 can be stored in the memory of the presenter portable electronic device 2402. Upon arriving to the meeting, the presenter can use the presentation application 2601 to retrieve the presentation content 2414 from the memory.

In another embodiment, the presentation application 2601 of the presenter portable electronic device 2402 can retrieve the presentation content 2414 automatically from the user's calendar upon arriving at the meeting. The presentation application 2601 can communicate with a local calendar utility or application available on the presenter portable electronic device 2402 to retrieve the user's calendar information. Alternatively, the presentation application 2601 can communicate via a web-based calendaring application with a remote calendar server 2416 to access user's calendar information. User's calendar can be linked to the presentation application 2601 during its setup or registration process. The presenter can create a meeting event for a particular scheduled period of time and attach the presentation content 2414 to the meeting event. The presentation content 2414 is saved in association with the meeting event either on the presenter portable electronic device 2402 or on the calendar server 2416. Upon arriving to the meeting room 2401 during the scheduled period of time, the enterprise meeting application 2600 can pair the presenter portable electronic device 2402 with the presentation gateway 2410 to commence the meeting. The presentation application 2601 can access the meeting event on the user's calendar based on the date and time of day. The presentation application 2601 can scan the attached files field of the calendar meeting event using a predetermined regular expression (REGEX) search pattern string to determine if there is any content or files attached to the meeting event. The presentation application 2601 can present to the user a list of potential content found in association with the meeting event. As such, the presentation application 2601 can retrieve the appropriate presentation content 2414 associated with the meeting event in the user's calendar based on the date and time of day and present the presentation content 2414 to the user.

In another embodiment, the presentation application 2601 of the presenter portable electronic device 2402 can retrieve the presentation content 2414 automatically via the enterprise server 2412 upon arriving at the meeting. The presenter can create a meeting event by scheduling a meeting and booking the meeting room 2401 via the scheduling application 20 of the enterprise meeting application 2600 and the enterprise server 2412, as discussed above, and upload a presentation containing the presentation content 2414 as a shared document 1201 (FIG. 12). The presentation content 2414 can be saved in association with the scheduled meeting event on the enterprise server 2412. The presentation application 2601 can be a standalone application in communication with the scheduling application 20, or both applications can comprise modules of the enterprise meeting application 2600. Upon arriving at meeting room 2401 where the meeting is to be held and placing the presenter portable electronic device 2402 within a communication range of beacon 2404, the presenter portable electronic device 2402 can pair with the presentation gateway 2410 via the beacon 2404 as discussed above. The presentation application 2601 can access the meeting event from the enterprise server 2412 and retrieve the presentation content 2414 associated with the meeting event. For example, upon arriving at the meeting, the scheduling application 20 of the presenter portable electronic device 2402 can display the pop-up screen 900 shown in FIG. 9 detailing the information for the meeting scheduled in the meeting room 2401. The presenter can press the "start meeting" selectable icon 901 to begin the meeting. Upon receiving a selection of the start meeting button 901, the presentation application 2601 can retrieve the presentation content 2414 from the enterprise server 2412 and transmit it to the presentation gateway 2410.

In other embodiments, presentation content 2414 can be provided to the presentation gateway 2415 from other devices. The presentation content 2414 can be provided to the presentation gateway 2415 via a dedicated computer located within meeting room 2401. The presenter can upload presentation content 2414 to such a computer via a USB or other memory. The dedicated computer may be connected to the presentation gateway 2410 in a plurality of ways, including a wireline connection, such as high-definition multimedia interface (HDMI), DisplayPort, Digital Visual Interface (DVI), or Video Graphics Array (VGA) connection, or via a wired or wireless local area network 2408.

The presentation gateway 2410 receives the presentation content 2414, processes it, and transmits it to meeting room display 2406 and any connected attendee portable communication devices 2403. FIG. 30 is a block diagram depicting the presentation gateway 2410 in accordance with an illustrative embodiment. The presentation gateway 2410 can comprise one or more interfaces for transmitting and receiving information, such as the presentation content 2414, including a wireless network interface 3002, an audiovisual interface 3004, and a communication network interface 3006.

The communication network interface 3006 is configured to receive information from a communication network, such as the wide area network 2417. According to an embodiment, the network interface 3006 is an Ethernet interface for sending and receiving signals over an Internet Protocol (IP) based network. In one embodiment, communication network interface 3006 may include the capability to connect directly with the WAN communication network 2417 via a WAN interface. The WAN interface may permit connection to a cellular data network, such as the EDGE network or other 3G network. The network interface 3006 may include a LAN interface to an Ethernet-based network wherein connection to the communication network 2417 may involve communication through a network router or other intermediary device. Presentation gateway 2410 can also connect to the communication network 2417 via the wireless network interface 3002, through the wireless LAN 2408 and one or more intermediary device. Presentation gateway 2410 can communicate with one or more remote servers, such as the enterprise server 2412, the calendar server 2410, or other remote server via the communication network interface 3006.

The presentation gateway 2410 can communication with the portable electronic devices 2402, 2403 through the wireless local area network 2408 via wireless network interface 3002. According to one embodiment, the wireless network interface 3002 can comprise a bidirectional radio frequency (RF) transceiver designed to enable communications with the portable electronic devices 2402, 2403 via the wireless local area network 2408. In certain embodiments, the wireless network interface 3002 may include a PAN interface. The PAN interface may provide capabilities to network with, for example, a Bluetooth® network, an IEEE 802.15.4 (e.g., ZigBee) network, or an ultra-wideband network (UWB). As should be appreciated, the networks accessed by the PAN interface of the wireless network interface 3002 can, but do not necessarily, represent low power, low rate, low bandwidth, or close range wireless connections. The wireless network interface 3002 can permit one electronic device to connect to another electronic device via an ad-hoc or peer-to-peer connection. The presentation gateway 2410 can use one or more gateways to communicate with the portable electronic devices 2402, 2403 and support additional devices. In addition, wireless expanders can be added wherever needed to extend the wireless network 2408 by filling-in gaps between devices.

The presentation gateway 2410 can further include a wired audiovisual interface 3004 configured for transmitting audiovisual information, such as the presentation content 2414, to the meeting room display 2406. Audiovisual interface 3004 can comprise one or more audiovisual outputs, including but not limited to a high-definition multimedia interface (HDMI), DisplayPort, Digital Visual Interface (DVI), Video Graphics Array (VGA), or similar outputs. In another embodiment, presentation gateway 2410 transmits the presentation content 2414 to the meeting room display 2406 through the wireless network 2408 via the wireless network interface 3002.

The presentation gateway 2410 may include additional input/output (I/O) interfaces for connection with other electronic devices. One or more I/O interfaces may represent a serial port, for example a COM port or a USB port. Additionally, one or more IR interfaces may enable the presentation gateway 2410 to receive control signals from a remote control.

The presentation gateway 2410 can further comprise at least one central processing unit (CPU) 3008. The CPU 3008 can represent one or more microprocessors, and the microprocessors can be "general purpose" microprocessors, a combination of general and special purpose microprocessors, or application specific integrated circuits (ASICs). Additionally or alternatively, the CPU 3008 can include one or more reduced instruction set (RISC) processors, video processors, or related chip sets. The CPU 3008 can provide processing capability to execute an operating system, run various applications, and/or provide processing for one or more of the techniques and functions described herein. Applications that can run on the presentation gateway 2410 can include, for example, software for wirelessly pairing with the portable electronic devices 2402, 2403 via local area network 2408 and software for processing the presentation content 2414.

In an embodiment, the presentation gateway 2410 includes a main memory 3010 and nonvolatile memory 3012. Main memory 3010 can be communicably coupled to the CPU 3008, which can store data and executable code. The main memory 3010 can represent volatile memory such as random-access memory (RAM), but can also include nonvolatile memory, such as read-only memory (ROM) or Flash memory. In buffering or caching data related to operations of the CPU 121, the main memory 3010 can store data associated with applications running on the presentation gateway 2410. The nonvolatile memory 3012 can represent any suitable nonvolatile storage medium, such as a hard disk drive or nonvolatile memory, such as Flash memory. Being well-suited to long-term storage, the nonvolatile storage 3012 can store data files, software for implementing the functions on the presentation gateway 2410.

The presentation gateway 2410 can further comprise an analog-to-digital converter (ADC) 3014 for converting presentation content 2414 from analog to digital. For example, the presentation content 2414 may be received from an analog audiovisual input channel, such as a VGA input, from a dedicated computer via a VGA input. The presentation gateway 2410 can further comprise a digital-to-analog converter (DAC) 3016 for converting presentation content 2414 from digital to analog. For example, the presentation content 2414 may need to be outputted to an analog audiovisual output channel, such as a red-green-blue-horizontal sync-vertical sync (RGBHV) output port configured for transmitting an analog component video signal to a meeting room display 2406. The presentation gateway 2410 can further comprise a video processor 3020 for processing video, such as for scaling the video. The presentation gateway 2410 can further comprise an audio processor 3022 for processing audio of the presentation content 2414, such as for equalizing the audio level. The presentation gateway 2410 can further comprise one or more modules for capturing images of the presentation content 2414 for sharing with the attendee portable electronic device 2403.

As discussed above, the presentation gateway 2410 receives the presentation content 2414 from the presenter portable electronic device 2402, a dedicated computer located within meeting room 2401, or via other means, and transmits it to the attendee portable electronic device 2403 as a presentation content data stream in real time. The presentation application 2601 on the attendee portable electronic device 2403 in turn processes the presentation content 2414 and displays it to the user.

FIG. 31 illustrates a flowchart 3100 showing a method for capturing and displaying the presentation content 2414 by the presentation application 2601 of the enterprise meeting application 2600 on the attendee portable electronic device 2403. The captured presentation content 2414 is displayed on the attendee portable electronic device 2403 without the attendee portable electronic device 2403 having a copy of the software used to make the presentation. The captured presentation content 2414 is displayed on the attendee portable electronic device 2403 in real time and in sync with the presentation content 2414 displayed on the meeting room display 2406. The presentation application 2601 on the attendee portable electronic device 2403 captures and compares each newly captured image to the previously captured image so that only images with changed presentation content 2414 are displayed and saved, while retransmission of newly captured images with substantially identical presentation content 2414 are discarded. This allows for saving the entirety of a meeting's slide deck without redundant images, reducing clutter and storage needs.

The method depicted in FIG. 31 can be performed by the various engines shown in FIG. 26 of the presentation application 2601. Particularly, in step 3102, the presentation application 2601 on the attendee portable electronic device 2403 receives the presentation content 2414 from the presentation gateway 2410 as a presentation content data stream. In one embodiment, the presentation content data stream can comprise a video stream. In another embodiment, the presentation content data stream can comprise a series of images transmitted to the attendee portable electronic device 2403 in real time.

In step 3104, the presentation application 2601 retrieves a new image from the presentation content data stream. For example, a new image may be retrieved from a data stream comprising a series of images. In another embodiment, a new image may be captured from a video stream. In various embodiments, the retrieved presentation content images can comprise one or more of a JPEG, TIFF, PNG, GIF, BMP, or other image file types known in the art or later discovered. According to an embodiment, new images of the presentation content 2414 are retrieved in rapid succession. The presentation application 2601 may be configured to retrieve a new image within less than 5 seconds, as frequently as every 1 or 2 seconds, or even less than 1 second.

In step 3106, the presentation application 2601 compares the newly retrieved image to a previously saved image to determine whether the new image is substantially identical to the previously saved image. There are various computer vision image processing techniques that may be implemented to perform image comparison, including keypoint matching, histogram matching, or the like. Images are not substantially identical when content in the image has been changed, added, or deleted. For example, the presentation presented on the meeting room display 2406 may have been navigated to the next slide, or content within a slide may have been altered, such by an addition, removal, or manipulation of text, graphics, images, or the like.

If the newly retrieved image is substantially identical to a previously saved image, then the new image is discarded in step 3108. The presentation application 2601 then waits a predetermined period of time in step 3114, such as a few seconds or less as discussed above. If in step 3116, additional presentation content data stream is available then the presentation application 2601 retrieves a new image in step 3104.

If, instead, the presentation application 2601 determines in step 3106 that the image is not substantially identical to the previously saved image, then the new image is saved in step 3110. The newly saved image is saved to be compared to the subsequently received images. The newly saved image is also transmitted to a display screen of the attendee portable electronic device 2403 for display to the attendee in step 3112. Accordingly, as soon as the presentation content 2414 changes on the meeting room display 2406 in room 2410 during the meeting, a new image of the presentation content 2414 is saved and is displayed on the display screen of the attendee portable electronic device 2403. As such, a meeting attendee can view the presentation content 2414 on his portable electronic device 2403 substantially in synch with the presented presentation on the meeting room display 2406 during the meeting.

The presentation application 2601 continues to retrieve and compare images until it no longer receives the presentation content data stream in step 3116. For example, the presentation application 2601 ceases to receive presentation content upon being disconnected from the presentation gateway 2410, or upon receiving an indication from the presentation gateway 2410 that the presentation has ended.

Finally, after the meeting has ended, the presentation application 2601 can compile the saved images in step 3118 into a compiled presentation data file. For example, the presentation application 2601 can compile the saved images into a slideshow. The presentation application 2601 can automatically store the compiled presentation data file on the attendee portable electronic device 2403, or it can query the user whether to store or discard the compiled presentation data file. The compiled presentation data file can be shared as the user desires. For example, it can be shared via electronic mail in an attachment. The presentation application 2601 can also transmit the compiled presentation data file to be stored remotely. The presentation application 2601 can further communicate with the user's calendar, which can be a local calendar application or a calendar application provided via the calendar server 2416, and store the compiled presentation data file in association with the attendee's calendar meeting entry. The attendee can access the calendar meeting entry thereafter to review the compiled presentation data file.

In another embodiment, a meeting event can be created and booked for meeting room 2401 via the scheduling application 20 of the enterprise meeting application 2600. At the end of the scheduled meeting event, the compiled presentation data file can be transmitted to the enterprise server 2412 and saved in association with the scheduled meeting event. Meeting attendees can thereafter access the scheduled meeting event to review the presentation content displayed during the meeting.

According to another aspect of the embodiments, instead of automatically saving images for a total record of the presentation, the attendee can interact with the presentation application 2601 to select and bookmark the images of the presentation content 2414 which should be saved on the attendee portable electronic device 2403 for later retrieval. For example, the attendee can bookmark the images by touching the images, touching an icon on the images, or the like. The bookmarked images can be compiled at the end of the meeting, for example, into a slideshow.

In another embodiment, some or all of the method steps illustrated in FIG. 31 can be performed by the presentation gateway 2410. In step 3102, the presentation gateway 2410 can receive the presentation content 2414 from the presenter portable electronic device 2402, a dedicated computer located within meeting room 2401, or via other means as a presentation content data stream in step 3102. The presentation gateway 2410 can retrieve a new image in step 3104 and compare the newly retrieved image to a previously saved image in step 3106. Substantially identical image is discarded in step 3108, while an image which is not substantially identical to the previously saved image (i.e., an image with changed content) is saved in step 3110. The newly saved image is saved to be compared to the subsequently received images. In step 3112, the newly saved image is transmitted to the presentation application 2601 on the attendee portable electronic device 2403 for display to the attendee. Following steps 3104 through 3116, the presentation gateway 2410 captures and compares each newly captured image to the previously captured image so that only images with changed presentation content 2414 are transmitted to the attendee portable electronic device 2403, and that newly captured images with substantially identical presentation content 2414 are discarded. This saves bandwidth and allows for saving the entirety of a meeting's slide deck without redundant images, reducing clutter and storage needs.

After the presentation has ended, the presentation gateway 2410 can discard the saved images, or it can compile the saved images into a compiled presentation data file in step 3118. The compiled presentation data file can be saved for a predetermined amount of time on the presentation gateway 2410, after which it may be discarded. In another embodiment, at the end of the meeting, the compiled presentation data file can be transmitted to the portable electronic devices 2402, 2403, or to a remote server, such as the enterprise server 2412. For example, a meeting event can be created and booked for meeting room 2401 via the scheduling application 20 of the enterprise meeting application 2600. At the end of the scheduled meeting event, the compiled presentation data file can be transmitted to the enterprise server 2412 and saved in association with the scheduled meeting event. Meeting attendees can thereafter access the scheduled meeting event to review the presentation content displayed during the meeting.

FIG. 32 is a schematic diagram depicting an exemplary presentation page 3200 of the presentation application 2601 for presenting and viewing presentation content 2414 via presentation gateway 2410 inside of the space the user is located. Upon positioning the portable electronic device 2402, 2403 within a beacon 2404 proximity, the portable electronic device 2402, 2403 can load the presentation application 2601 and display the presentation page 3200. The presentation page 3200 may display a "present" icon 3201 and a "view" icon 3202. The user may press the "present" icon 3201 to present the presentation content 2414 via the presentation gateway 2410. Alternatively, the user may press the "view" icon 3202 to view the presentation content 2414 that is being displayed by the presentation gateway 2410.

FIG. 33 is a schematic diagram depicting an exemplary access room page 3300 of an enterprise meeting application 2600 incorporating a scheduling application 20 and the presentation application 2601. Access room page 3300 can be accessed manually by pressing the "access room" icon 502 shown in FIG. 5. In another embodiment, upon positioning the portable electronic device 2402, 2403 within a beacon proximity, the portable electronic device 2402, 2403 can load the enterprise meeting application 2600 and display the access room page 3300. The enterprise meeting application 2600 may display a "book space" icon 3301 for managing a conference room schedule via scheduling application 20. Upon pressing the "book space" icon 3301, the user may be presented with the scheduling page 700 shown in FIG. 7, which can be used to book the meeting room. The enterprise meeting application 2600 may further display a "present" icon 3302 and a "view" icon 3303. Pressing the "present" icon 3302 will launch the presentation application 2601 to present the presentation content 2414 via the presentation gateway 2410. Alternatively, the user may press the "view" icon 3203 to launch the presentation application 2601 to view the presentation content 2414 that is being displayed by the presentation gateway 2410. In another embodiment, the user is authenticated as discussed above and can be identified by the enterprise server 2412 as either the presenter or an attendee of the meeting. If the user is identified as the presenter, the access room page 3300 will display the "present" icon 3302, but not the "view" icon 3303. If the user is identified as the attendee, the scheduling page 3300 will display the "view" icon 3303, but not the "present" icon 3302.

FIG. 34A is a schematic diagram depicting a present options page 3400 of the presentation application 2601, which can be accessed after the presenter pressed the "present" icon 3201 (FIG. 32) or 3302 (FIG. 33). The presenter may select presentation content 2414 to present in the presentation content section 3401. The presenter may press the "view file on my device" icon 3402 to brows and select files stored in the memory of the presenter portable electronic device 2402. The presentation application 2601 can further contain a "meeting event content" section 3403 that displays one or more content associated with the meeting event automatically retrieved from the user's calendar or from the enterprise server 2412 as discussed above. For example, for each retrieved content, the presentation application 2601 may display a selectable icon, such as a "slideshow" icon 3408 and a "PDF file" icon 3410. The presenter may select the desired content by pressing its corresponding icon and then pressing the "present" icon 3406. In response, the presentation application 2601 will transmit the selected content to the presentation gateway 2410. The present page 3400 may further contain a presenter selectable attendee viewing option 3412 to enable or disable attendee viewing of the presentation content 2414 on the attendee portable electronic device 2403. If the attendee viewing option 3412 is enabled, then the presentation gateway 2410 transmits the displayed presentation content 2414 to one or more attendee portable electronic device 2403, upon request. If the attendee viewing option 3412 is disabled, the presentation gateway 2410 only transmits the presentation content 2414 to be displayed on the meeting room display 2406 in the room, and not to the attendee portable electronic device 2403.

FIG. 34B is a schematic diagram depicting a present page 3420 of the presentation application 2601 on the presenter portable electronic device 2402. The present page 3420 can be accessed after the presenter pressed the "present" icon 3406 on the present options page 3400 (FIG. 34A). During the meeting, the presentation application 2601 on the presenter portable electronic device 2402 displays the presentation content to the presenter in synch with the presentation content presented on the meeting room display 2406. The present page 3420 can display the current page 3421 of the presentation content in a presentation content window 3425. Only the window 3425 rendering the presentation content 2414 within the presentation application 2601 is being shared with the presentation gateway 2410 for display on the meeting room display 2406. Other data or information that may be displayed on the display screen of the presenter portable electronic device 2402 by the presentation application 2601 or other applications is not shared. As such, the presenter may perform other tasks, such as taking notes or previewing other slides in the deck. For example, the present page 3420 can further comprise a ribbon 3422 including a preview of the entire deck of the presentation content. The presenter may navigate through the pages of the presentation content by dragging the current page right or left. Additionally, the presenter may tap on a desired presentation content page in the ribbon 3422. The presenter can further annotate the presentation by pressing the "notes" icon 3424.

FIG. 35 is a schematic diagram depicting a view page 3500 of the presentation application 2601 on the attendee portable electronic device 2403. The view page 3500 can be accessed after the attendee pressed the "view" icon 3202 (FIG. 32) or 3303 (FIG. 33). During the meeting, the presentation application 2601 on the attendee portable electronic device 2403 continuously retrieves and displays the current image 3501 of the presentation content 2414 on the display of the attendee portable electronic device 2403 substantially in synch with the meeting room display 2406. Since images of the presentation content are cached on the attendee portable electronic device 2403, as discussed above, the user can navigate or scrawl back to previously saved images, allowing the user to review previous parts of the presentation. For example, the user can move back to these previous images using a drag gesture, or by pressing the images displayed in a timeline format 3502.

The view page 3500 can further include a "play presentation" icon 3503, a "pause presentation" icon 3504, and a "stop presentation" icon 3505. The "play presentation" icon 3503 allows the attendee to return to the live display of the presentation content 2414 in synch with the meeting room display 2406 in the meeting room 2401. The "pause presentation" icon 3504 allows the attendee to pause the presentation so the attendee can view the presented image in more detail. The "stop presentation" icon 3505 allows the attendee to stop the presentation, for example, when the attendee wishes to leave the meeting. The attendee can further manipulate the displayed images by zooming, stretching, and rotating by performing corresponding multi touch gestures on the display screen of the attendee portable electronic device 2403, such as pinch-to-zoom, pinch and stretch, pinch and rotate, or the like.

In another embodiment, the attendee can select a previously saved image (e.g., by pressing on an image in timeline 3502.), and then press the "present" icon 3507. In response, the previously saved image is transmitted from the attendee portable electronic device 2403 to the presentation gateway 2400 for display on the meeting room display 2406 in meeting room 2401. Choosing to share a previously saved image automatically makes to attendee the new presenter. This feature allows users to bounce back and forth during the meeting seamlessly, provides a collaborative way to have a productive meeting, and eliminates the need to ask the presenter to return to a specific slide.

The meeting presenter or the attendee can further annotate the presentation during the meeting by pressing the "notes" icon 3424 (FIG. 34B) or 3510 (FIG. 35). FIG. 36 is a schematic diagram depicting an annotating page 3600 of the presentation application 2601. The annotating page 3600 can display the current images 3601 of the presentation content 2414, a section with the user's notes 3605, and an on-screen keyboard 3606. The annotating page 3600 allows the presenter or the attendee to take notes 3605 along with viewing the current images 3601 of the presentation content 2414 using a word processing functionality. The word processing functionality can be provided by the word processing engine 2616 of the presentation application 2601 (FIG. 26). The attendee can also scrawl back to previously saved images to add or edit their notes. While the presenter is also provided with the annotating page 3600 to take notes during the presentation, only the current page 3601 of the presentation content 2414, and not the notes, will be transmitted to the presentation gateway 2410 and displayed on the meeting display 2406 during the meeting.

As the user takes notes, the entered notes 3605 are saved in association with their corresponding images of the presentation. The images along with their associated notes can be compiled into a single data file. For example, the notes can be saved in association with their images in a slideshow format, such that each slide contains a saved image and its associated notes. More than one user's notes may be compiled and saved in association with their images. According to one embodiment, each saved image can be recorded in a Powerpoint slide and its associated notes can be added in the notes field of the slide in a Powerpoint XML format (PPTX). In another embodiment, the user's notes can be saved as part of the image or as a separate shape in the PPTX file. In another embodiment, images along with their associated notes can be compiled in a Word XML format (DOCX) where the images and their corresponding notes will be saved on a single page. The compiled presentation data file can be saved on the presenter or attendee portable electronic device 2402, 2403 or shared as discussed above. The compiled presentation data file can further be saved in association with the user's calendar as discussed above.

INDUSTRIAL APPLICABILITY

To solve the aforementioned problems, the aspects of the disclosed embodiments are directed towards systems, methods, and modes for live presentation sharing between meeting presenter's and meeting attendees' portable electronic devices during a meeting. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the invention. For example, the NFC tag 11 may encode a uniform resource locator (URL) address directing the portable electronic device to a location for downloading the scheduling application 20.

What is claimed is:

1. A system for sharing presentation content displayed on a meeting room display during a meeting comprising:
    one or more presentation gateways each associated with a network address and configured for receiving presentation content and transmitting said presentation content to a meeting room display during a meeting;
    one or more RF beacons each associated with a presentation gateway and configured for broadcasting information comprising an application identifier;
    a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions, which when executed by the processor, cause acts to be performed comprising:
        receiving from at least one of the one or more RF beacons the broadcasted information including the application identifier,
        transmitting the broadcasted information to an application associated with the application identifier,
        estimating a distance to the at least one of the one or more RF beacons according to a detected signal strength of the RF beacon broadcast,
        determining a location of the portable electronic device based on the distance to the at least one of the one or more RF beacons,
        identifying a presentation gateway network address based on the determined location,
        pairing with a presentation gateway using the identified presentation gateway network address, and
        communicating with the paired presentation gateway to share presentation content, wherein the presentation content is displayed on a meeting room display during a meeting.

2. The system of claim 1, wherein the location of the portable electronic device is determined by identifying a nearest RF beacon by comparing the detected signal strengths of the at least one of the one or more RF beacons and identifying the strongest received signal.

3. The system of claim 1, wherein the broadcasted information of each of the one or more RF beacons comprises a network address of the presentation gateway associated with a respective RF beacon.

4. The system of claim 3,
    wherein the location of the portable electronic device is determined by identifying a nearest RF beacon by comparing the detected signal strengths of the at least one of the one or more RF beacons and identifying the strongest received signal, and
    wherein the presentation gateway network address is identified by identifying the presentation gateway network address received from the nearest RF beacon.

5. The system of claim 1, wherein the broadcasted information of each of the one or more RF beacons comprises a beacon ID, wherein each beacon ID is associated with a presentation gateway network address.

6. The system of claim 5,
    wherein the location of the portable electronic device is determined by identifying a nearest RF beacon by comparing the detected signal strengths of the at least one of the one or more RF beacons and identifying the strongest received signal, and
    wherein the presentation gateway network address is identified by identifying the presentation gateway network address associated with a beacon ID received from the nearest RF beacon.

7. The system of claim 5, wherein the association between each beacon ID and presentation gateway network address is stored in the memory of the portable electronic device.

8. The system of claim 5,
    wherein the association between each beacon ID and presentation gateway network address is stored on a remote server, and
    wherein the presentation gateway network address is identified by querying the remote server with a beacon ID received from the nearest RF beacon to identify an associated network address of a presentation gateway.

9. The system of claim 8, wherein the broadcasted information of each of the one or more RF beacons comprises a remote server network address, wherein the one or more processor-executable instructions cause further acts to be performed comprising:
    connecting to the remote server using the received remote server network address.

10. The system of claim 1, wherein when the portable electronic device receives broadcasted information from only a single RF beacon, the portable electronic device pairs with a presentation gateway associated with the single RF beacon.

11. The system of claim 1, wherein the location of the portable electronic device is determined via trilateration.

12. The system of claim 1, wherein the location of the portable electronic device is determined by:
    determining location coordinates of the portable electronic device via trilateration,
    mapping the location coordinates on a floor plan, and
    identifying an area in which the portable electronic device is located.

13. The system of claim 12, wherein the floor plan is stored in the memory of the portable electronic device or a remote server.

14. The system of claim 12, further comprising one or more area records each associated with an area and comprising a network address of a presentation gateway installed in the area.

15. The system of claim 14, wherein the one or more area records are stored in the memory of the portable electronic device or a remote server.

16. The system of claim 1, wherein each presentation gateway comprises a built-in web server associated with a unique network address.

17. The system of claim 1, wherein the one or more processor-executable instructions cause further acts to be performed comprising:
opening an application associated with the application identifier.

18. The system of claim 1, wherein the one or more processor-executable instructions cause further acts to be performed comprising:
determining whether an application associated with the application identifier is present on the portable electronic device,
upon determining that the application associated with the application identifier is not present on the portable electronic device, downloading the application based on the application identifier, and
opening the application associated with the application identifier.

19. The system of claim 1, wherein the one or more processor-executable instructions cause further acts to be performed comprising:
determining an access level of the user ID to the paired presentation gateway, wherein the access level comprises rules that restrict communication between the portable electronic device and the paired presentation gateway.

20. The system of claim 1, wherein the one or more processor-executable instructions cause further acts to be performed comprising:
authenticating a user ID,
determining an access level of an authenticated user ID to the paired presentation gateway, and
providing an unauthenticated user ID limited predefined access level to the paired presentation gateway.

21. The system of claim 1, wherein the one or more processor-executable instructions cause further acts to be performed comprising:
receiving from a remote server a schedule of the determined location of the portable electronic device,
identifying a scheduled meeting event that corresponds to a current date and time of day,
accessing a list of meeting participants for the identified scheduled meeting event,
determining whether the user ID matches a user ID in the list of meeting participants,
upon finding a match, pairing the portable electronic device with the presentation gateway, and
upon not finding a match, preventing the portable electronic device to pair with the presentation gateway.

22. The system of claim 1, wherein the one or more processor-executable instructions cause further acts to be performed comprising:
receiving from a remote server a schedule of the determined location of the portable electronic device;
when a status indicator for the location is vacant for a current date and time of day, designating the status indicator for the location as booked after pairing the portable electronic device with the presentation gateway.

23. The system of claim 22, wherein the one or more processor-executable instructions cause further acts to be performed comprising:
prompting a user to indicate a length of time period the user wishes to use the location.

24. The system of claim 1, wherein the portable electronic device communicates with the paired presentation gateway to transmit presentation content to the paired presentation gateway for display on a meeting room display during a meeting.

25. The system of claim 24, wherein the portable electronic device displays the presentation content on its display.

26. The system of claim 25, wherein the one or more processor-executable instructions cause further acts to be performed comprising:
displaying a user interface configured for allowing a user to navigate through the presentation content, and
transmitting updated presentation content to the presentation gateway as the user navigates through the presentation content.

27. The system of claim 24, wherein the presentation content is transmitted to the presentation gateway as a content data stream.

28. The system of claim 24, wherein the one or more processor-executable instructions cause further acts to be performed comprising:
displaying the presentation content within a first window on the display of the portable electronic device, and
sharing the presentation content that is being displayed within the first window with the presentation gateway.

29. The system of claim 28, wherein the one or more processor-executable instructions cause further acts to be performed comprising:
providing a second window in proximity to the first window comprising a user interface configured for allowing a user to input notes.

30. The system of claim 24, wherein the one or more processor-executable instructions cause further acts to be performed comprising:
accessing a calendar application,
accessing at least one scheduled meeting event associated with the calendar application,
scanning the at least one scheduled meeting event to discover data files attached to the at least one scheduled meeting event,
displaying to the user a list of the discovered data files, and
upon selection of a data file from the list of the discovered data files, transmitting the selected data file to the presentation gateway.

31. The system of claim 30, wherein the one or more processor-executable instructions cause further acts to be performed comprising:
identifying at least one scheduled meeting event that corresponds to a current date and time of day.

32. The system of claim 1, wherein the one or more processor-executable instructions cause further acts to be performed comprising:
receiving from a remote server a schedule of the discovered location of the portable electronic device,
identifying a scheduled meeting event that corresponds to a current date and time of day,
retrieving presentation content associated with the scheduled meeting event, and
transmitting the presentation content to the paired presentation gateway for display on a meeting room display during a meeting.

33. The system of claim 1, wherein the portable electronic device communicates with the paired presentation gateway to receive from the paired presentation gateway presentation content displayed on a meeting room display, and wherein the portable electronic device displays said presentation content on its display.

34. The system of claim 1, wherein the portable electronic device comprises at least one selected from the group consisting of a laptop computer, a smartphone, and a tablet.

35. The system of claim 1, wherein the presentation content comprises at least one selected from the group consisting of text, graphics, images, photographs, videos, audio, animation, a slideshow, and any combinations thereof.

36. The system of claim 3, wherein each presentation gateway network address comprises at least one selected from the group consisting of an IP address, an URI address, an URL address, a host name, and any combination thereof.

37. The system of claim 1, wherein each of the one or more RF beacons is configured for broadcasting the information according to at least one of a Bluetooth protocol, and an NFC protocol.

38. A system for sharing presentation content displayed on a meeting room display during a meeting comprising:
  one or more presentation gateways each associated with a network address and configured for receiving presentation content and transmitting said presentation content to a meeting room display during a meeting;
  one or more RF beacons each associated with a presentation gateway and configured for broadcasting an application identifier and a network address of the associated presentation gateway;
  a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions, which when executed by the processor, cause acts to be performed comprising:
    receiving from at least one of the one or more RF beacons the application identifier and network addresses of one or more presentation gateways,
    transmitting the network addresses of one or more presentation gateways to an application associated with the application identifier,
    estimating a distance to the at least one of the one or more RF beacons according to a detected signal strength of the RF beacon broadcast,
    determining a location of the portable electronic device based on the distance to the at least one of the one or more RF beacons and selecting an RF beacon associated with the location,
    pairing with a presentation gateway associated with the selected RF beacon using a network address received from the selected RF beacon, and
    communicating with the paired presentation gateway to share presentation content, wherein the presentation content is displayed on a meeting room display during a meeting.

39. A system for sharing presentation content displayed on a meeting room display during a meeting comprising:
  one or more presentation gateways each associated with a meeting room and a network address and configured for receiving presentation content and transmitting said presentation content to a meeting room display during a meeting;
  one or more RF beacons each installed in a meeting room and configured for broadcasting an application identifier and a beacon ID; and
  a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions, which when executed by the processor, cause acts to be performed comprising:
    receiving from at least one of the one or more RF beacons the application identifier and beacon IDs,
    transmitting the beacon IDs to an application associated with the application identifier,
    estimating a distance to the at least one of the one or more RF beacons according to a detected signal strength of the RF beacon broadcast,
    determining a meeting room in which portable electronic device is located based on the distance to the at least one of the one or more RF beacons,
    determining a network address of a presentation gateway associated with the determined meeting room,
    pairing with the presentation gateway associated with the determined meeting room using the determined network address, and
    communicating with the paired presentation gateway to share presentation content, wherein the presentation content is displayed on a meeting room display during a meeting.

40. A system for sharing presentation content displayed on a meeting room display during a meeting comprising:
  one or more presentation gateways each associated with a network address and configured for receiving presentation content and transmitting said presentation content to a meeting room display during a meeting;
  one or more RF beacons each associated with a presentation gateway and configured for broadcasting an application identifier and pairing information configured for identifying a network address of the associated presentation gateway;
  a portable electronic device associated with a user ID and comprising at least one interface configured for enabling communication between the portable electronic device and the one or more RF beacons and communication between the portable electronic device and the presentation gateway, a display, a memory encoding one or more processor-executable instructions, and a processor configured to load the one or more processor-executable instructions, which when executed by the processor, cause acts to be performed comprising:
    receiving from at least one of the one or more RF beacons the application identifier and pairing information,
    transmitting the pairing information to an application associated with the application identifier,
    estimating a distance to the at least one of the one or more RF beacons according to a detected signal strength of the RF beacon broadcast,
    determining a location of the portable electronic device based on the distance to the at least one of the one or more RF beacons and selecting an RF beacon associated with the location, identifying a presentation gateway network address using the pairing information received from the selected beacon, pairing with a presentation gateway using the identified presentation gateway network address, and communicating with the paired presentation gateway to share presentation content, wherein the presentation content is displayed on a meeting room display during a meeting.

41. A method for sharing presentation content displayed on a meeting room display during a meeting comprising:

providing one or more RF beacons each associated with a presentation gateway and configured for broadcasting information comprising an application identifier;

receiving from at least one of the one or more RF beacons the broadcasted information including the application identifier;

transmitting the broadcasted information to an application associated with the application identifier;

estimating a distance to the at least one of the one or more RF beacons according to a detected signal strength of the RF beacon broadcast;

determining a location of the portable electronic device based on the distance to the at least one of the one or more RF beacons;

identifying a presentation gateway network address based on the determined location;

pairing with a presentation gateway using the identified presentation gateway network address; and communicating with the paired presentation gateway to share presentation content, wherein the presentation content is displayed on a meeting room display during a meeting.

* * * * *